United States Patent
von Flotow et al.

(10) Patent No.: US 10,577,094 B2
(45) Date of Patent: Mar. 3, 2020

(54) MULTICOPTER-ASSISTED SYSTEM AND METHOD FOR LAUNCHING AND RETRIEVING A FIXED-WING AIRCRAFT

(71) Applicant: Hood Technology Corporation, Hood River, OR (US)

(72) Inventors: Andreas H. von Flotow, Hood River, OR (US); Corydon C. Roeseler, Hood River, OR (US)

(73) Assignee: Hood Technology Corporation, Hood River, OR (US)

( * ) Notice: Subject to any disclaimer, the term of this patent is extended or adjusted under 35 U.S.C. 154(b) by 455 days.

(21) Appl. No.: 15/433,686

(22) Filed: Feb. 15, 2017

(65) Prior Publication Data

US 2017/0327226 A1    Nov. 16, 2017

Related U.S. Application Data

(63) Continuation of application No. 15/375,909, filed on Dec. 12, 2016, which is a continuation-in-part of
(Continued)

(51) Int. Cl.
*B64C 27/48* (2006.01)
*B64C 27/08* (2006.01)
(Continued)

(52) U.S. Cl.
CPC ............... *B64C 27/48* (2013.01); *B64C 25/08* (2013.01); *B64C 27/001* (2013.01); *B64C 27/08* (2013.01);
(Continued)

(58) Field of Classification Search
CPC ....... B64C 27/48; B64C 27/001; B64C 27/08; B64C 27/26; B64C 27/32; B64C 25/08; B64C 39/024
See application file for complete search history.

(56) References Cited

U.S. PATENT DOCUMENTS

| | | | |
|---|---|---|---|
| 968,339 | A | 8/1910 | Geraldson |
| 1,144,505 | A | 6/1915 | Steffan |

(Continued)

FOREIGN PATENT DOCUMENTS

| | | |
|---|---|---|
| CA | 781808 | 4/1968 |
| CA | 839101 | 4/1970 |

(Continued)

OTHER PUBLICATIONS

"Trapeze" Wikipedia, Aug. 4, 2006, available at http://en.wikipedia.org/w/index.php?title=Trapeze&oldid=67584367.
(Continued)

*Primary Examiner* — Justin M Benedik
(74) *Attorney, Agent, or Firm* — Neal, Gerber & Eisenberg LLP

(57) ABSTRACT

The present disclosure provides various embodiments of a multicopter-assisted launch and retrieval system generally including: (1) a multi-rotor modular multicopter attachable to (and detachable from) a fixed-wing aircraft to facilitate launch of the fixed-wing aircraft into wing-borne flight; (2) a storage and launch system usable to store the modular multicopter and to facilitate launch of the fixed-wing aircraft into wing-borne flight; and (3) an anchor system usable (along with the multicopter and a flexible capture member) to retrieve the fixed-wing aircraft from wing-borne flight.

18 Claims, 53 Drawing Sheets

Related U.S. Application Data application No. 15/144,119, filed on May 2, 2016, now Pat. No. 9,656,765, which is a continuation of application No. 14/597,933, filed on Jan. 15, 2015, now Pat. No. 9,359,075, which is a continuation-in-part of application No. 14/230,454, filed on Mar. 31, 2014, now Pat. No. 10,144,511.

(60) Provisional application No. 62/269,629, filed on Dec. 18, 2015, provisional application No. 61/808,392, filed on Apr. 4, 2013, provisional application No. 61/807,508, filed on Apr. 2, 2013.

(51) Int. Cl.
| | | |
|---|---|---|
| *B64D 5/00* | (2006.01) | |
| *B64C 39/02* | (2006.01) | |
| *B64D 1/12* | (2006.01) | |
| *B64D 3/00* | (2006.01) | |
| *B64F 1/02* | (2006.01) | |
| *B64C 27/26* | (2006.01) | |
| *B64D 35/02* | (2006.01) | |
| *B64C 27/32* | (2006.01) | |
| *B64C 27/00* | (2006.01) | |
| *B64D 1/00* | (2006.01) | |
| *B64C 25/08* | (2006.01) | |
| *B65D 25/10* | (2006.01) | |
| *B65D 85/68* | (2006.01) | |
| *B64D 1/02* | (2006.01) | |

(52) U.S. Cl.
CPC .............. *B64C 27/26* (2013.01); *B64C 27/32* (2013.01); *B64C 39/024* (2013.01); *B64D 1/00* (2013.01); *B64D 1/02* (2013.01); *B64D 1/12* (2013.01); *B64D 3/00* (2013.01); *B64D 5/00* (2013.01); *B64D 35/02* (2013.01); *B64F 1/02* (2013.01); *B65D 25/10* (2013.01); *B65D 85/68* (2013.01); *B64C 2027/003* (2013.01); *B64C 2201/021* (2013.01); *B64C 2201/024* (2013.01); *B64C 2201/027* (2013.01); *B64C 2201/042* (2013.01); *B64C 2201/082* (2013.01); *B64C 2201/108* (2013.01); *B64C 2201/12* (2013.01); *B64C 2201/146* (2013.01); *B64C 2201/182* (2013.01); *B64C 2201/201* (2013.01); *B65D 2585/687* (2013.01)

(56) References Cited

U.S. PATENT DOCUMENTS

| | | |
|---|---|---|
| 1,306,860 A | 6/1919 | Smith |
| 1,383,595 A | 7/1921 | Black |
| 1,499,472 A | 7/1924 | Pratt |
| 1,582,188 A | 4/1926 | Mummert |
| 1,625,020 A | 4/1927 | Guillermo |
| 1,686,298 A | 10/1928 | Uhl |
| 1,716,670 A | 6/1929 | Sperry |
| 1,731,091 A | 10/1929 | Clayton |
| 1,748,663 A | 2/1930 | Tucker |
| 1,836,010 A | 12/1931 | Audrain |
| 1,848,828 A | 3/1932 | Griffin |
| 1,912,723 A | 6/1933 | Perkins |
| 2,415,071 A | 2/1947 | Brie |
| 2,435,197 A | 2/1948 | Brodie |
| 2,440,574 A | 4/1948 | Cotton |
| 2,448,209 A | 8/1948 | Boyer et al. |
| 2,488,050 A | 11/1949 | Brodie |
| 2,488,051 A | 11/1949 | Brodie |
| 2,552,115 A | 5/1951 | Replogle |
| 2,807,429 A | 9/1957 | Hawkins, Jr. et al. |
| 2,843,337 A | 7/1958 | Bennett |
| 2,944,815 A | 7/1960 | Moyer |
| 3,017,138 A | 1/1962 | Flint |
| 3,029,049 A | 4/1962 | Melville |
| 3,146,974 A | 9/1964 | Petoia |
| 3,351,325 A | 11/1967 | Cotton |
| 3,389,880 A | 6/1968 | Ferguson |
| 3,785,316 A | 1/1974 | Leming et al. |
| 3,980,259 A | 9/1976 | Greenhalgh et al. |
| 4,079,901 A | 3/1978 | Mayhew et al. |
| 4,116,408 A | 9/1978 | Soloy |
| 4,123,020 A | 10/1978 | Korsak |
| 4,147,317 A | 4/1979 | Mayhew et al. |
| 4,267,987 A | 5/1981 | McDonnell |
| 4,311,290 A | 1/1982 | Koper |
| 4,523,729 A | 6/1985 | Frick |
| 4,575,026 A | 3/1986 | Brittain et al. |
| 4,680,962 A | 7/1987 | Durbin |
| 4,753,400 A | 6/1988 | Reuter et al. |
| 4,757,959 A | 7/1988 | Schroder et al. |
| 4,790,497 A | 12/1988 | Yoffe |
| 4,842,222 A | 6/1989 | Baird |
| 5,000,398 A | 3/1991 | Rashev |
| 5,039,034 A | 8/1991 | Burgess et al. |
| 5,042,750 A | 8/1991 | Winter |
| 5,054,717 A | 10/1991 | Taylor |
| 5,092,540 A | 3/1992 | Burgess et al. |
| 5,687,930 A | 11/1997 | Wagner et al. |
| 5,799,900 A | 9/1998 | McDonnell |
| 5,806,795 A | 9/1998 | Ortelli |
| 6,264,140 B1 | 7/2001 | McGeer et al. |
| 6,824,102 B2 | 11/2004 | Haggard |
| 6,874,729 B1 | 4/2005 | McDonnell |
| 6,961,018 B2 | 11/2005 | Heppe et al. |
| 7,000,883 B2 | 2/2006 | Mercadal et al. |
| 7,028,947 B2 | 4/2006 | Burns |
| 7,059,564 B2 | 6/2006 | Dennis |
| 7,066,430 B2 | 6/2006 | Dennis et al. |
| 7,090,166 B2 | 8/2006 | Dennis et al. |
| 7,097,137 B2 | 8/2006 | McDonnell |
| 7,104,495 B2 | 9/2006 | McGeer |
| 7,114,680 B2 | 10/2006 | Dennis |
| 7,121,507 B2 | 10/2006 | Dennis et al. |
| 7,128,294 B2 | 10/2006 | Roeseler et al. |
| 7,140,575 B2 | 11/2006 | McGeer et al. |
| 7,143,974 B2 | 12/2006 | Roeseler et al. |
| 7,143,976 B2 | 12/2006 | Snediker et al. |
| 7,152,827 B2 | 12/2006 | McGeer |
| 7,165,745 B2 | 1/2007 | McGeer et al. |
| 7,175,135 B2 * | 2/2007 | Dennis .................... B64C 25/68 244/110 C |
| 7,219,856 B2 | 5/2007 | Watts et al. |
| 7,264,204 B1 * | 9/2007 | Portmann ............... B63B 35/50 244/110 C |
| 7,344,108 B2 | 3/2008 | Muylaert et al. |
| 7,360,741 B2 | 4/2008 | McGeer et al. |
| 7,410,125 B2 | 8/2008 | Steele |
| 7,464,650 B2 | 12/2008 | Steinkerchner et al. |
| 7,510,145 B2 | 3/2009 | Snediker |
| 7,530,527 B2 | 5/2009 | Kelleher |
| 7,543,780 B1 | 6/2009 | Marshall et al. |
| 7,562,843 B2 | 7/2009 | Lipponen |
| 7,578,467 B2 | 8/2009 | Goodrich |
| 7,581,702 B2 | 9/2009 | Olson et al. |
| 7,602,415 B2 | 10/2009 | von Flotow et al. |
| 7,665,691 B2 | 2/2010 | Hanzlick et al. |
| 7,712,702 B2 | 5/2010 | McGeer et al. |
| 7,798,445 B2 | 9/2010 | Heppe et al. |
| 7,806,366 B2 | 10/2010 | Jackson |
| 7,876,359 B2 | 1/2011 | von Flotow et al. |
| 7,883,059 B2 | 2/2011 | Kunz |
| 7,954,758 B2 * | 6/2011 | McGeer ................ B64C 39/024 244/110 C |
| 8,091,833 B2 | 1/2012 | von Flotow et al. |
| 8,140,200 B2 | 3/2012 | Heppe et al. |
| 8,162,256 B2 | 4/2012 | Goossen |
| 8,172,177 B2 | 5/2012 | Lovell |
| 8,226,039 B2 | 7/2012 | von Flotow et al. |
| 8,231,083 B2 | 7/2012 | Kutzmann et al. |
| 8,245,968 B2 | 8/2012 | McGeer et al. |
| 8,276,844 B2 | 10/2012 | Kariv |

(56) References Cited

U.S. PATENT DOCUMENTS

| | | |
|---|---|---|
| 8,292,215 B2 | 10/2012 | Olm et al. |
| 8,313,057 B2 | 11/2012 | Rednikov |
| 8,348,193 B2 | 1/2013 | McGeer et al. |
| 8,405,723 B2 | 3/2013 | von Flotow et al. |
| 8,453,966 B2 | 6/2013 | McGeer et al. |
| 8,464,981 B2 | 6/2013 | Goldie et al. |
| 8,573,536 B2 * | 11/2013 | McGeer ............... B64C 39/024 244/110 C |
| 8,596,576 B1 | 12/2013 | McGeer et al. |
| 8,672,264 B1 | 3/2014 | McGeer et al. |
| 8,708,277 B1 | 4/2014 | McGeer et al. |
| 8,708,278 B2 | 4/2014 | McGeer et al. |
| 8,714,482 B2 | 5/2014 | McGeer et al. |
| 8,740,134 B2 | 6/2014 | Suzuki |
| 8,740,142 B2 | 6/2014 | McGeer et al. |
| 8,944,373 B2 * | 2/2015 | Dickson ............... B64F 1/02 244/110 C |
| 8,950,698 B1 | 2/2015 | Rossi |
| 8,955,800 B2 | 2/2015 | McGeer et al. |
| 8,955,801 B2 | 2/2015 | McGeer et al. |
| 9,004,402 B2 | 4/2015 | McGeer et al. |
| 9,010,683 B2 | 4/2015 | Gundlach et al. |
| 9,132,916 B2 | 9/2015 | Hanna et al. |
| 9,193,481 B2 | 11/2015 | McGeer et al. |
| 9,266,609 B1 | 2/2016 | Kunz |
| 9,290,269 B2 | 3/2016 | Walker et al. |
| 9,340,301 B2 | 5/2016 | Dickson et al. |
| 9,434,481 B2 | 9/2016 | McGeer et al. |
| 9,456,185 B2 | 9/2016 | Oakley et al. |
| 9,685,091 B2 | 6/2017 | Hayes |
| 9,816,816 B2 | 11/2017 | Hayes |
| 9,856,036 B2 * | 1/2018 | Dickson ............... B64F 1/02 |
| 9,896,222 B2 * | 2/2018 | Kunz ............... B64F 1/02 |
| 2002/0100838 A1 * | 8/2002 | McGeer ............... B64C 25/68 244/116 |
| 2003/0222173 A1 | 12/2003 | McGeer et al. |
| 2004/0256519 A1 | 12/2004 | Ellis et al. |
| 2010/0025528 A1 * | 2/2010 | Jackson ............... B64C 39/024 244/110 F |
| 2012/0223182 A1 * | 9/2012 | Gilchrist, III ........... B64F 1/02 244/110 F |
| 2015/0129716 A1 * | 5/2015 | Yoffe ............... B64F 1/02 244/110 C |
| 2015/0314871 A1 * | 11/2015 | von Flotow ............ B64D 3/00 244/137.4 |
| 2016/0023760 A1 | 1/2016 | Goodrich |
| 2016/0114906 A1 * | 4/2016 | McGeer ............... B64C 39/024 244/63 |
| 2016/0221683 A1 | 8/2016 | Roberts et al. |
| 2016/0327945 A1 | 11/2016 | Davidson |
| 2017/0036762 A1 | 2/2017 | Gamble et al. |
| 2017/0072812 A1 | 3/2017 | Von Novak et al. |
| 2017/0225784 A1 | 8/2017 | Hayes et al. |

FOREIGN PATENT DOCUMENTS

| | | |
|---|---|---|
| CN | 204822072 | 12/2015 |
| EP | 0 472 613 | 4/1992 |
| EP | 2 186 728 | 5/2010 |
| GB | 2 071 031 | 9/1981 |
| WO | WO 01/07318 | 2/2001 |
| WO | WO 2008/015663 | 2/2008 |
| WO | WO 2013/171735 | 11/2013 |
| WO | WO 2014/204550 | 12/2014 |
| WO | WO 2016/167849 | 10/2016 |

OTHER PUBLICATIONS

A miniature powerplant for very small, very long range autonomous aircraft, S.P. Hendrickson and T. McGeer, Final Report under U.S. DoE contract No. DE-FG03-96ER82187, Sep. 1999, (25 pp.).

Aerosonde hazard estimation, T. McGeer, 1994, (6 pp).

Aerosonde Pacific reconnaissance: ready when you are!, T. McGeer, Pacific Northwest Weather Workshop, Mar. 2005, (15 pp).

An Airspeed Vector Sensor for V/STOL Aircraft, E. J. Durbin and T. McGeer, Journal of Aircraft, vol. 19 No. 6, Jun. 1982, (7 pp).

Automated Launch, Recovery, and Refueling for Small Unmanned Aerial Vehicles, K. Mullens et al., 2004 (11 pp).

Autonomous Aerosondes for Economical Atmospheric Soundings Anywhere on the Globe, G. J. Holland, T. McGeer and H.H. Youngre, Bulletin of the American Meteorological Society, vol. 73 No. 12, Dec. 1992 (12 pp).

Flexrotor Long-Endurance VTOL Aircraft Transitions to Wing-Borne Flight, available at http://www.aerovelco.com/papers/FlexrotorTransitionsAnnouncement.pdf, dated Aug. 4, 2011 (2 pages).

Laima: The First Atlantic Crossing by Unmanned Aircraft, T. McGeer, Feb. 1999, (25 pp).

Mini-RPV Recovery System Conceptual Study, Prepared for Eustis Directorate U.S. Army Air Mobility Research and Development Laboratory, Aug. 1977 (322 pages).

Quantitative Risk Management as a Regulatory Approach to Civil UAVs, T. McGeer, L. Newcombe, and J. Vagners, International Workshop on UAV Certification, Jun. 1999, (11 pp).

Regulatory Issues Involving Long-Range Weather Observation by Aerosonde Autonomous Aircraft, T. McGeer, Oct. 1998, (8 pp).

Rotary Action, description of scene of License to Kill, available at http://www.rotaryaction.com/pages/licetkil.html (2 pp).

Safety, Economy, Reliability and Regulatory Policy of Unmanned Aircraft, T. McGeer, Mar. 2007, (9 pp).

Skyhook (Harrier handling system); Harpoon Head Quarters; available at http://www.harpoondatabases.com/encyclopedia/Entry2979.aspx; printed Jun. 21, 2013 (3 pages).

The Beartrap—A Canadian Invention, Crowsnest Magazine, vol. 17, No. 3 and 4 [online], Mar.-Apr. 1965, [retrieved on Sep. 14, 2007]. Retrieved from the Internet at <URL: http://www.readyayeready.com/timeline/1960s/beartrap/index.htm>. (4 pp).

Wide-Scale Use of Long-Range Miniature Aerosondes Over the World's Oceans, T. McGeer and J. Vagners, 1999, (25 pp).

AVIASTAR, "Bell QTR Quad Tiltrotor", Jul. 27, 2015 (3 pages).

\* cited by examiner

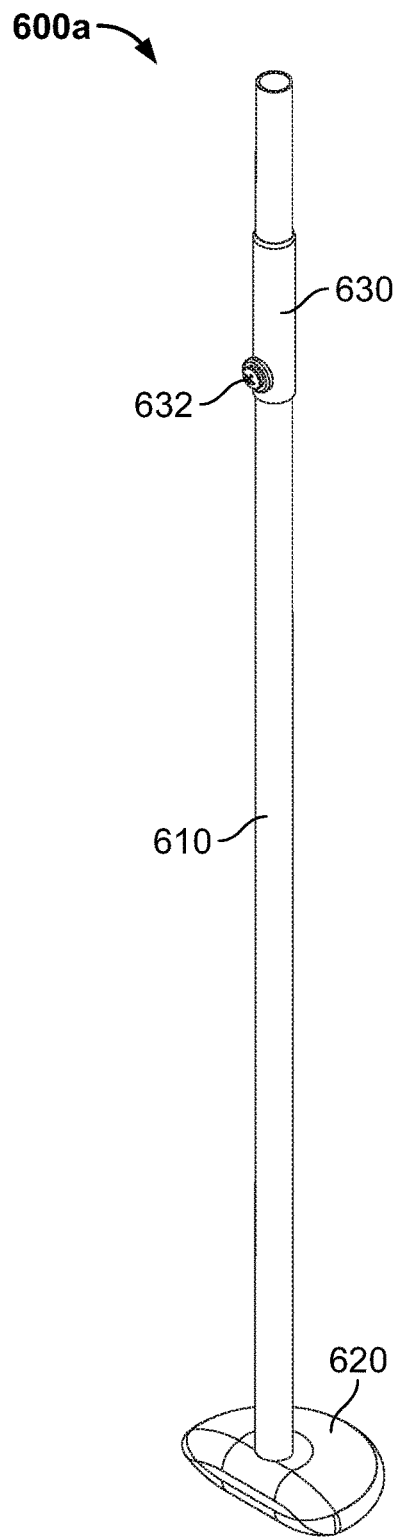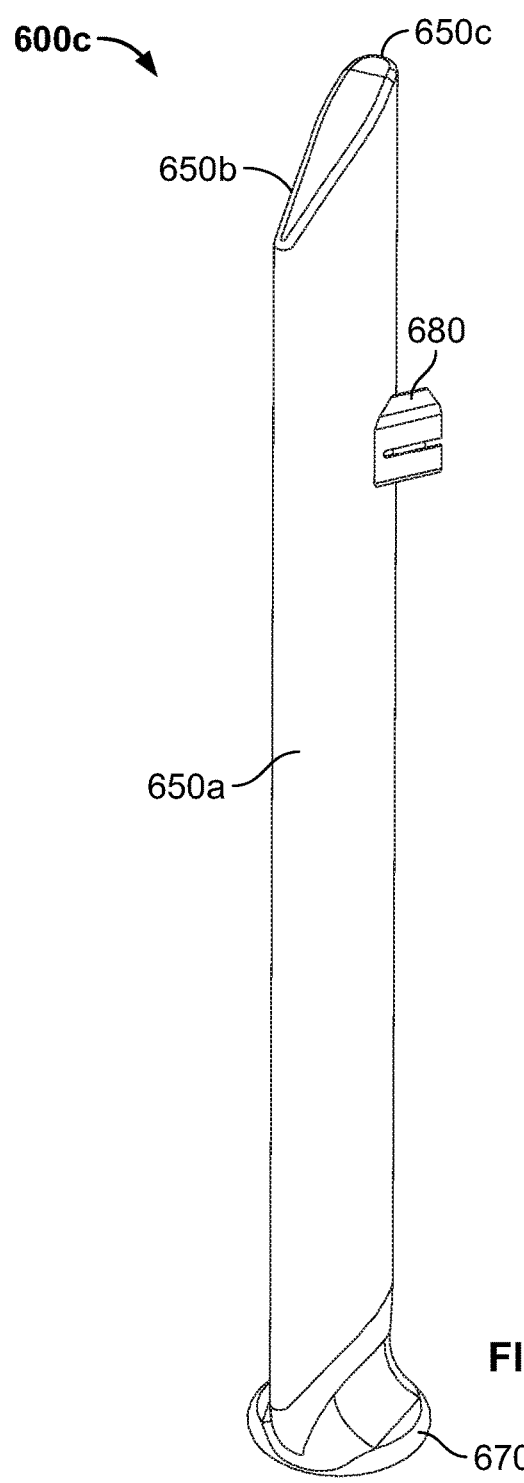
FIG. 7A
FIG. 7B

MULTICOPTER-ASSISTED SYSTEM AND METHOD FOR LAUNCHING AND RETRIEVING A FIXED-WING AIRCRAFT

PRIORITY CLAIM

This patent application is a continuation of and claims priority to and the benefit of U.S. patent application Ser. No. 15/375,909, which was filed on Dec. 12, 2016 and:
(1) claims priority to and the benefit of U.S. Provisional Patent Application No. 62/269,629, which was filed on Dec. 18, 2015; and
(2) is a continuation-in-part of and claims priority to and the benefit of U.S. patent application Ser. No. 15/144,119, which was filed on May 2, 2016, which is a continuation of and claims priority to and the benefit of U.S. patent application Ser. No. 14/597,933, which was filed on Jan. 15, 2015, and issued as U.S. Pat. No. 9,359,075 on Jun. 7, 2016, which is a continuation-in-part of and claims priority to and the benefit of U.S. patent application Ser. No. 14/230,454, which was filed on Mar. 31, 2014, which claims priority to and the benefit of:
  (a) U.S. Provisional Patent Application No. 61/808,392, which was filed on Apr. 4, 2013; and
  (b) U.S. Provisional Patent Application No. 61/807,508, which was filed on Apr. 2, 2013.

The entire contents of each of the above-identified patent applications are incorporated herein by reference.

BACKGROUND

It is well-known in the aeronautical sciences that an aircraft capable of hover and/or of slow flight is typically not well-suited to long-distance efficient cruising flight. One drawback of aircraft capable of long-distance efficient cruising flight is that such aircraft typically require long runways to be utilized for take-off and landing. This becomes problematic when there is not sufficient space for the requisite runway, meaning that such aircraft may not be used. There is a need for new systems and methods by which aircraft that otherwise require a long runway may be launched and retrieved from small spaces that solve these problems.

SUMMARY

The rotorcraft-assisted launch and retrieval system of various embodiments of the present disclosure generally includes: (1) an eight-rotor modular multicopter attachable to (and detachable from) a fixed-wing aircraft to facilitate launch of the fixed-wing aircraft into wing-borne flight; (2) a storage and launch system usable to store the modular multicopter and to facilitate launch of the fixed-wing aircraft into wing-borne flight; and (3) an anchor system usable (along with the multicopter and a flexible capture member) to retrieve the fixed-wing aircraft from wing-borne flight.

Generally, to launch the fixed-wing aircraft into wing-borne flight, an operator (or operators): (1) removes the disassembled multicopter from a container of the storage and launch system; (2) assembles the multicopter; (3) mounts the fixed-wing aircraft to a launch-assist assembly of the storage and launch system; (4) attaches the fixed-wing aircraft to the multicopter; (5) remotely controls the multicopter to lift the fixed-wing aircraft to a desired altitude and to accelerate the fixed-wing aircraft to a desired speed; and (6) remotely causes the fixed-wing aircraft to detach from the multicopter, thereby releasing the fixed-wing aircraft into wing-borne flight.

Generally, to retrieve the fixed-wing aircraft from wing-borne flight, the operator (or operators): (1) attaches one end of a flexible capture member to the multicopter and the other end to the anchor system; (2) remotely controls the multicopter to fly above the anchor system until the flexible capture member is tensioned to a designated level; and (3) controls the fixed-wing aircraft to capture the flexible capture member.

Additional features and advantages of the present disclosure are described in, and will be apparent from, the following Detailed Description and the Figures.

BRIEF DESCRIPTION OF THE FIGURES

FIG. 7A is a top perspective view of one of the front landing gear modules of the multicopter of FIG. 1A.

FIG. 7B is a top perspective view of one of the rear landing gear modules of the multicopter of FIG. 1A.

DETAILED DESCRIPTION

Figure 1A:
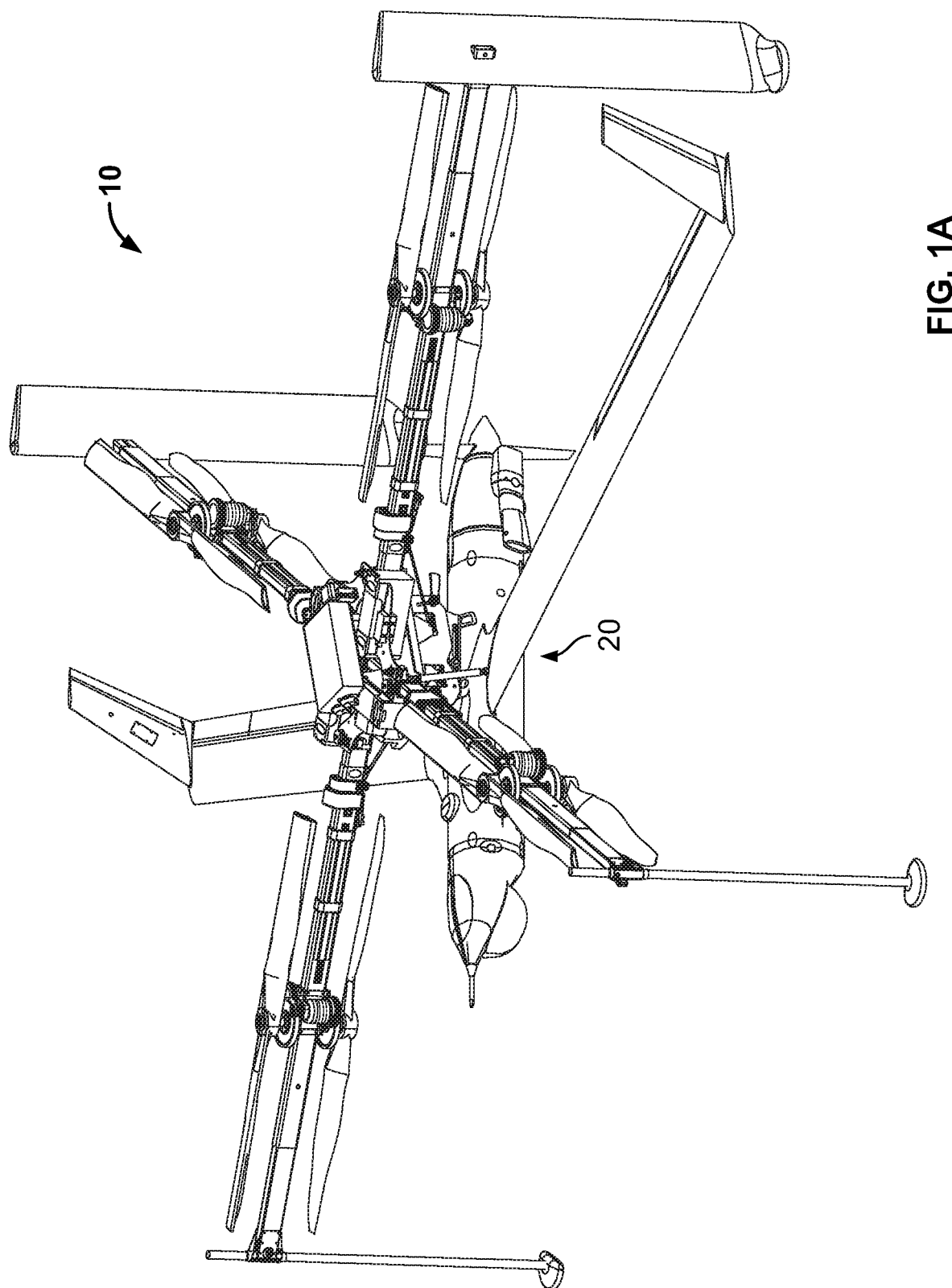
FIG. 1A is a top perspective view of one example embodiment of the multicopter of the present disclosure attached to a fixed-wing aircraft.

While the features, methods, devices, and systems described herein may be embodied in various forms, there are shown in the drawings, and will hereinafter be described, some exemplary and non-limiting embodiments. Not all of the depicted components described in this disclosure may be required, however, and some implementations may include additional, different, or fewer components from those expressly described in this disclosure. Variations in the arrangement and type of the components; the shapes, sizes, and materials of the components; and the manners of attachment and connections of the components may be made without departing from the spirit or scope of the claims as set forth herein. Also, unless otherwise indicated, any directions referred to herein reflect the orientations of the components shown in the corresponding drawings and do not limit the scope of the present disclosure. This specification is intended to be taken as a whole and interpreted in accordance with the principles of the invention as taught herein and understood by one of ordinary skill in the art.

The rotorcraft-assisted launch and retrieval system of various embodiments of the present disclosure generally includes: (1) an eight-rotor modular multicopter 10 attachable to (and detachable from) a fixed-wing aircraft 20 to facilitate launch of the fixed-wing aircraft 20 into wing-borne flight; (2) a storage and launch system 2000 usable to store the modular multicopter 10 and to facilitate launch of the fixed-wing aircraft 20 into wing-borne flight; and (3) an anchor system 3000 usable (along with the multicopter 10 and a flexible capture member 5000) to retrieve the fixed-wing aircraft 20 from wing-borne flight.

Generally, to launch the fixed-wing aircraft 20 into wing-borne flight, an operator (or operators): (1) removes the disassembled multicopter 10 from a container of the storage and launch system 2000; (2) assembles the multicopter 10; (3) mounts the fixed-wing aircraft 20 to a launch-assist assembly of the storage and launch system 2000; (4) attaches the fixed-wing aircraft 20 to the multicopter 10; (5) remotely controls the multicopter 10 to lift the fixed-wing aircraft 20 to a desired altitude and to accelerate the fixed-wing aircraft 20 to a desired speed; and (6) remotely causes the fixed-wing aircraft 20 to detach from the multicopter 10, thereby releasing the fixed-wing aircraft 20 into wing-borne flight.

Generally, to retrieve the fixed-wing aircraft 20 from wing-borne flight, the operator (or operators): (1) attaches one end of a flexible capture member 5000 to the multicopter 10 and the other end to the anchor system 3000; (2) remotely controls the multicopter 10 to fly above the anchor system 3000 until the flexible capture member 5000 is tensioned to a designated level; and (3) controls the fixed-wing aircraft 20 to capture the flexible capture member 5000.

The components of one example embodiment of the multicopter 10, the storage and launch system 2000, and the anchor system 3000 are described below in connection with FIGS. 1A to 9D, followed by a detailed description of example methods for launching and retrieving the fixed-wing aircraft 20 into and from wing-borne flight using the multicopter 10, the storage and launch system 2000, and the anchor system 3000 in connection with FIGS. 10A to 10I.

The example embodiment of the systems and methods of the present disclosure shown in the drawings and described below include a multicopter. In other embodiments, the rotorcraft may include any suitable quantity of rotors (e.g., be a helicopter or a quadcopter).

1. Multicopter Components

FIGS. 1A, 1B, 1C, 1D, 1E, 1F, and 1G show the multicopter 10. The multicopter 10 is modular in that it is assembled from (and can be disassembled into) a plurality of different modules or subassemblies. The multicopter is removably attachable to: (1) the fixed-wing aircraft 20 to facilitate launch of the fixed-wing aircraft 20 into wing-borne flight, and (2) the flexible capture member 5000 to facilitate retrieval of the fixed-wing aircraft 20 from wing-borne flight.

Figure 1B:
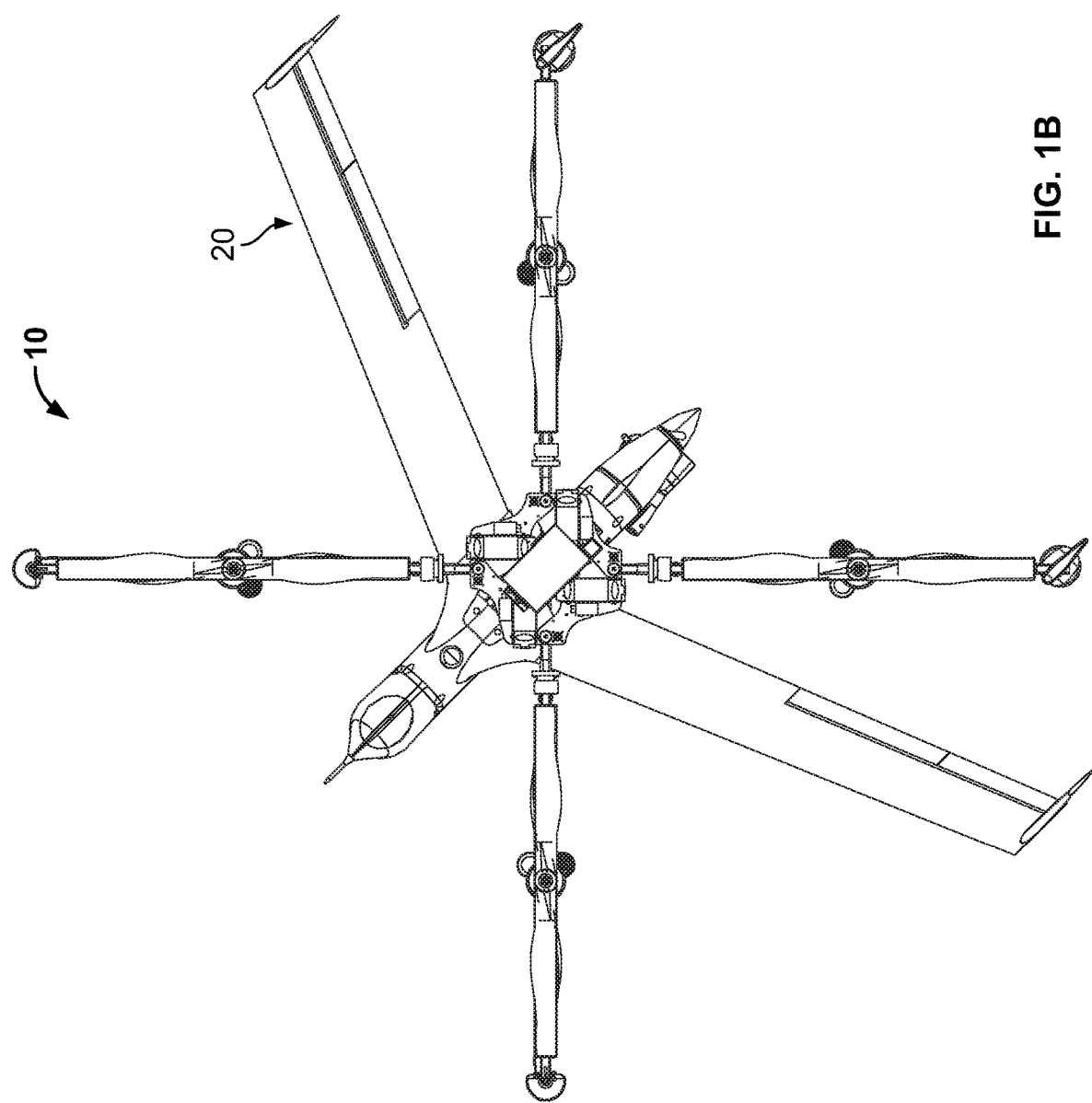
FIG. 1B is a top plan view of the multicopter and fixed-wing aircraft of FIG. 1A.
Figure 1C:
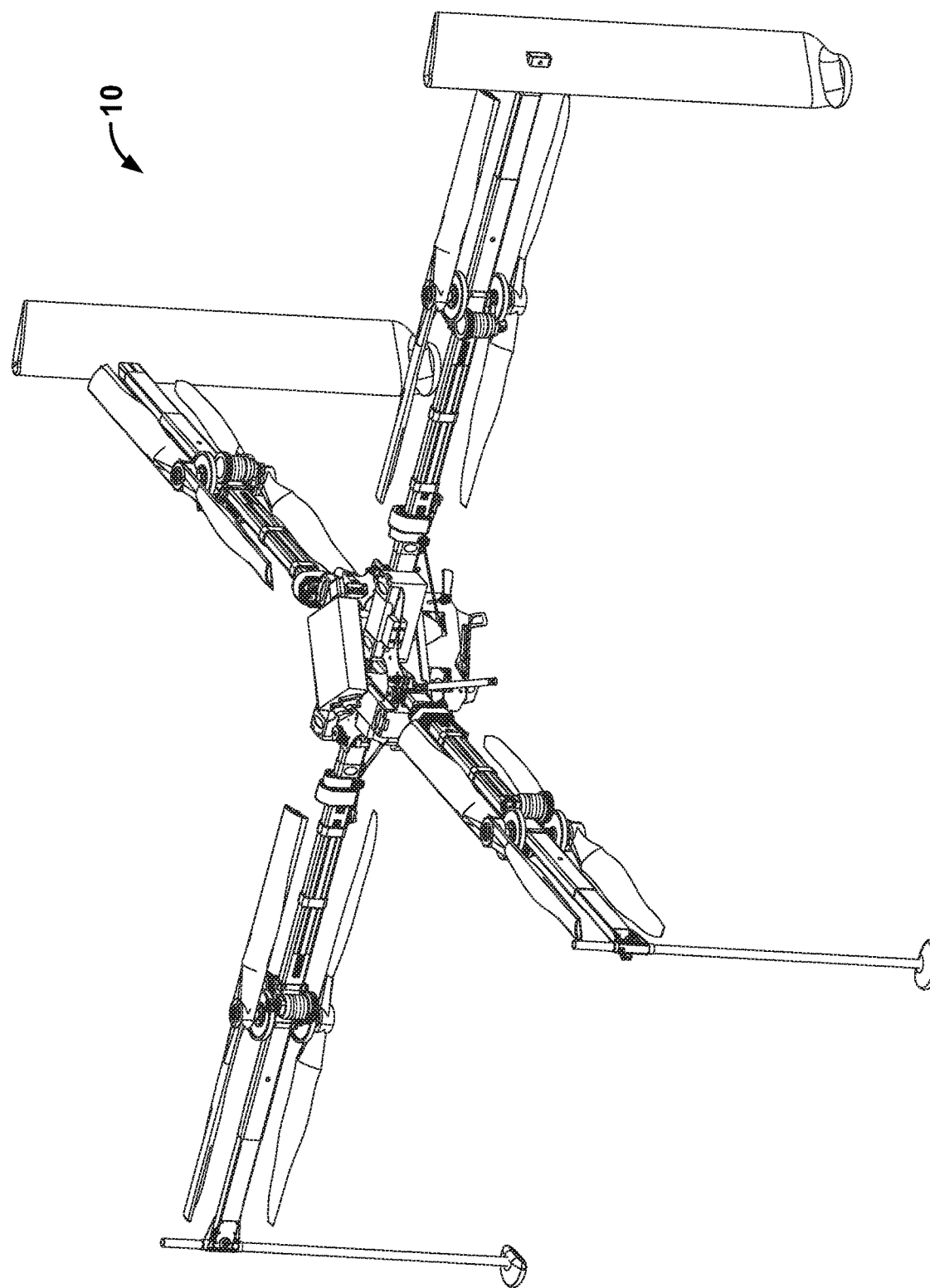
FIG. 1C is a top perspective view of the multicopter of FIG. 1A.
Figure 1D:
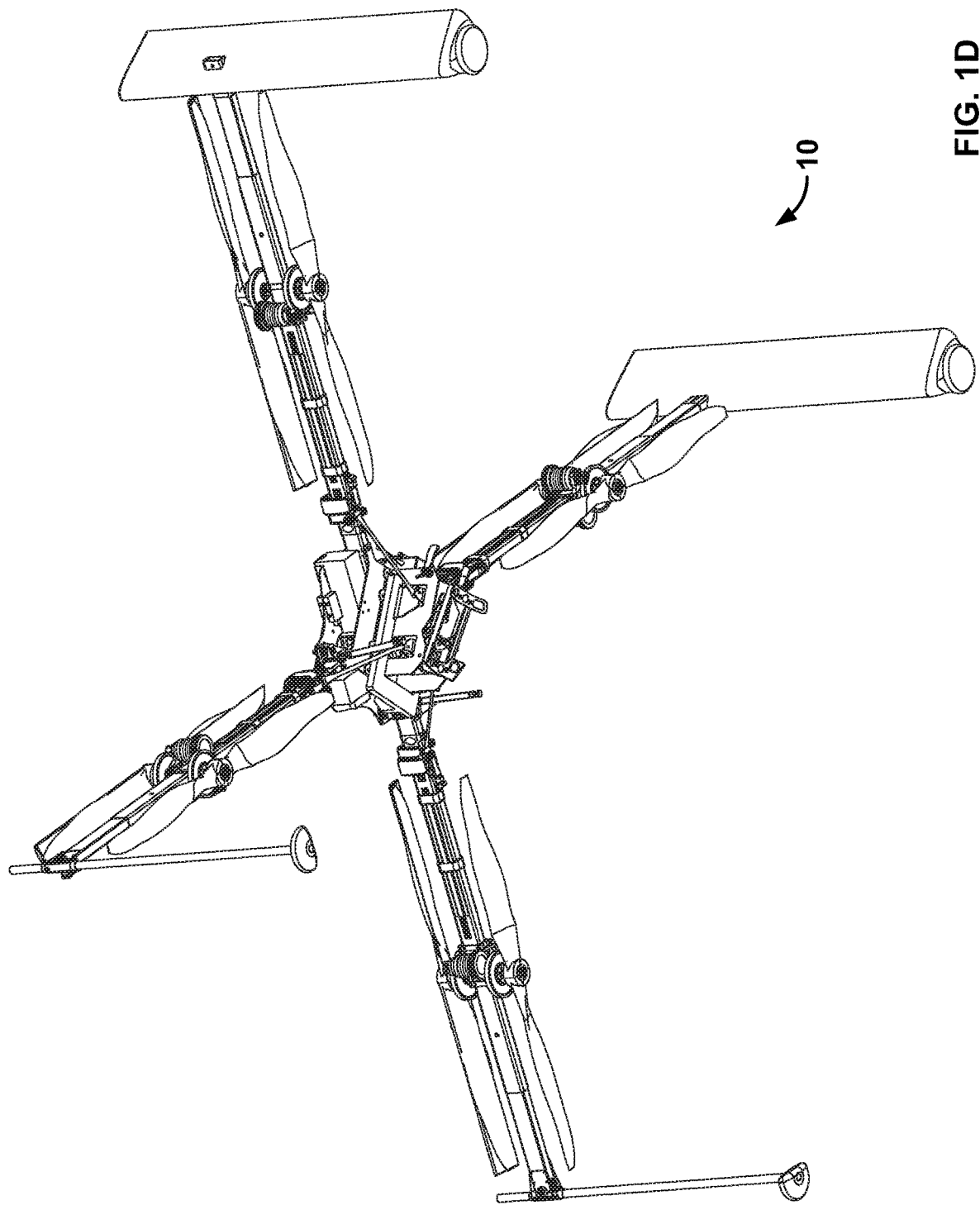
FIG. 1D is a bottom perspective view of the multicopter of FIG. 1A.
Figure 1E:
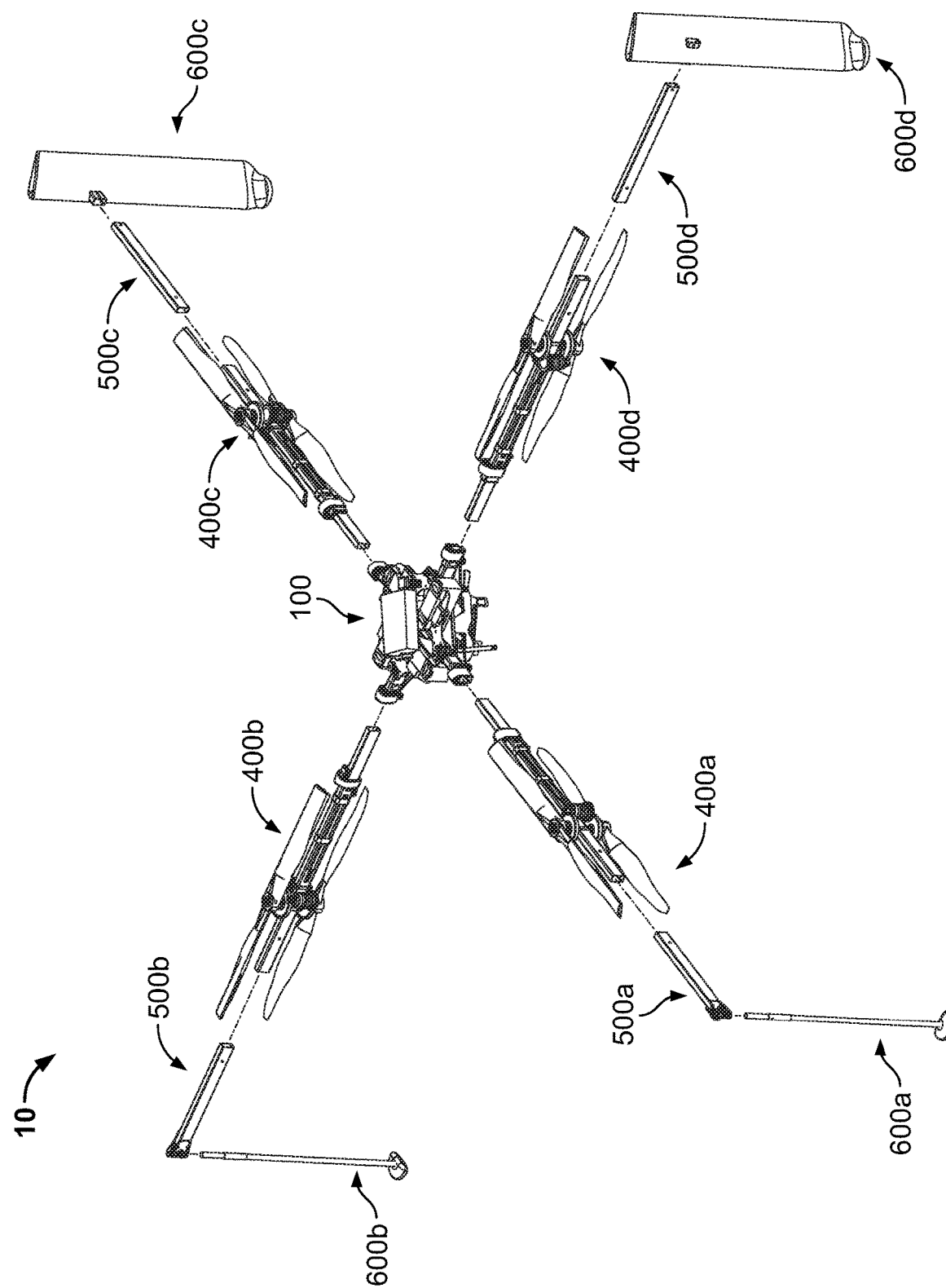
FIG. 1E is a partially exploded top perspective view of the multicopter of FIG. 1A.
Figure 1F:
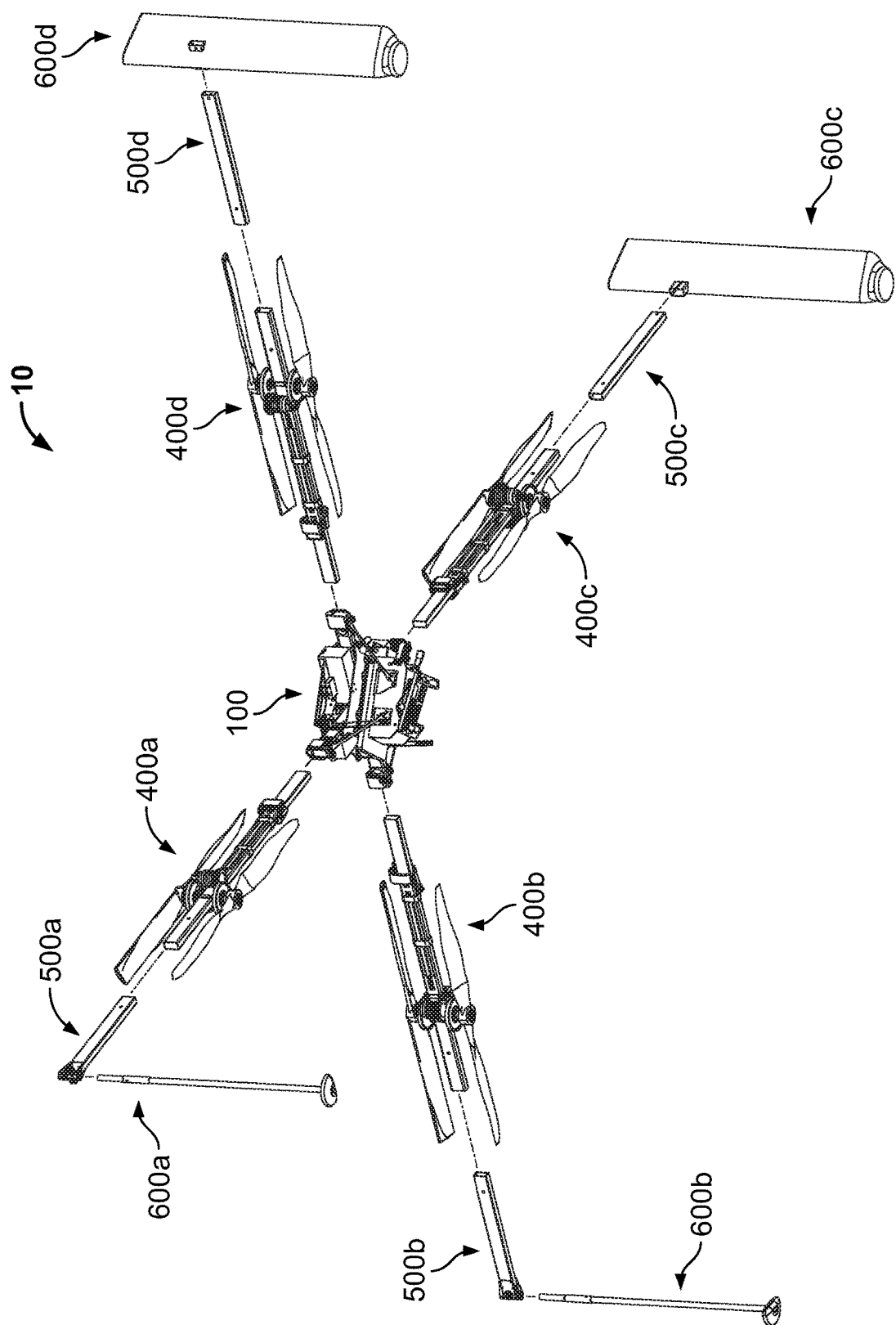
FIG. 1F is a partially exploded bottom perspective view of the multicopter of FIG. 1A.

As best shown in FIGS. 1E and 1F, the multicopter 10 includes the following 13 modules or subassemblies: a hub module 100; first, second, third, and fourth rotor arm modules 400a, 400b, 400c, and 400d; first and second front landing gear extension modules 500a and 500b; first and second rear landing gear extension modules 500c and 500d; first and second front landing gear modules 600a and 600b; and first and second rear landing gear modules 600c and 600d.

As described in detail below, to assemble the multicopter 10 from these 13 modules or subassemblies, after removing the 13 modules from the container of the storage and launch system 2000, an operator: (1) attaches the first, second, third, and fourth rotor arm modules 400a, 400b, 400c, and 400d to the hub module 100; (2) attaches the first and second front landing gear extension modules 500a and 500b to the first and second rotor arm modules 400a and 400b, respectively; (3) attaches the first and second rear landing gear extension modules 500c and 500d to the third and fourth rotor arm modules 400c and 400d, respectively; (4) attaches the first and second front landing gear module 600a and 600b to the first and second front landing gear extension modules 500a and 500b, respectively; and (5) attaches the first and second rear landing gear module 600c and 600d to the first and second rear landing gear extension modules 500c and 500d, respectively.

The modularity of this multicopter is beneficial compared to non-modular or unitary multicopter construction. First, the modularity of this multicopter enables an operator to quickly and easily disassemble this relatively large multicopter into 13 smaller modules or subassemblies. The operator can compactly store these modules or subassemblies in a single container, which makes the disassembled multicopter easy to store and transport compared to the assembled multicopter. Second, if a part of this multicopter breaks, its modularity enables the operator to quickly and easily replace the module(s) or subassembly(ies) including the broken part with a properly functioning replacement module(s) or subassembly(ies) rather than waste time repairing the broken component(s).

Figure 1G:
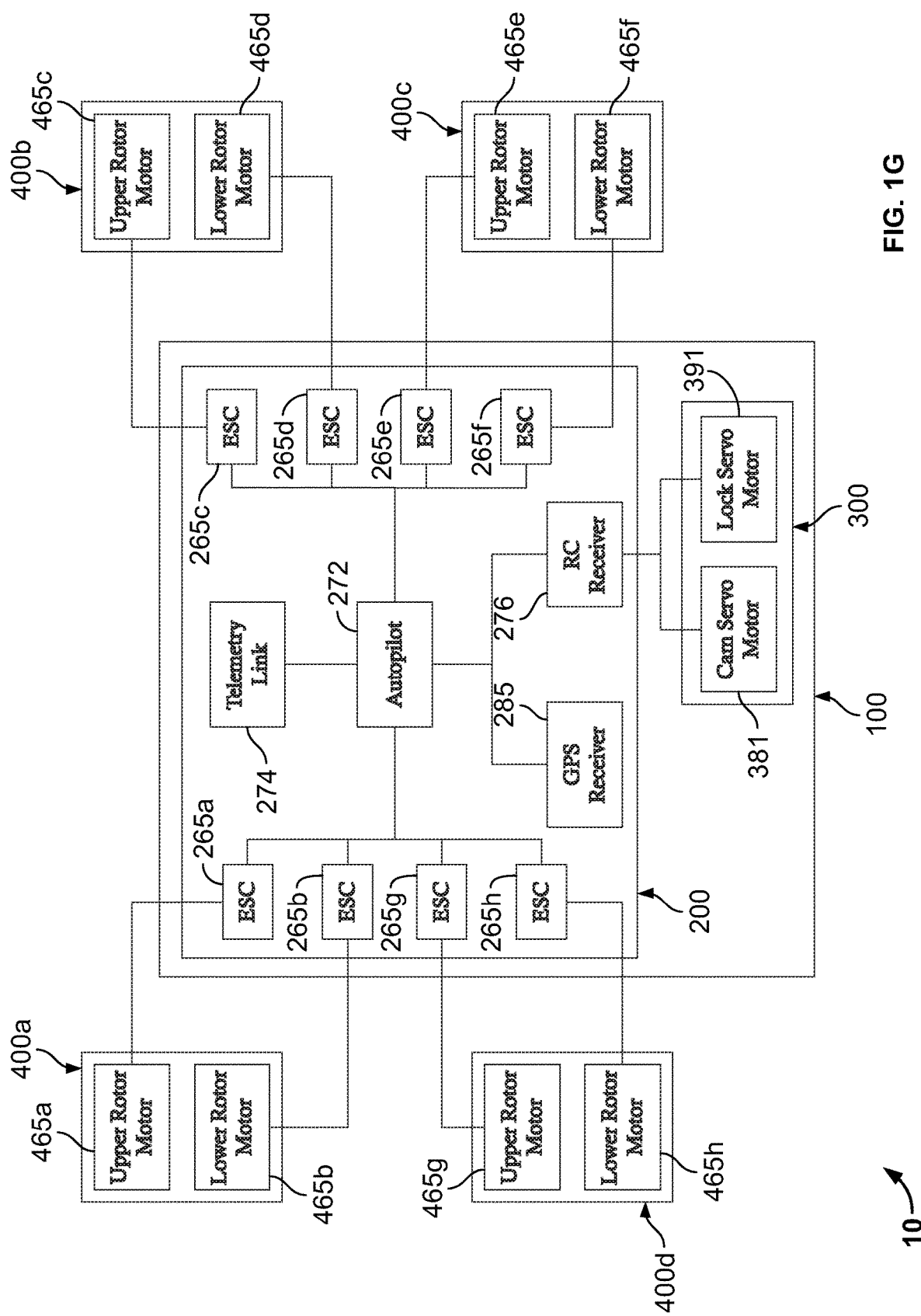
FIG. 1G is a block diagram showing certain electrically controlled components of the multicopter of FIG. 1A.

FIG. 1G is a block diagram of certain electrically controlled components of the multicopter 10. In this embodiment, although not shown in FIG. 1G, four lithium-ion batteries power these components (as described below).

The hub module 100 includes: (1) an autopilot or controller 272; (2) a telemetry link 274; (3) an R/C receiver 276; (4) a GPS antenna 285; (5) eight electronic speed controllers (ESCs) 265a, 265b, 265c, 265d, 265e, 265f, 265g, and 265h; (6) a cam servo motor 381; and (7) a lock servo motor 391. The first rotor arm module 400a includes an upper rotor motor 465a and a lower rotor motor 465b. The second rotor arm module 400b includes an upper rotor motor 465c and a lower rotor motor 465d. The third rotor arm module 400c includes an upper rotor motor 465e and a lower rotor motor 465f. The fourth rotor arm module 400d includes an upper rotor motor 465g and a lower rotor motor 465h.

The autopilot 272 is electrically connected to the telemetry link 274, the R/C receiver 276, the GPS antenna 285, and the ESCs 265a to 265h. The R/C receiver 276 is electrically connected to the cam servo motor 381 and the lock servo motor 391 and is wirelessly connectable to an R/C controller (not shown).

The GPS antenna 285 is wirelessly connectable or otherwise configured to communicate with to a variety of GPS satellite constellations (not shown).

The ESC 265a is electrically connected to and, along with the autopilot 272, controls the operation of the upper rotor motor 465a of the first rotor arm module 400a. The ESC 265b is electrically connected to and, along with the autopilot 272, controls the operation of the lower rotor motor 465b of the first rotor arm module 400a. The ESC 265c is electrically connected to and, along with the autopilot 272, controls the operation of the upper rotor motor 465c of the second rotor arm module 400b. The ESC 265d is electrically connected to and, along with the autopilot 272, controls the operation of the lower rotor motor 465d of the second rotor arm module 400b. The ESC 265e is electrically connected to and, along with the autopilot 272, controls the operation of the upper rotor motor 465e of the third rotor arm module 400c. The ESC 265f is electrically connected to and, along with the autopilot 272, controls the operation of the lower rotor motor 465f of the third rotor arm module 400c. The ESC 265g is electrically connected to and, along with the autopilot 272, controls the operation of the upper rotor motor 465g of the fourth rotor arm module 400d. The ESC 265h is electrically connected to and, along with the autopilot 272, controls the operation of the lower rotor motor 465h of the fourth rotor arm module 400d.

The R/C receiver 276 is configured to receive control signals from the R/C controller (not shown), which the operator of the multicopter 10 controls. These control signals may be associated with movement of the multicopter 10—in which case the R/C receiver 276 is configured to transmit the control signals to the autopilot 272—or operation of the cam servo motor 381 or the lock servo motor 391—in which case the R/C receiver 276 is configured to transmit the control signals to the cam servo motor 381 or the lock servo motor 391 (as appropriate).

The GPS antenna 285 is configured to receive signals from one of the GPS satellite constellations, to determine multicopter location information using those signals, and to transmit the multicopter location information to the autopilot 272.

The autopilot 272 and the ESCs 265a to 265h control operation of the rotor motors 465a to 465h based on the received control signals and/or multicopter location data. Specifically, the autopilot 272 receives the control signals and the multicopter location information and determines, based on this data, how to control the rotor motors in response. The autopilot 272 determines appropriate rotor motor control signals and transmits the rotor motor control signals to one or more of the ESCs 265a to 265h, which causes the ESC(s) to control its(their) corresponding rotor motor(s) accordingly.

A computing device (such as laptop computer, tablet computer, or mobile phone, not shown) is wirelessly connectable to the autopilot 272 via the telemetry link 274. Once the autopilot 272 establishes a connection with the computing device through the telemetry link 274, the autopilot 272 can share information associated with the operation of the multicopter 10 (such as the operational status of the multicopter 10, GPS coordinates of the multicopter 10, rotor motor status, and the like) with the computing device.

Each module or subassembly of the multicopter 10 is described in further detail below.

1.1 Hub Module

Figure 2A:
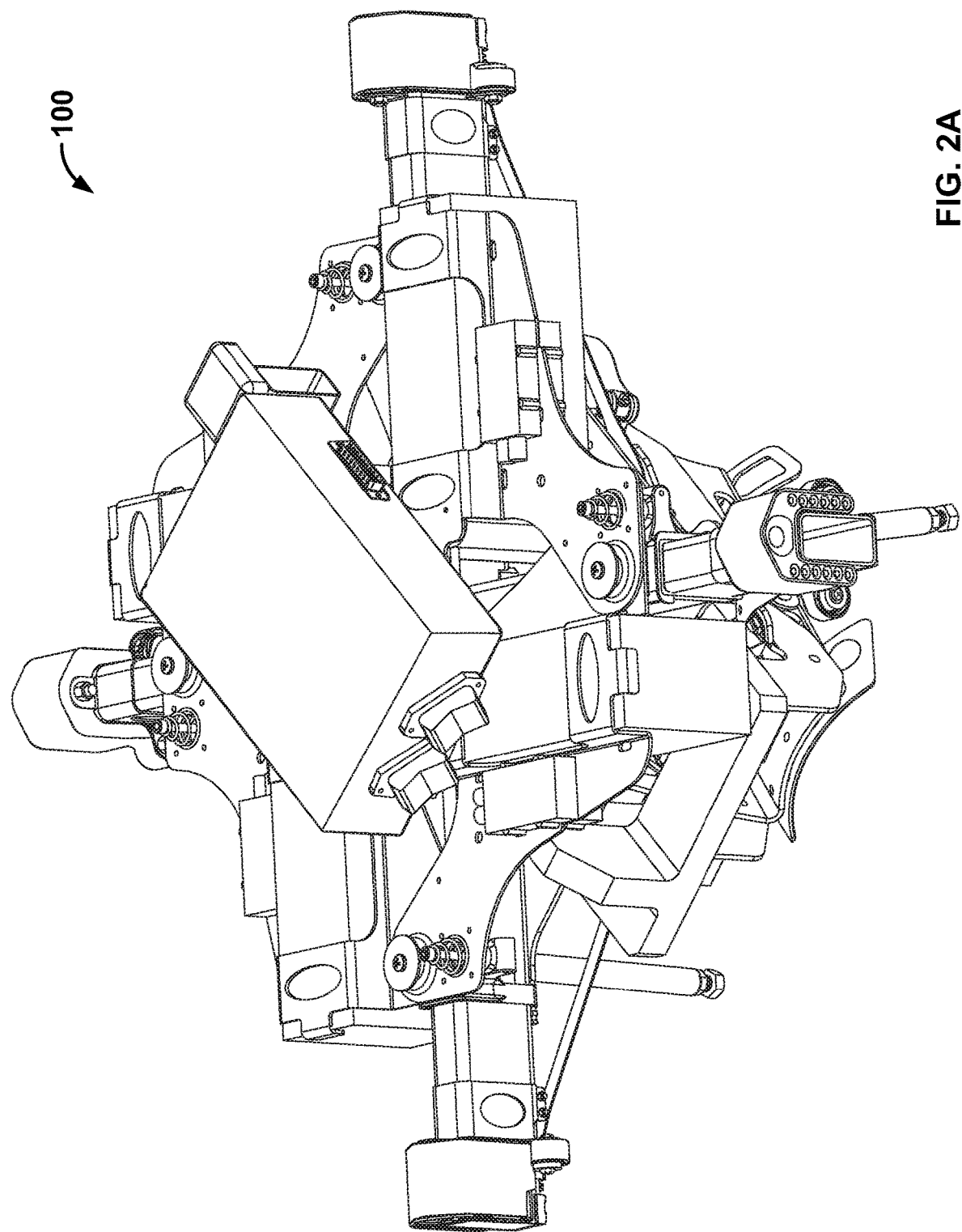
FIG. 2A is a top perspective view of the hub module of the multicopter of FIG. 1A.
Figure 2B:
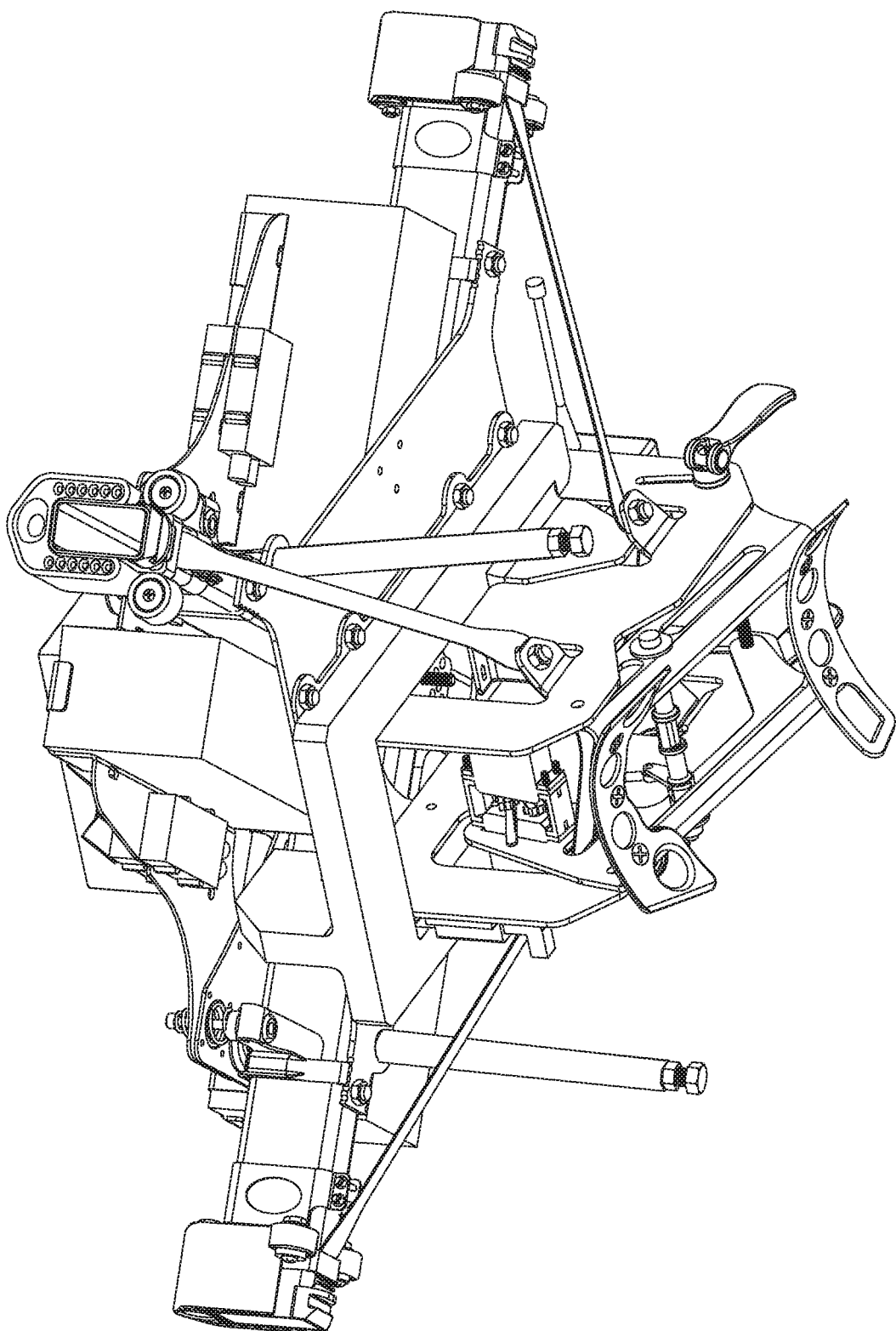
FIG. 2B is a bottom perspective view of the hub module of FIG. 2A.
Figure 2C:
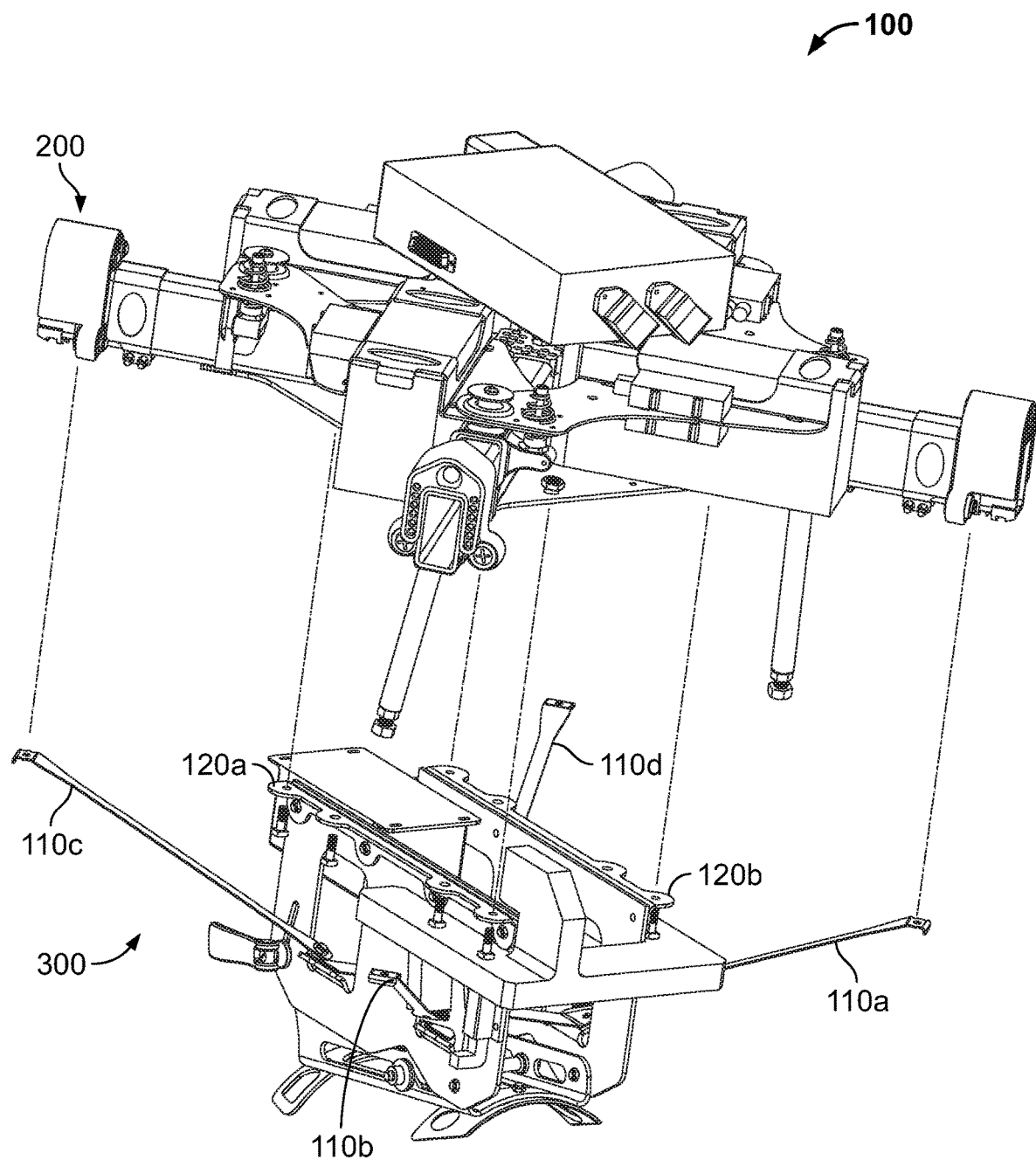
FIG. 2C is a partially exploded top perspective view of the hub module of FIG. 2A showing the hub base separated from the saddle.

FIGS. 2A, 2B, and 2C show the hub module 100. The hub module 100: (1) serves as the attachment point for the rotor arm modules 400a to 400d; (2) is the portion of the multicopter 10 to which the fixed-wing aircraft 20 is attached for launch; (3) is the portion of the multicopter 10 to which the flexible capture member 5000 is attached for retrieval of the fixed-wing aircraft 20; (4) includes the power source for the multicopter 10; and (5) includes certain components used to control operation of the multicopter 10.

As best shown in FIG. 2C, the hub module 100 includes a hub base 200 and a saddle 300. The saddle 300 is attached to the underside of the hub base 200 via two brackets 120a and 120b and four struts 110a, 110b, 110c, and 110d. Each strut 110 is attached at one end to the hub base 200 and at the other end to the saddle 300. This is merely one example of how the saddle can be attached to the hub base, and in other embodiments the saddle may be attached to the hub base in any suitable manner. For instance, in another embodiment, rather than being attached to the hub base, each strut is attached to a different rotor arm module, such as to one of the rotor motor assemblies of the rotor arm modules.

1.1.1 Hub Base

FIGS. 3A, 3B, 3C, 3D, 3E, 3F, 3G, and 3H show the hub base 200 or components thereof. The hub base 200 is the portion of the hub module 100 that: (1) serves as the attachment point for the rotor arm modules 400a to 400d; (2) includes the power source for the multicopter 10; and (3) includes certain components used to control operation of the multicopter 10.

Figure 3A:
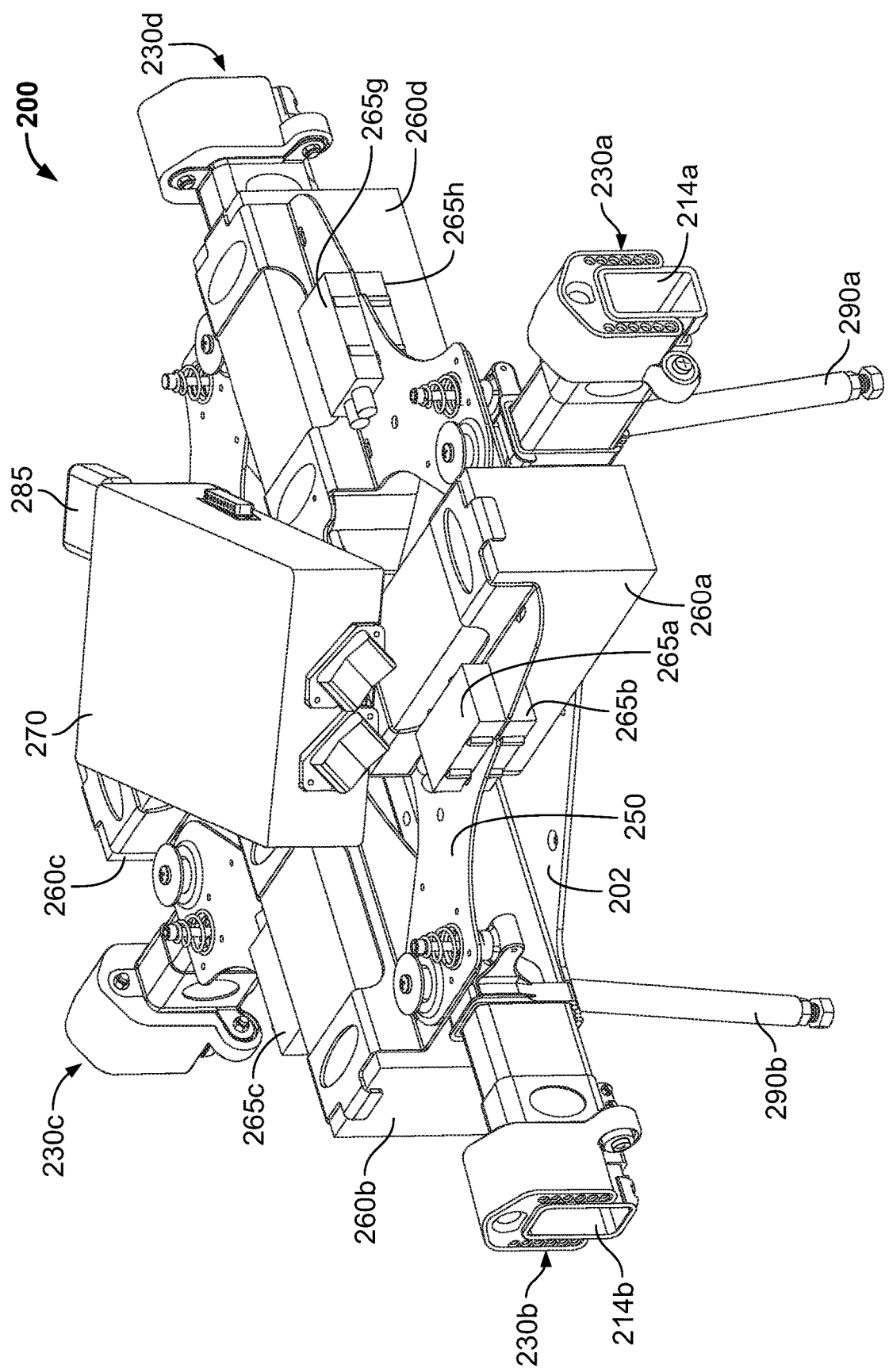
FIG. 3A is a top perspective view of the hub base of the hub module of FIG. 2A.
Figure 3B:
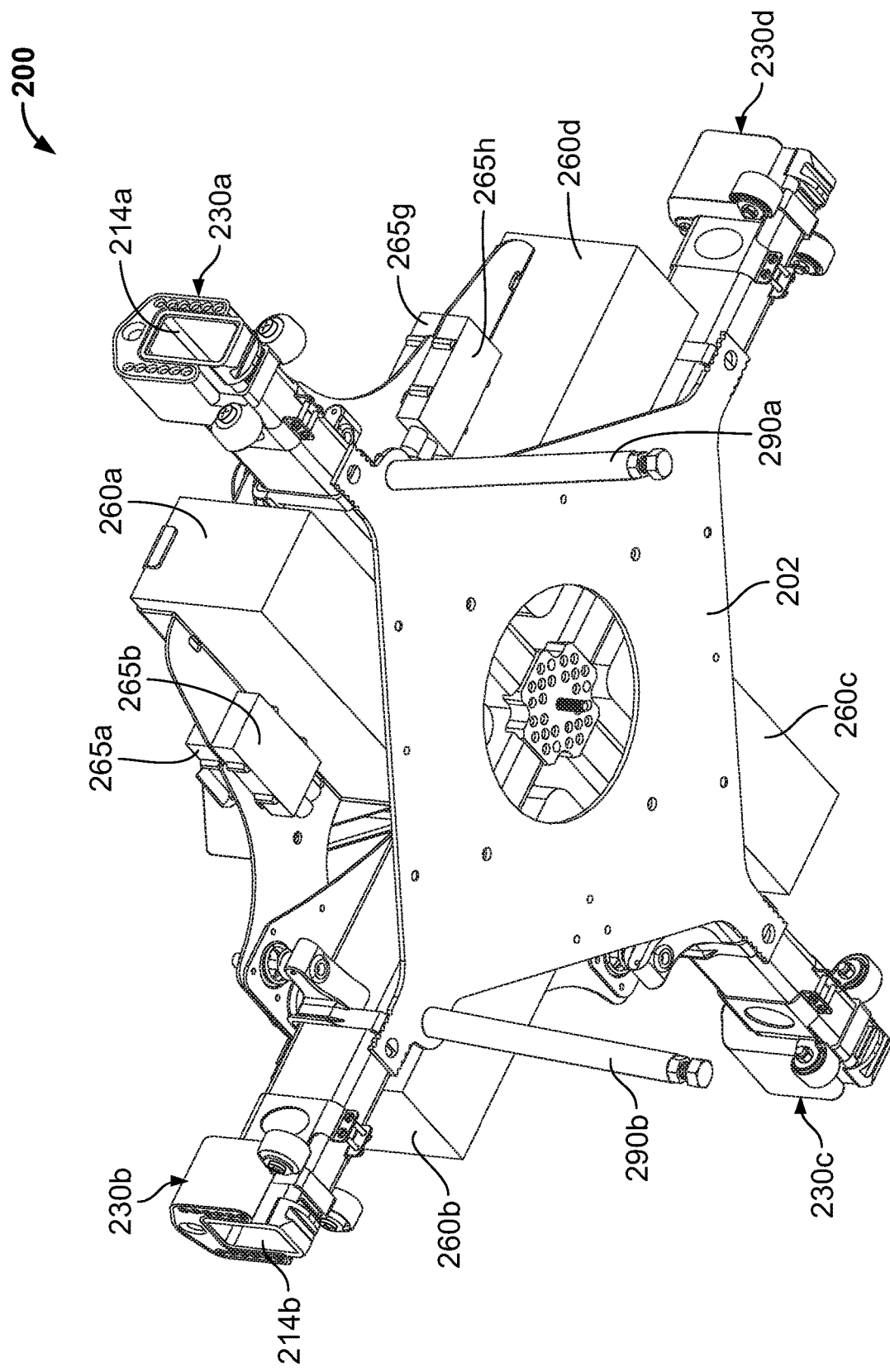
FIG. 3B is a bottom perspective view of the hub base of FIG. 3A.
Figure 3C:
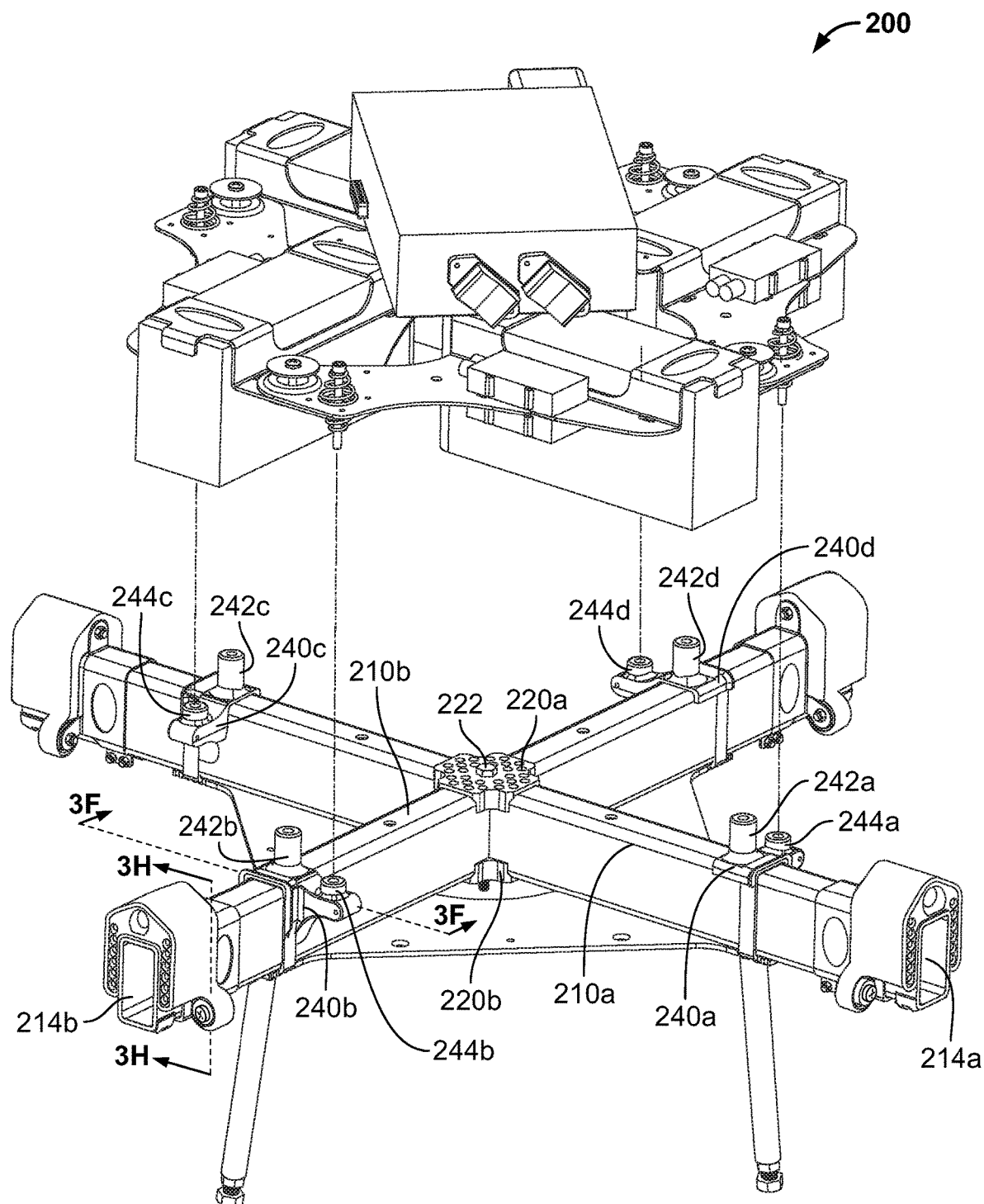
FIG. 3C is a partially exploded top perspective view of the hub base of FIG. 3A.
Figure 3D:
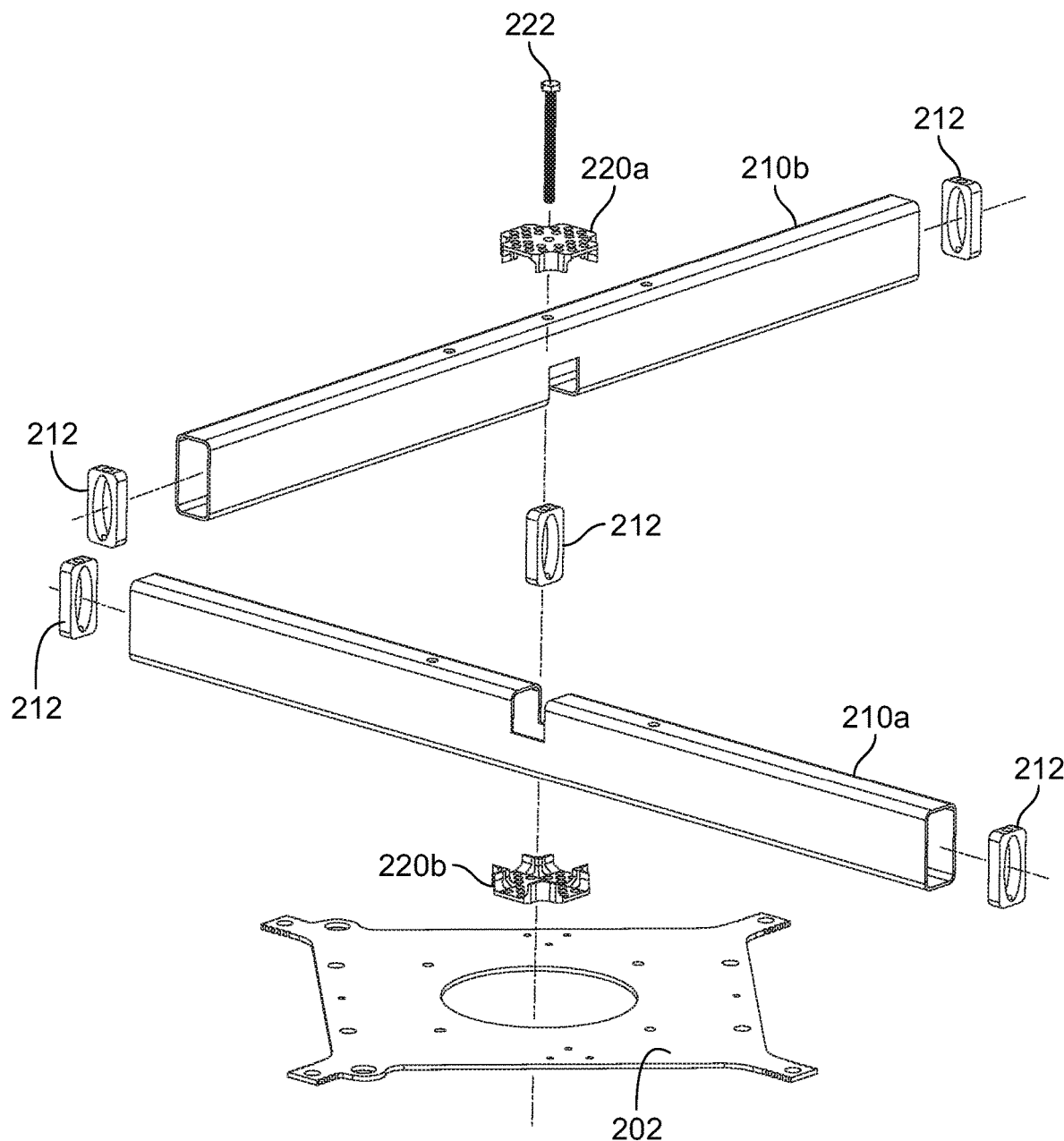
FIG. 3D is an exploded top perspective view of the supports and associated mounting hardware of the hub base of FIG. 3A.

As best shown in FIGS. 3C and 3D, the hub base 200 includes two hollow elongated rectangular supports 210a and 210b. The hollow supports 210a and 210b interlock with one another near their centers such that the hollow supports 210a and 210b are oriented transversely (such as generally perpendicularly) to one another and generally form a cross shape when viewed from above or below. Reinforcing plugs 212 are disposed within the hollow supports 210a and 210b such that fastener receiving openings (not labeled) of the reinforcing plugs 212 vertically align with fastener receiving openings (not labeled) of the hollow supports 210a and 210b. Upper and lower braces 220a and 220b sandwich the hollow supports 210a and 210b. A fastener 222 threaded through the upper brace 220a, the hollow support 210a, the reinforcing plug 212, the hollow support 210b, and the lower brace 220b holds the upper and lower braces 220a and 220b and the hollow supports 210a and 210b together. This ensures the hollow supports 210a and 210b remain interlocked and ensures their orientation with respect to one another does not substantially change.

The hollow supports 210a and 210b are attached to a hub base plate 202 via suitable fasteners (not labeled) threaded through the hollow supports 210a and 210b and the reinforcing plugs 212 disposed within the hollow supports 210a and 210b. As best shown in FIG. 3B, two stabilizers 290a and 290b are attached to and extend downward from either hollow support 210a and 210b. The free ends of the stabilizers 290a and 290b terminate in feet configured to contact the fixed-wing aircraft 20 to help prevent the fixed-wing aircraft 20 from rotating about its roll axis relative to the multicopter 10. The feet are adjustable in length (e.g., are threaded such that they can be shortened by threading further into the stabilizers or lengthened by unthreading further out of the stabilizers).

As best shown in FIG. 3C, first and third isolator plate mounts 240a and 240c are attached (such as via lashing) to the hollow support 210a and second and fourth isolator plate mounts 240b and 240d are attached (such as via lashing) to the hollow support 210b radially inward of the ends of the hollow supports 210a and 210b. Each isolator plate mount 240 includes a first isolator plate mounting post 242 defining a threaded fastener receiving opening at least partially therethrough and a second isolator plate mounting post 244 defining a threaded fastener receiving opening at least partially therethrough.

Figure 3E:
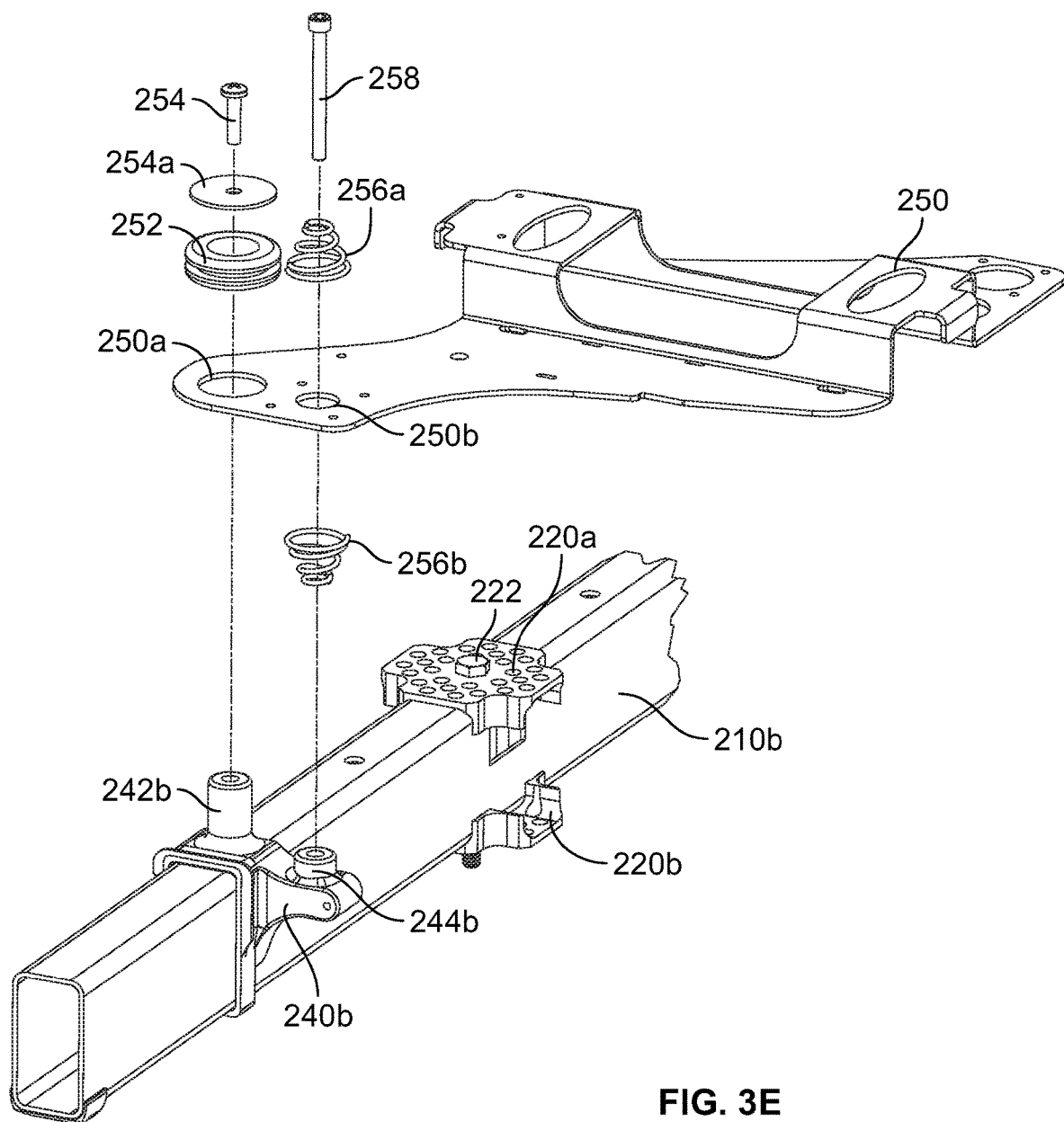
FIG. 3E is an exploded top perspective view of the isolator plate and associated mounting hardware of the hub base of FIG. 3A.
Figure 3F:
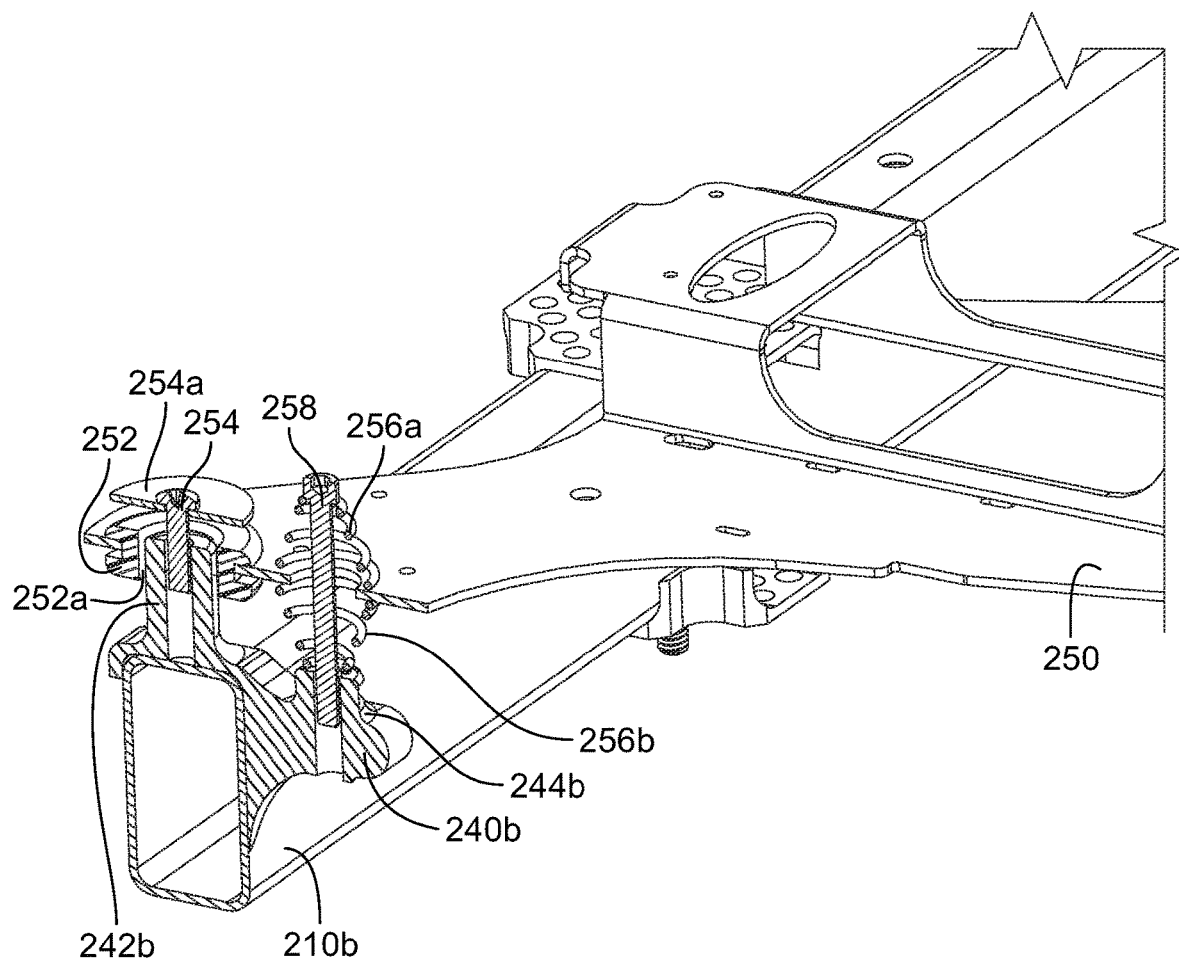
FIG. 3F is a partial cross-sectional view of one of the isolator plate mounts of the hub base of FIG. 3A taken substantially along line 3F-3F of FIG. 3C.

An isolator plate 250 is slidably mounted to the isolator plate mounts 240a, 240b, 240c, and 240d. FIGS. 3E and 3F show how the isolator plate 250 is mounted to the isolator plate mount 240b. For simplicity and brevity, illustrations of how the isolator plate 250 is mounted to the remaining three isolator plate mounts 240a, 240c, and 240d in a similar manner are not provided.

The isolator plate 250 defines first and second mounting openings 250a and 250b therethrough. An elastomeric grommet 252 is installed in the first mounting opening 250a of the isolator plate 250. The grommet 252 defines a first isolator plate mounting post receiving channel 252a therethrough, and the first isolator plate mounting post 242b is slidably received in the first isolator plate mounting post receiving channel 252a. A fastener 254 having a stop washer 254a beneath its head is partially threaded into the fastener receiving opening of the first isolator plate mounting post 242b. Upper and lower conical springs 256a and 256b—held in place by a fastener 258 partially threaded into the fastener receiving opening of the second isolator plate mounting post 244b—sandwich the isolator plate 250.

The hollow support 210b and the stop washer 254a constrain the vertical movement of the isolator plate 250. In other words, the isolator plate 250 can move vertically between a lower position in which the grommet 252 contacts the hollow support 210b and an upper position in which the grommet 252 contacts the stop washer 254a. The conical springs 256a and 256b act as a suspension that absorbs (or partially absorbs) vibrations of the hollow support 210b that would otherwise be directly transferred to the isolator plate 250, which could affect operation of certain components of the multicopter 10 (such as the autopilot 272).

The relatively high mass of the batteries 260a to 260d and the fact that they are mounted to the isolator plate 250 and close-coupled to the autopilot 272 (which includes an inertial measurement unit (IMU)) works with the suspension to help prevent undesired vibration of the isolator plate 250 and therefore the autopilot 272. In certain embodiments, tor the autopilot 272 to perform well, the IMU must resolve accelerations on the order of 0.1 gee and rotations of 0.1 radians/second. In various embodiments, the autopilot 272 cannot do this reliably when (~10-gee) vibration, caused by rotor unbalance, for example, is transmitted from the airframe of the multicopter 10 to the IMU. When the mass of the batteries 260a to 260d is used to ballast the IMU on the isolator plate 250, and the isolator plate 250 is anchored to the airframe structure through the suspension, the IMU enjoys the vibration-free mounting location. By mounting the isolator plate 250 well-outboard at its corners, the IMU remains sufficiently well-coupled to the airframe that pitch and roll movements are transmitted to the IMU, which is able to effectively resolve these motions.

As best shown in FIGS. 3A and 3B, The following components are mounted to the isolation plate 250: (1) the batteries 260a, 260b, 260c, and 260d (which are received in respective battery receivers (not labeled) configured to retain the batteries and to electrically connect the batteries to components of the multicopter to power those components); (2) the ESCs 265a to 265h; (3) an avionics enclosure 270 that houses a variety of components including the autopilot 272, the telemetry link 274, and the R/C receiver 276; (4) a GPS antenna mounting bracket 280 on which the GPS antenna 285 is mounted; (5) navigation lights (not shown); and (6) a Mode C transponder (not shown).

The four open ends of the hollow supports 210a and 210b form rotor arm module receiving sockets that can receive one of the rotor arm modules 400a to 400d. Specifically, the hollow support 210a forms a first rotor arm module receiving socket 214a and a third rotor arm module receiving socket (not shown) and the hollow support 210b forms a second rotor arm module receiving socket 214b and a fourth rotor arm module receiving socket (not shown).

As best shown in FIG. 3A, female blind mate assemblies 230 are attached to the ends of the hollow supports 210a and 210b. Specifically, a first female blind mate assembly 230a is attached to one end of the hollow support 210a near the first rotor arm module receiving socket 214a, a second female blind mate assembly 230b is attached to one end of the hollow support 210b near the second rotor arm module receiving socket 214b, a third female blind mate assembly 230c is attached to the other end of the hollow support 210a near the third rotor arm module receiving socket 214c, and a fourth female blind mate assembly 230d is attached to the other end of the hollow support 210b near the fourth rotor arm module receiving socket 214d.

The female blind mate assemblies 230 (along with the corresponding male blind mate connectors described below with respect to the rotor arm modules) facilitate: (1) mechanical attachment of the rotor arm modules 400a, 400b, 400c, and 400d to the hub module 100; (2) power flow from the battery(ies) 260a, 260b, 260c, and/or 260d to the rotor motors 465a to 465h of the rotor arm modules 400a, 400b, 400c, and 400d; and (3) communication between the ESCs 265a to 265h and the rotor motors 465a to 465h.

Figure 3G:
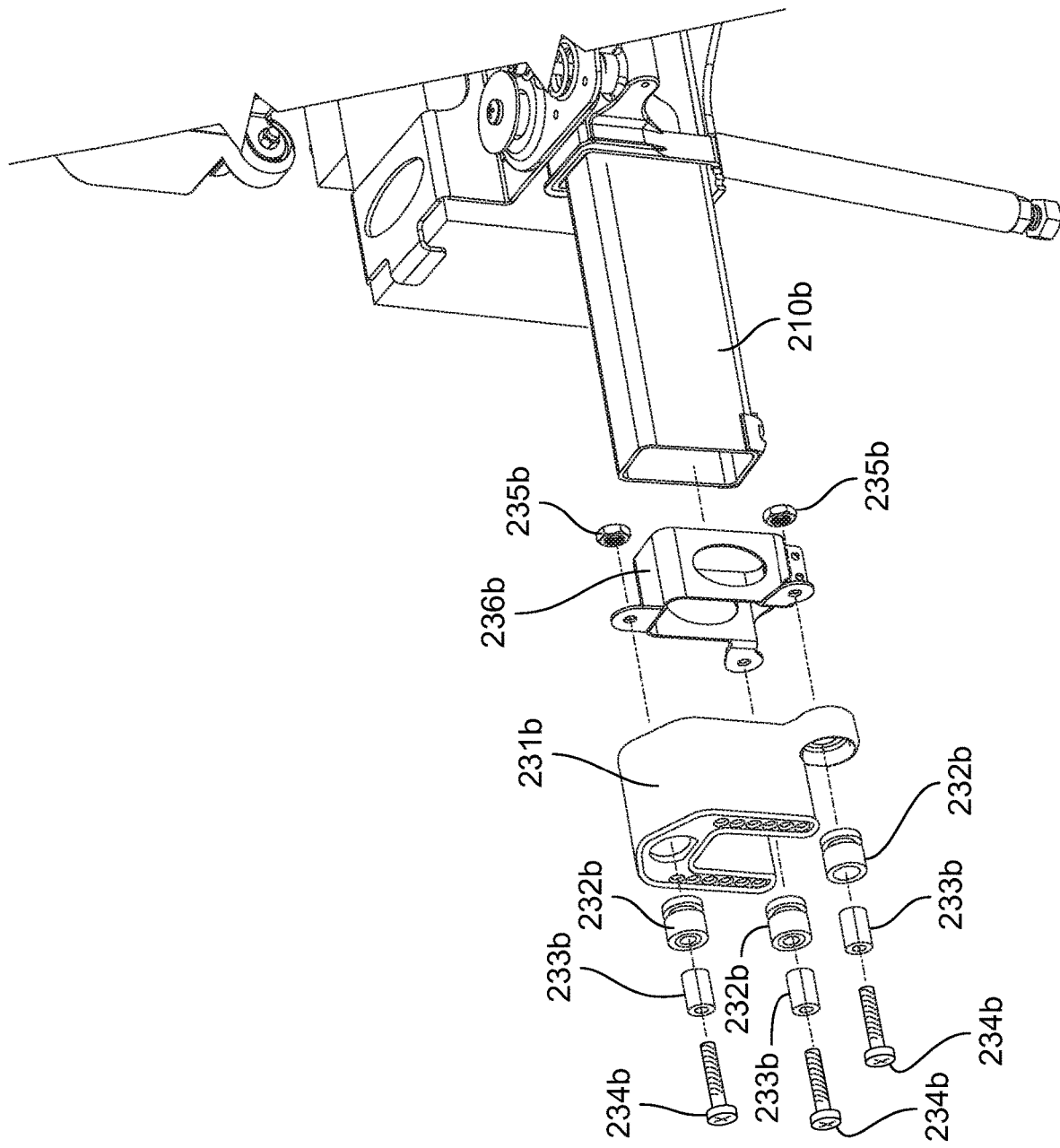
FIG. 3G is a partially exploded top perspective view of one of the female blind mate assemblies of the hub base of FIG. 3A.
Figure 3H:
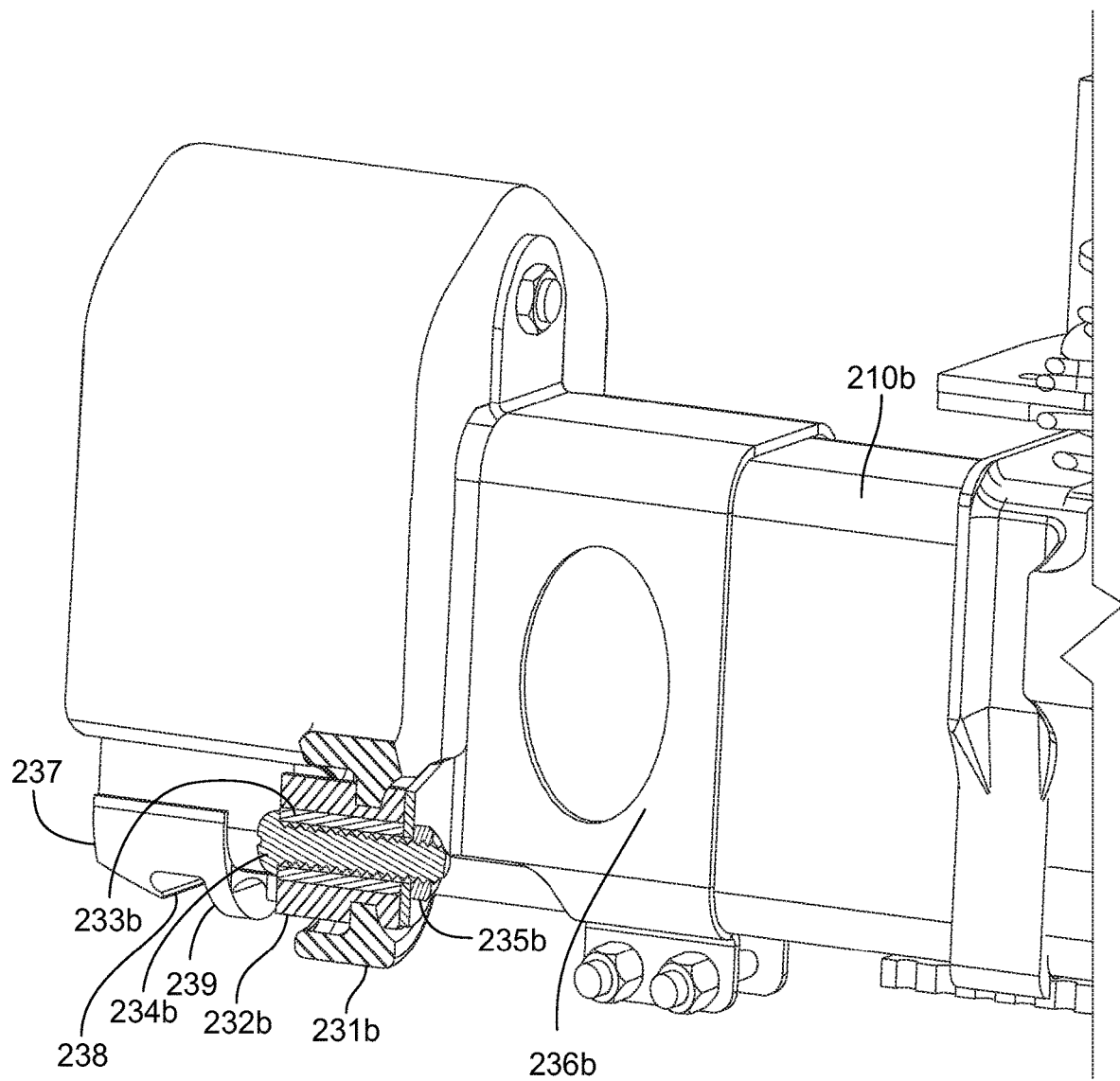
FIG. 3H is a partial cross-sectional view of one of the flexural mounts of the female blind mate assembly of FIG. 3G taken substantially along line 3H-3H of FIG. 3C.

FIGS. 3G and 3H show the second female blind mate assembly 230b. The female blind mate assemblies 230a, 230c, and 230d are similar to the second female blind mate assembly 230b and are not separately shown or described for brevity.

The second female blind mate assembly 230b includes: (1) a female blind mate connector 231b including a plurality of pin receptacles (not labeled); (2) three elastomeric grommets 232b; (3) three rigid, hollow cylindrical spacers 233b; (4) three fasteners 234b; (5) three nuts 235b; (6) a mounting bracket 236b; and (7) mounting bracket fasteners (not labeled).

Although not shown for clarity, the female blind mate connector 231b and, particularly, the pin receptacles, are electrically connected to the corresponding ESCs 265c and 265d via wiring. In this example embodiment, the female blind mate connector 231b includes 12 pin receptacles, six of which are connected to the ESC 265c via wiring and the other six of which are connected to the ESC 265d via wiring.

The mounting bracket 236b is positioned at a desired location along the hollow support 210b, and the mounting bracket fasteners are tightened to clamp the mounting bracket 236b in place relative to the hollow support 210b.

The female blind mate connector 231b is flexurally mounted to the mounting bracket 236b via the elastomeric grommets 232b, the spacers 233b, the fasteners 234b, and the nuts 235b. Specifically, the elastomeric grommets 232b are fitted into corresponding cavities in the female blind mate connector 231b. As best shown in FIG. 3H, each cavity includes an inwardly projecting annular rib that fits into a corresponding annular cutout of the corresponding elastomeric grommet 232b. The spacers 233b are disposed within longitudinal bores defined through the elastomeric grommets 232b. The fasteners 234b extend through the hollow spacers 233b and through corresponding fastener receiving openings defined through the mounting bracket 236*b* into their corresponding nuts 235*b*. This secures the female blind mate connector 231*b* to the mounting bracket 236*b*.

This flexural mount of the female blind mate connector to the mounting bracket via the elastomeric grommets is beneficial compared to a rigid connection of the female blind mate connector to the mounting bracket. The flexural mount enables the female blind mate connector to move—via deformation of the elastomeric grommet—relative to the mounting bracket (and the rest of the hub module) when loads are applied to the female blind mate connector, such as loads imposed on the female blind mate connector by the attached rotor arm module during flight. Because the female blind mate connector is not rigidly attached to the corresponding mounting bracket, it is less likely that the pins of the male blind mate connector (described below) received by the pin receptacles of the female blind mate connector will lose electrical contact—causing the multicopter 10 to lose control of at least one of its rotor motors—when loads are applied to the female blind mate connector.

As best shown in FIG. 3H, a latch plate 237 is attached to the underside of each hollow support 210*a* and 210*b* below each female blind mate connector 231 attached thereto. The latch plate 237 includes a claw engager 238 and a backstop 239. The latch plate 237 is described below with respect to the locking assemblies 420 of the rotor arm modules 400*a* to 400*d*.

In some embodiments, the hub module (either the hub base, the saddle, or both) or other elements of the multicopter include ballast to obtain a desired weight distribution and/or provide stability during flight.

1.1.2 Saddle

FIGS. 4A, 4B, 4C, 4D, 4E, 4F, 4G, 4H, 4I, and 4J show the saddle 300 or components thereof. The saddle 300 is the portion of the hub module 100: (1) to which the fixed-wing aircraft 20 is attached for launch; (2) from which the fixed-wing aircraft 20 is detached for launch; and (3) to which the flexible capture member 5000 is attached for retrieval of the fixed-wing aircraft 20. The saddle 300 also enables the operator to vary the pitch angle of the fixed-wing aircraft 20 relative to the multicopter 10.

Figure 4A:
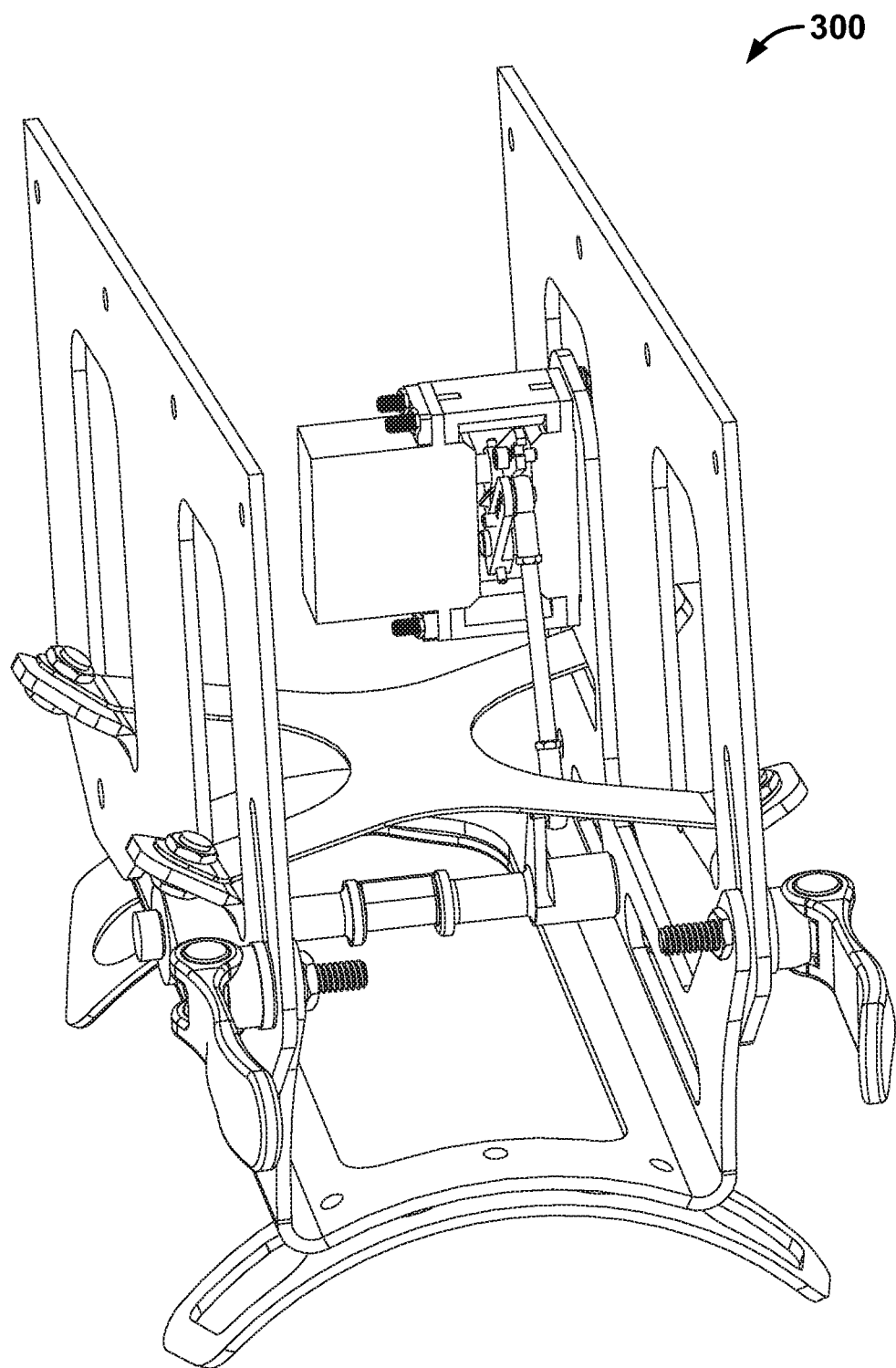
FIG. 4A is a top perspective view of the saddle of the hub module of FIG. 2A.
Figure 4B:
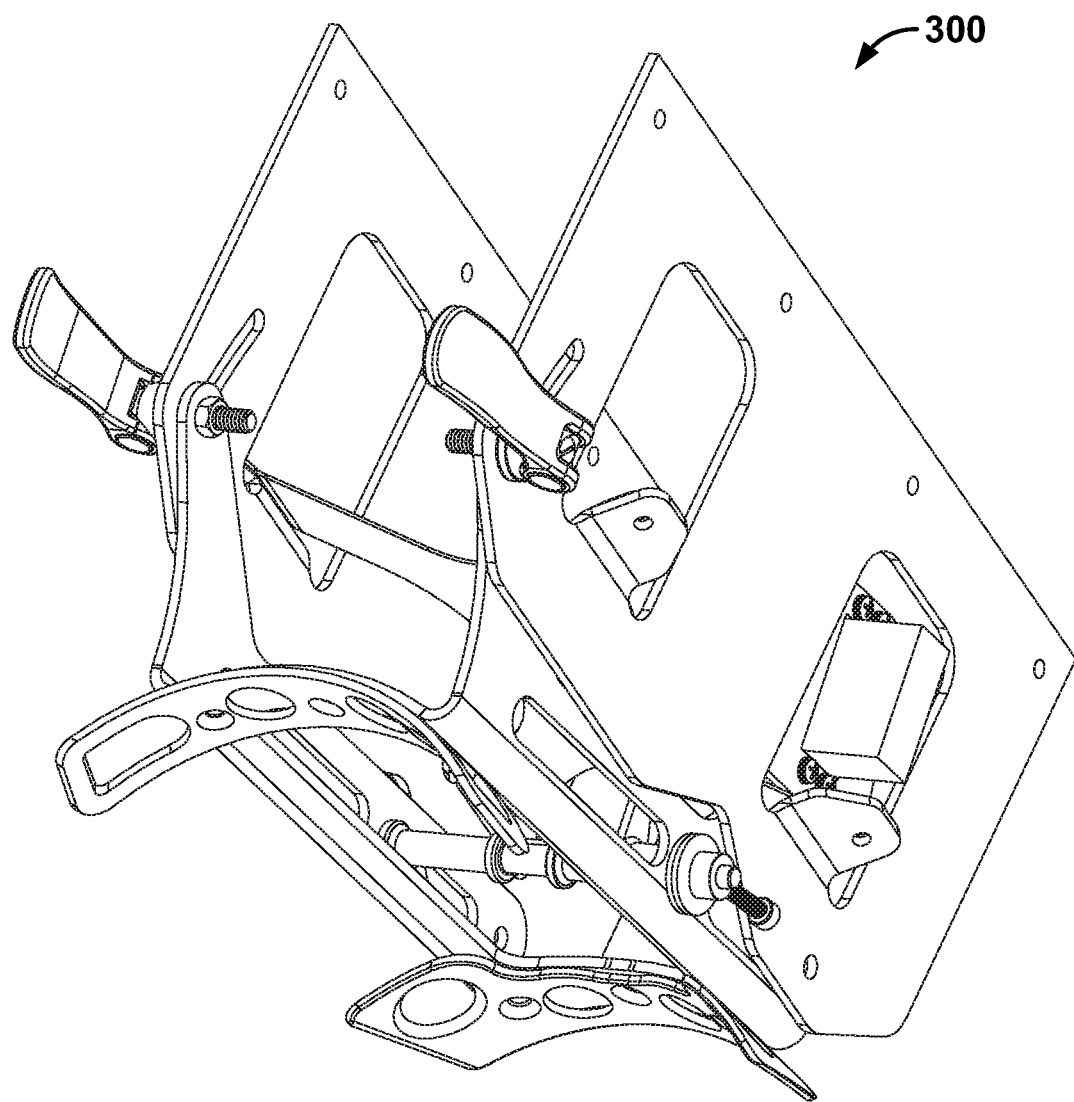
FIG. 4B is a bottom perspective view of the saddle of FIG. 4A.
Figure 4C:
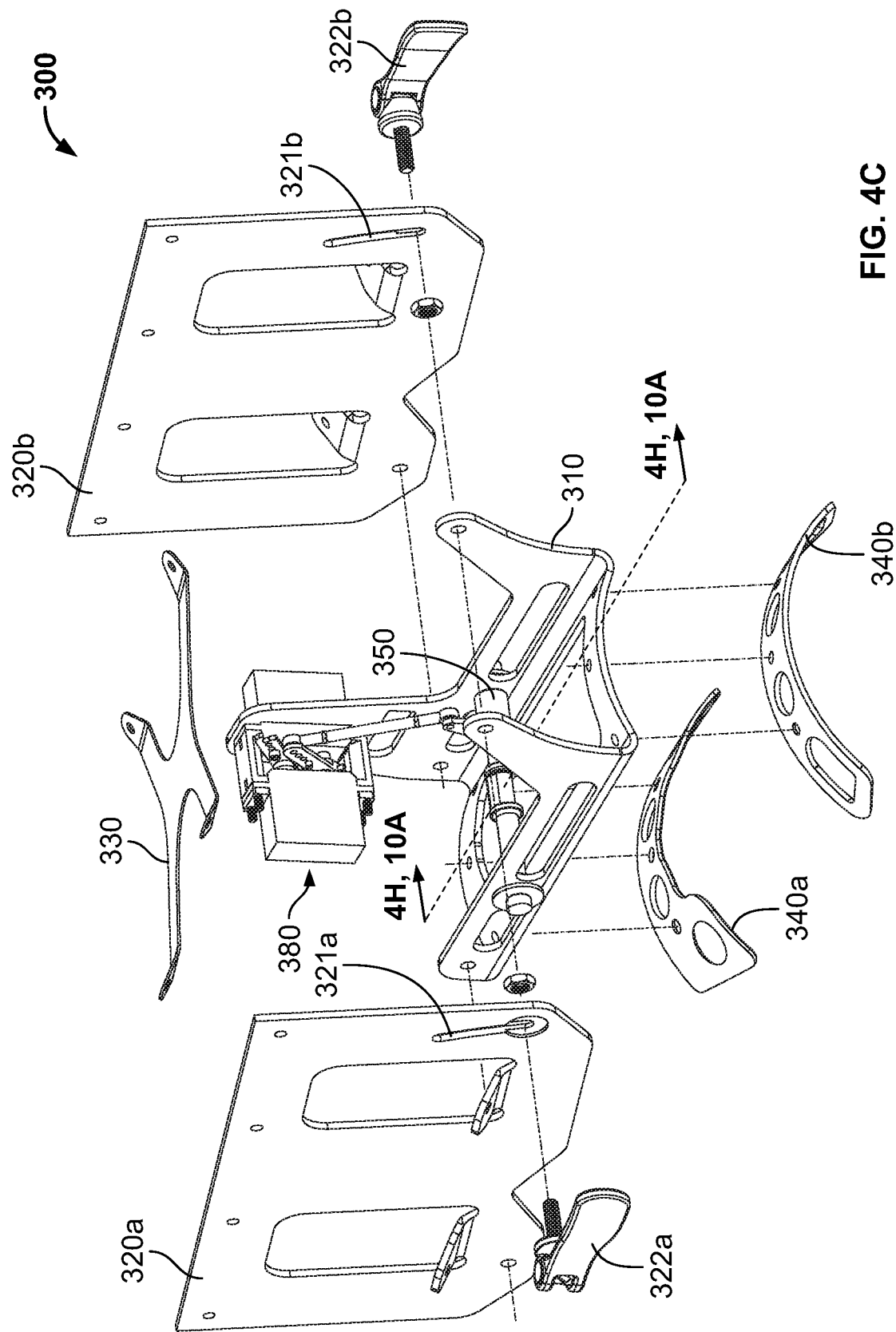
FIG. 4C is a partially exploded top perspective view of the saddle of FIG. 4A.

As best shown in FIG. 4C, the saddle 300 includes a saddle base bracket 310 and first and second saddle side plates 320*a* and 320*b*. The first and second saddle side plates 320*a* and 320*b* are pivotably connected to opposite sides of the saddle base bracket 310 near the front end of the saddle base bracket 310. The first and second saddle side plates 320*a* and 320*b* are also attached to opposite sides of the saddle base bracket 310 near the rear end of the saddle base bracket 310 via locking devices 322*a* and 322*b* (which are cam lever locks in this example embodiment but can be any suitable locking devices). The locking devices 322*a* and 322*b* extend through respective slots 321*a* and 322*b* defined through the respective first and second side plates 320*a* and 320*b*.

Figure 4D:
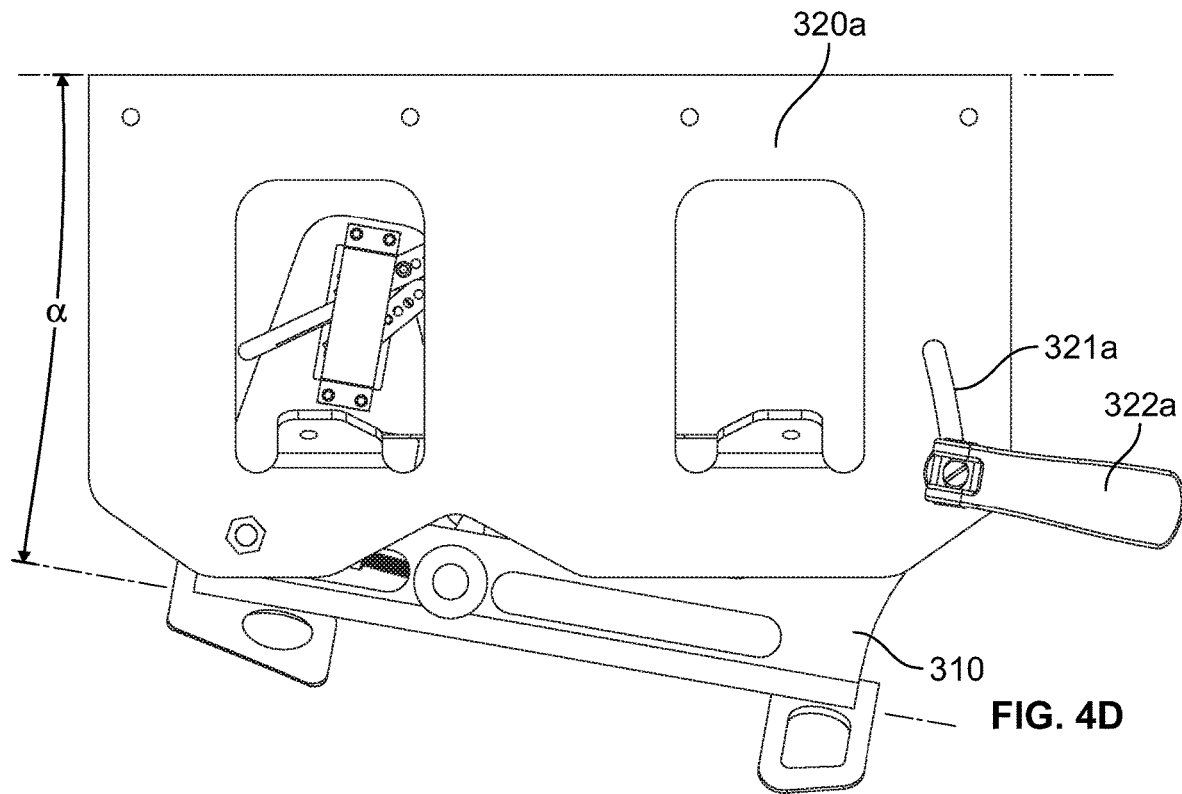
FIGS. 4D and 4E are side elevational views of the saddle of FIG. 4A showing different positions of the saddle.
Figure 4E:
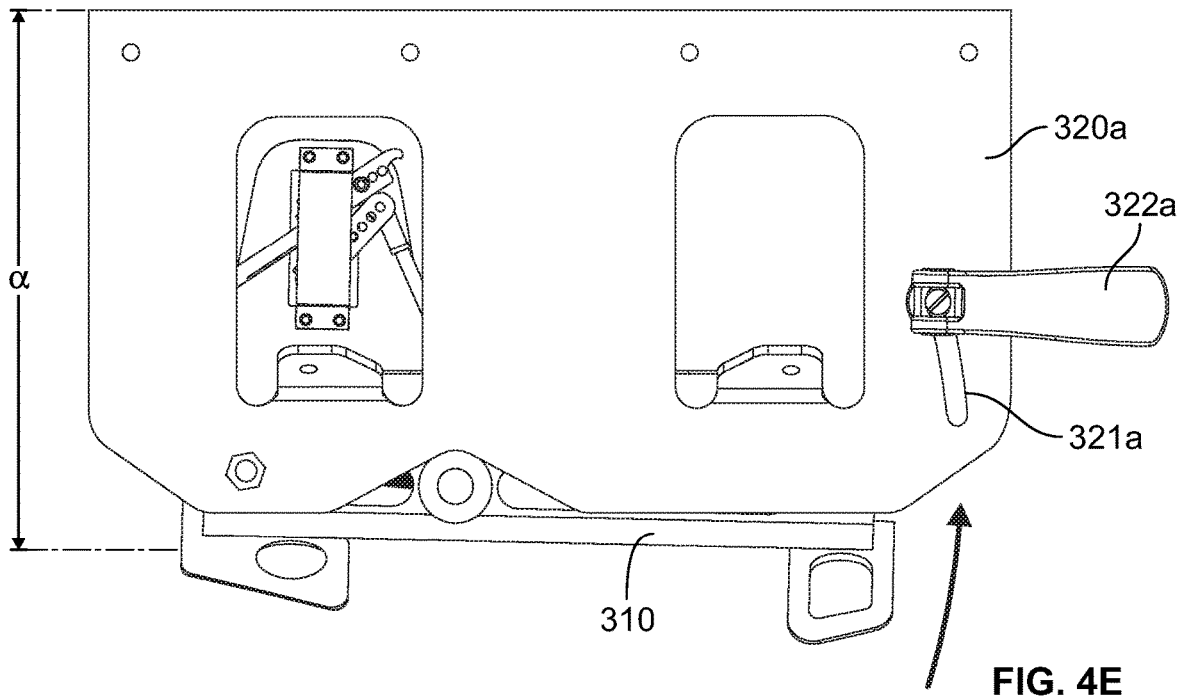

As shown in FIGS. 4D and 4E, the orientation of the slots 321*a* and 321*b* enables an operator to vary the angle α formed between a plane including the tops of the first and second saddle side plates 320*a* and 320*b*—to which the hub base 200 is attached—and a plane including the generally horizontally extending bottom portion of the saddle base plate 310. Plane as used herein can mean either a physical plane or a virtual reference plane. The angle α generally corresponds to the angle formed between the hub base plate 202 of the hub base 200 and the fuselage of the fixed-wing aircraft 20 when the fixed-wing aircraft 20 is attached to the saddle 300. To change the angle α, the operator unlocks the locking devices 322*a* and 322*b*, rotates the first and second side plates 320*a* and 320*b* relative to the saddle base bracket 310 around their pivotable attachments to the saddle base bracket 310 to the desired rotational position (or vice-versa), and re-locks the locking devices 322*a* and 322*b*. In this example embodiment, the angle α is variable from about 0 degrees to about 10 degrees, though in other embodiments the angle α is variable between any suitable angles.

In certain embodiments, an operator can cause the first and second side plates to rotate relative to the saddle while the multicopter 10 is flying. For instance, the operator may desire to release the fixed-wing aircraft nose-down from a hover. Conversely, the operator may desire to release the fixed-wing aircraft nose-up (such as nose-up about 10 degrees) to facilitate launch while the multicopter is dashing forward (this nose-up pitch reduces wind drag and better-aligns the thrust vector of the fixed-wing aircraft with the desired direction of travel). The multicopter may include any suitable combination of elements to facilitate this remote pivoting, such as various motors, actuators, and the like.

As best shown in FIGS. 4A, 4B, and 4C, a stabilizing bracket 330 is attached to the first and second saddle side plates 320*a* and 320*b* and extends across the space between the first and second saddle side plates 320*a* and 320*b*. A downwardly curved front aircraft engaging bracket 340*a* is attached to the underside of the saddle base bracket 310 near the front of the saddle base bracket 310. A downwardly curved rear aircraft engaging bracket 340*b* is attached to the underside of the saddle base bracket 310 near the rear of the saddle base bracket 310.

Figure 4F:
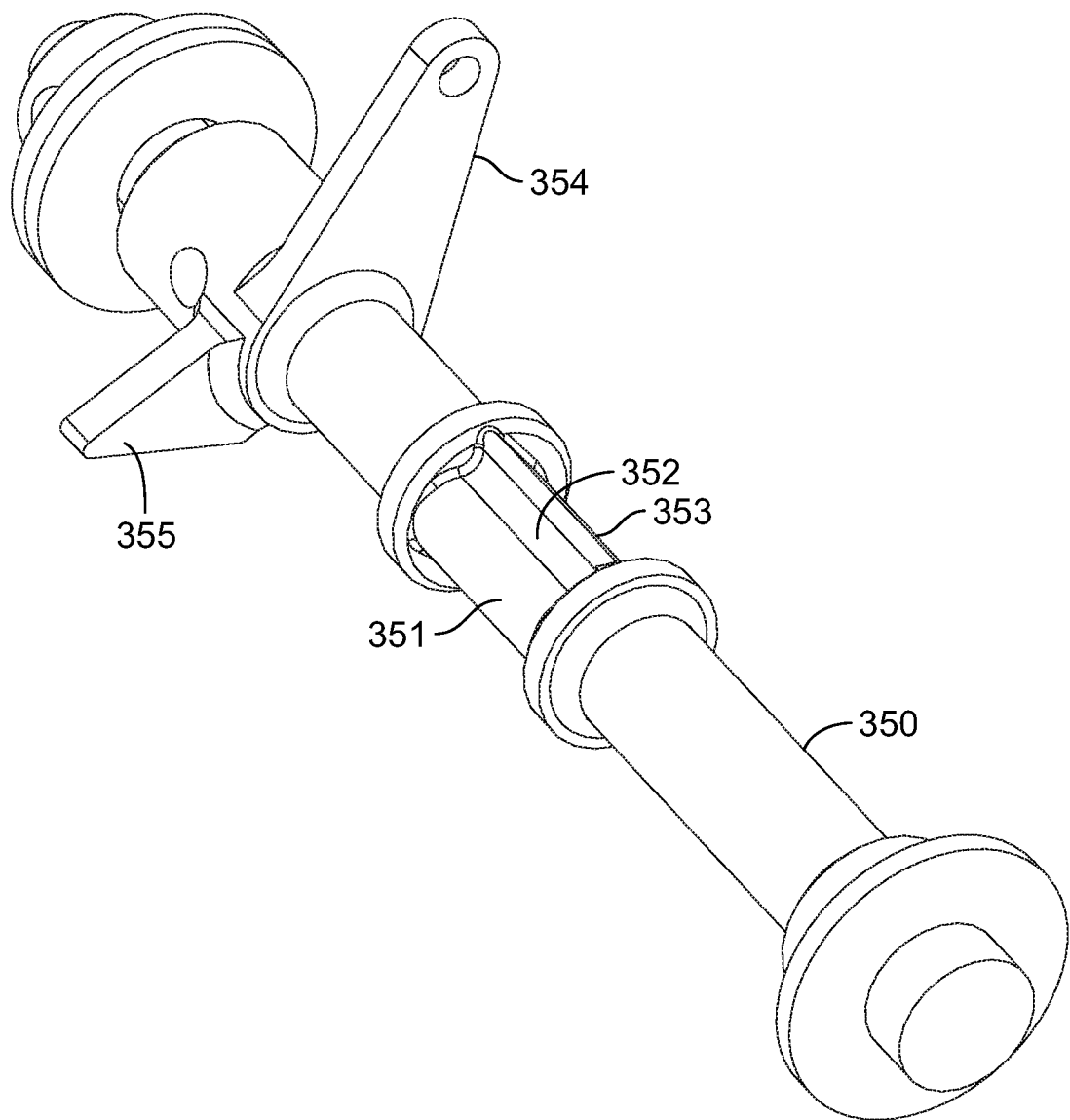
FIG. 4F is a top perspective view of the cam of the saddle of FIG. 4A.
Figure 4G:
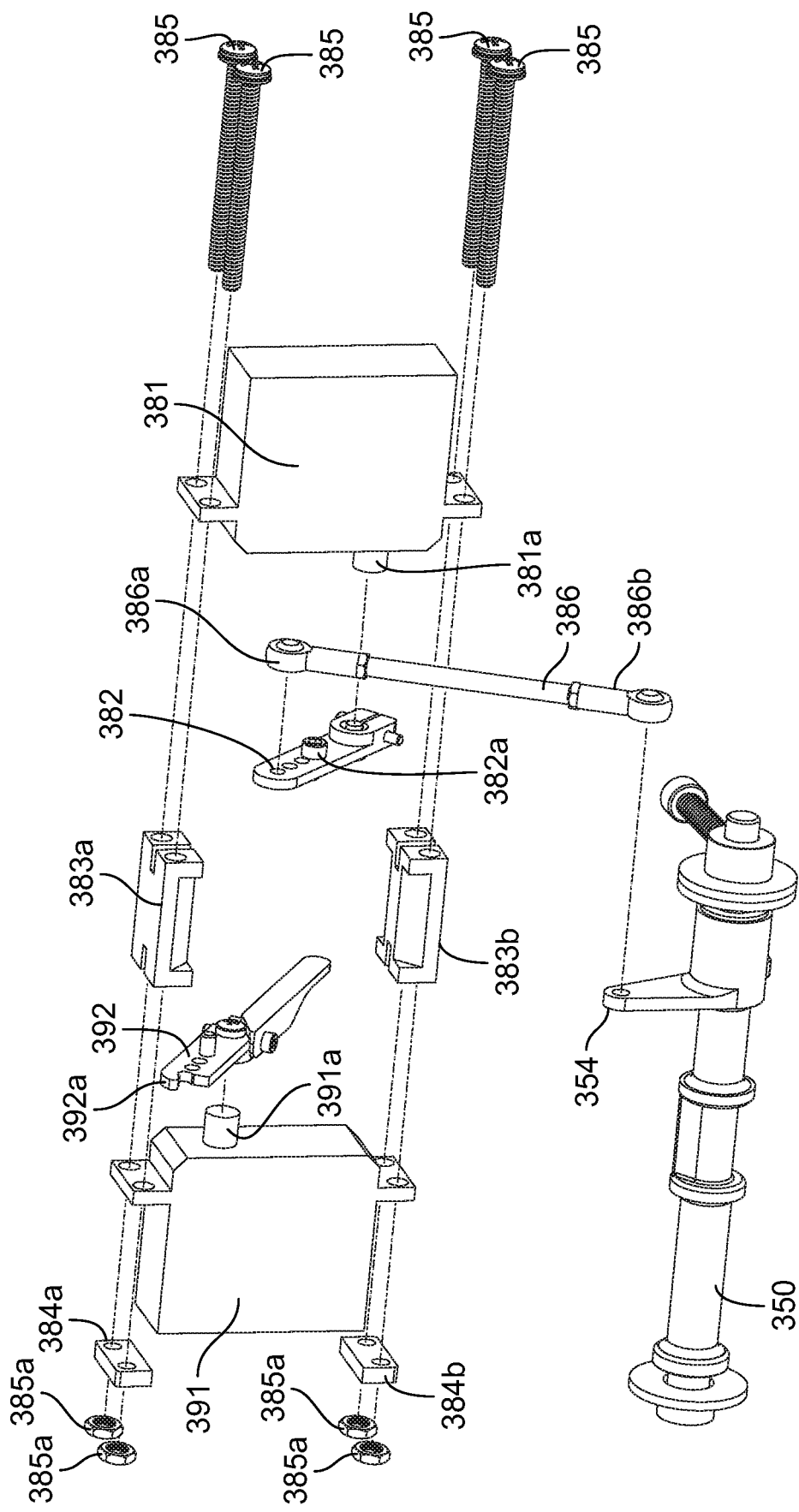
FIG. 4G is an exploded top perspective view of the aircraft attaching/detaching assembly and the cam of the saddle of FIG. 4A.
Figure 4H:
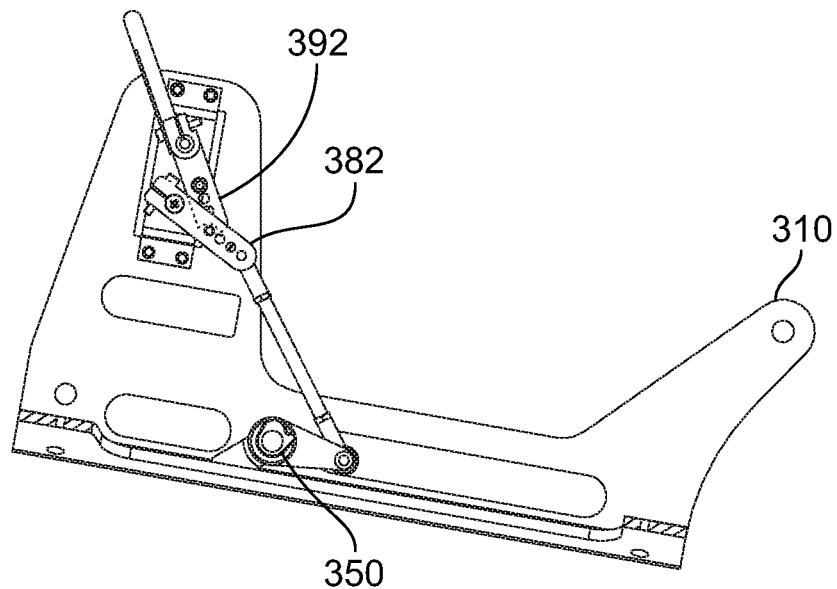
FIG. 4H is a partial cross-sectional view of the saddle of FIG. 4A taken substantially along line 4H-4H of FIG. 4C.
Figure 4I:
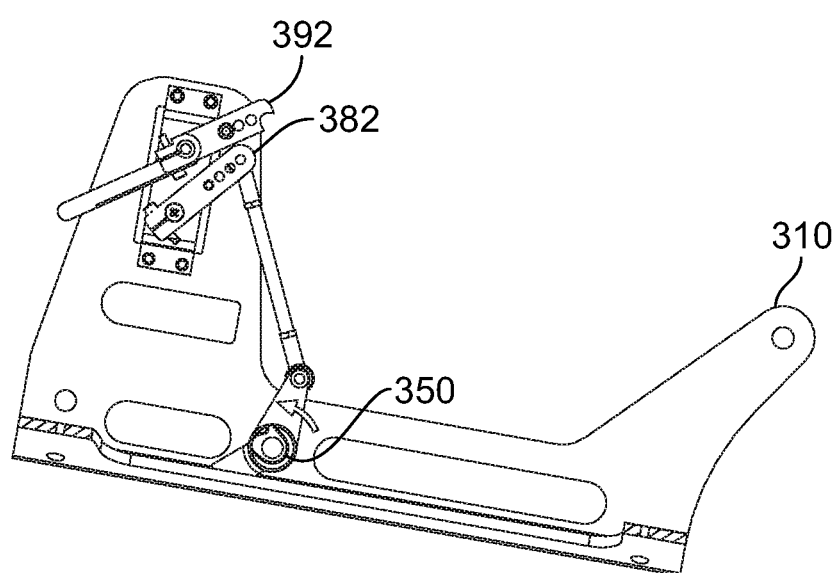
FIG. 4I is a partial cross-sectional view of the saddle of FIG. 4A showing the cam in a detached rotational position taken substantially along line 4H-4H of FIG. 4C.

As best shown in FIG. 4C, a cam 350 is rotatably attached to and extends across the width of the saddle base bracket 310 such that the cam 350 is transverse (such as generally perpendicular) to the first and second saddle side plates 320*a* and 320*b*. As best shown in FIGS. 4F, 4H, and 4I, the portion of the cam 350 near its longitudinal center has an irregularly shaped profile including a first relatively wide ridge 351, a second relatively narrow ridge 353, and a valley 352 between the first and second ridges 351 and 353. This irregularly shaped profile facilitates attaching the fixed-wing aircraft 20 to the cam 350 (and therefore to the multicopter 10) and detaching the fixed-wing aircraft 20 from the cam 350 (and therefore from the multicopter 10), as described below with respect to FIGS. 10A, 10B, and 10C. The cam 350 also includes a cam control arm 354 and a foot 355 extending transversely (such as generally perpendicularly) from the longitudinal axis of the cam 350.

An aircraft attaching/detaching assembly 380 attached to the saddle base bracket 310 controls rotation of the cam 350 relative to the saddle base bracket 310. As best shown in FIG. 4G, the aircraft attaching/detaching assembly 380 includes: (1) a cam servo motor 381 having a cam servo motor shaft 381*a*; (2) a cam servo motor arm 382; (3) a cam servo motor arm lock device 382*a*; (4) upper and lower servo spacers 383*a* and 383*b*; (5) upper and lower nut plates 384*a* and 384*b*; (6) fasteners 385; (7) a cam rotation control link 386 having connectors 386*a* and 386*b* at either end; (8) a lock servo motor 391 having a lock servo motor shaft 391*a*; and (9) a lock servo motor arm 392 terminating at one end in a lock servo motor locking extension 392*a*.

The cam servo motor 381 and the lock servo motor 391 are attached to one another and to the saddle base bracket 310 via the fasteners 385, the upper and lower servo spacers 383*a* and 383*b*, and the upper and lower nut plates 384*a* and 384*b*. The cam servo motor arm 382 is attached near one end to the cam servo motor shaft 381*a* and near the other end to the connector 386*a*. The connector 386*b* is attached to the cam control arm 354 of the cam 350, which links the cam servo motor shaft 381a to the cam 350. The cam servo motor arm lock device 382a is attached to the cam servo motor arm 382 between the connector 386a and the cam servo motor shaft 381a. The lock servo motor arm 392 is attached to the lock servo motor shaft 391a. The rearwardly extending portion of the lock servo motor arm 392 terminates in the lock servo motor locking extension 392a, which is engageable to the cam servo motor arm lock device 382a in certain instances.

The cam servo motor 381 controls rotation of the cam 350 relative to the saddle base bracket 310. To rotate the cam 350, the cam servo motor 381 rotates the cam servo motor shaft 381a, which rotates the attached cam servo arm 382, which in turn rotates the cam 350 via the cam rotation control link 386. The cam servo motor 381 can rotate the cam 350 from an attached rotational position—shown in FIG. 4H—to a detached rotational position—shown in FIG. 4I (and vice-versa).

The lock servo motor 391 controls rotation of the lock servo arm 392 between a cam rotation-preventing rotational position—shown in FIG. 4H—and a cam rotation-enabling rotational position—shown in FIG. 4I (and vice-versa). When the cam 350 is in the attached rotational position and the lock servo arm 392 is in the cam rotation-preventing rotational position, the lock servo motor locking extension 392a engages the cam servo motor arm lock device 382a of the cam servo motor arm 382. This prevents the cam servo motor 381 from rotating the cam 350 from the attached rotational position to the detached rotational position.

FIGS. 4H and 4I show how the cam servo motor 381 and the lock servo motor 391 operate to rotate the cam 350 from the attached rotational position to the detached rotational position. Initially, the cam servo motor 381 is in the attached rotational position and the lock servo motor 391 is in the cam rotation-preventing rotational position. Here, the lock servo motor locking extension 392a on the end of the lock servo arm 392 engages the cam servo motor arm lock device 382a of the cam servo motor arm 382.

Since the lock servo motor locking extension 392a is engaged to the cam servo motor arm lock device 382a of the cam servo motor arm 382, the cam servo motor 381 cannot rotate the cam 350 from the attached rotational position to the detached rotational position (counter-clockwise from this viewpoint).

Rotating the cam 350 from the attached rotational position to the detached rotational position is a two-step process. The operator first operates the lock servo motor 391 to rotate the lock servo motor arm 392 into the cam rotation-enabling rotational position (counter-clockwise from this viewpoint). Second, the operator operates the cam servo motor 381 to rotate the cam 350 from the attached rotational position to the detached rotational position (counter-clockwise from this viewpoint).

Figure 10A:
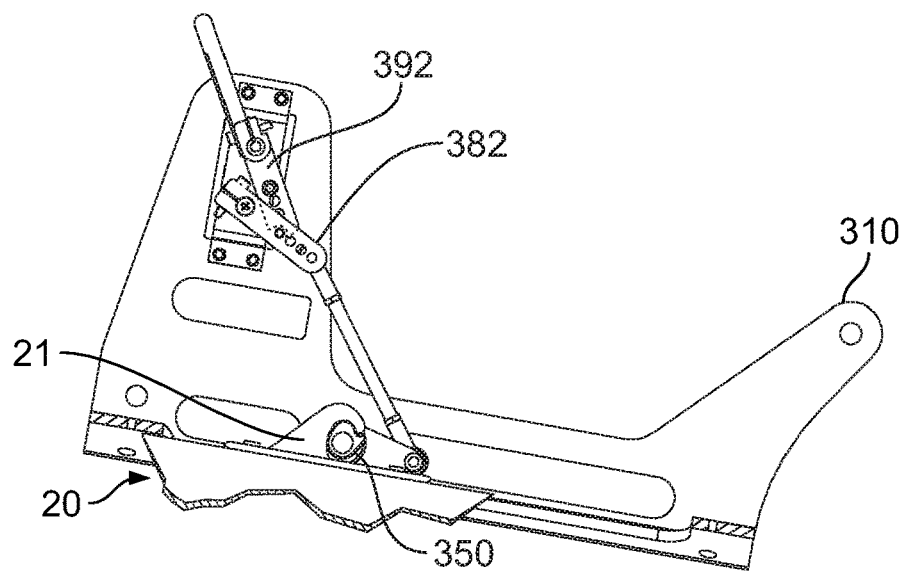
FIG. 10A is a partial cross-sectional view of the saddle of FIG. 4A showing the cam in an attached rotational position and a hook of the fixed-wing aircraft attached taken substantially along line 10A-10A of FIG. 4C.
Figure 10B:
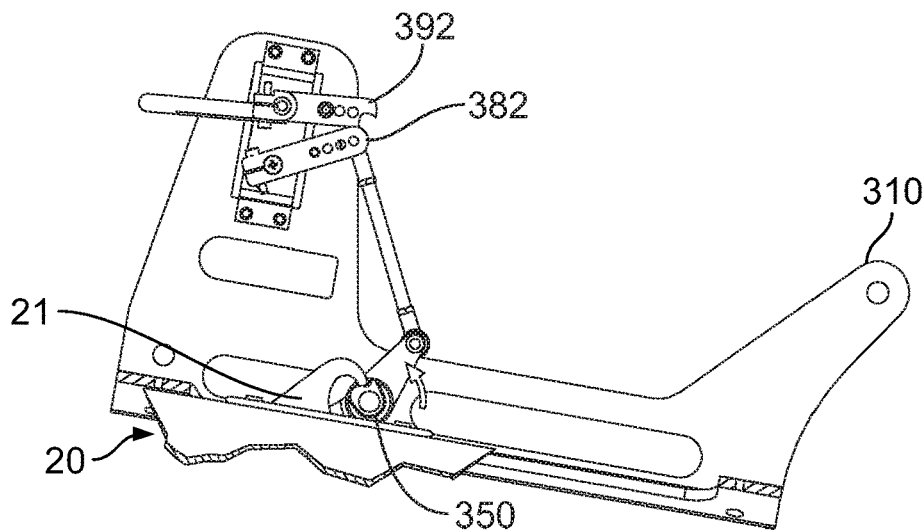
FIG. 10B is a partial cross-sectional view of the saddle of FIG. 4A showing the cam halfway between the attached rotational position and the detached rotational position and the hook of the fixed-wing aircraft being pushed off of the cam taken substantially along line 10A-10A of FIG. 4C.
Figure 10C:
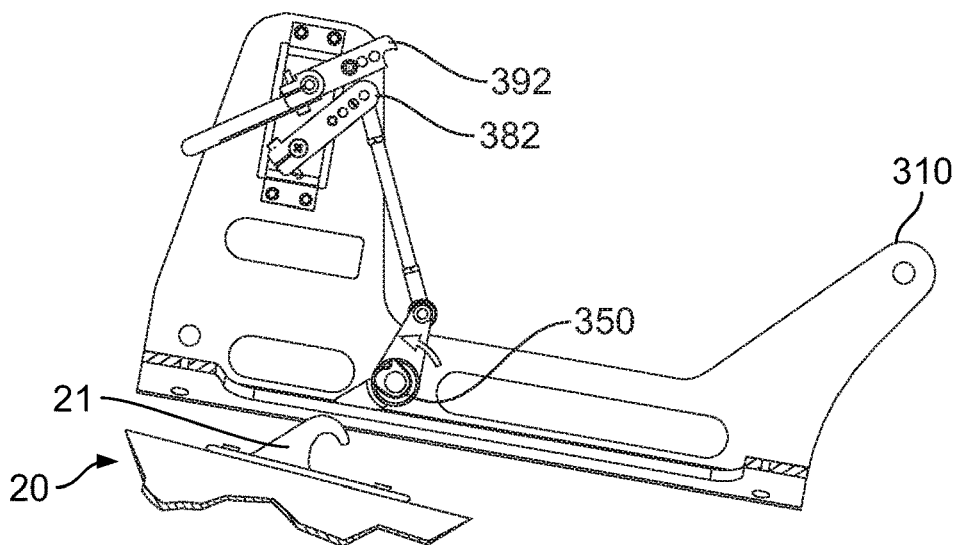
FIG. 10C is a partial cross-sectional view of the saddle of FIG. 4A showing the cam in the detached rotational position and the hook of the fixed-wing aircraft detached from the cam taken substantially along line 10A-10A of FIG. 4C.

FIGS. 10A to 10C, described below, show how rotation of the cam from the attached rotational position to the detached rotational position causes the fixed-wing aircraft to detach from the cam.

The foot 355 controls the extent to which the cam 350 can rotate. The foot 355 is oriented such that when the cam 350 rotates a certain amount in a first direction relative to the saddle base bracket 310, the foot 355 contacts the saddle base bracket 310 and prevents the cam 350 from rotating any further in that first direction. Similarly, when the cam 350 rotates a particular amount in a second opposite direction relative to the saddle base bracket 310, the foot 355 contacts the saddle base bracket 310 and prevents the cam 350 from rotating any further in that second direction. The foot 355 is angled to stop the cam 350 from rotating before it exerts an undue force on the cam rotation control link 386, and by extension the cam motor arm 382 and the cam motor shaft 381a.

1.2 Rotor Arm Modules

The rotor arm modules 400a to 400d are mechanically attachable to and mechanically lockable to the hub module 200 and include: (1) the eight rotors of the multicopter 10; (2) the eight rotor motors that drive these rotors; (3) gear reduction trains that couple the rotor motors to their corresponding rotors; and (4) locking assemblies that lock the rotor arm modules 400a to 400d to the hub module 100.

FIGS. 5A, 5B, 5C, 5D, 5E, 5F, 5G, 5H, 5I, and 5J show the first rotor arm module 400a or components thereof. The other rotor arm modules 400b, 400c, and 400d are similar to the first rotor arm module 400a and are not separately shown or described for brevity.

As best shown in FIGS. 5A, 5B, 5H, and 5J, the first rotor arm module 400a includes: (1) a generally rectangular hollow elongated rotor arm 410a; (2) a generally rectangular hollow rotor arm extension 410b; (3) a locking assembly 420; (4) a male blind mate connector 431; (5) upper and lower rotor motor assemblies 460a and 460b; and (6) a rotor assembly 470.

The rotor arm extension 410b is attached to the rotor arm 410a such that part of the rotor arm extension 410b is disposed within the rotor arm 410a and the remainder of the rotor arm extension 410b extends from the rotor arm 410a. The locking assembly 420 is attached to the underside of the rotor arm 410a near the end of the rotor arm 410a from which the rotor arm extension 410b extends. The male blind mate connector 431 is attached to the end of the rotor arm 410a from which the rotor arm extension 410b extends. The upper and lower rotor motor assemblies 460a and 460b and the rotor assembly 470 are attached to the rotor arm 410a in a manner described in detail below.

Although not shown, the open end of the rotor arm 410a opposite the end from which the rotor arm extension 410b extends forms a first front landing gear extension module receiving socket that can receive the first front landing gear extension module 500a, as described below.

As best shown in FIGS. 5A, 5B, 5C, 5D, 5E, and 5F, the male blind mate connector 431—along with its counterpart female blind mate connector 231a of the hub module 100—facilitate: (1) mechanical attachment of the first rotor arm module 400a to the hub module 100; (2) electrical power flow from the battery(ies) 260a, 260b, 260c, and/or 260d to the upper and lower rotor motors 465a and 465b of the first rotor arm module 400a; and (3) communication between the ESCs 265a and 265b their corresponding upper and lower rotor motors 465a and 465b.

The male blind mate connector 431 includes a plurality of pins 431a configured to mate with the pin receptacles of the female blind mate connector 231a. Although not shown for clarity, the male blind mate connector 431 and, particularly, the pins 431a, are electrically connected to the corresponding upper and lower rotor motors 465a and 465b via wiring. In this example embodiment, the male blind mate connector 431 includes 12 pins 431a, six of which are electrically connected to the upper rotor motor 465a via wiring and the other six of which are electrically connected to the lower rotor motor 465b via wiring. In this example embodiment, each motor only requires three motor leads to properly function, but the multicopter 10 includes two motor leads for each motor pole. By using two motor leads per motor pole, the multicopter 10 eliminates single-point failures (i.e., both leads would have to fail rather than just a single lead for the motor to fail).

To attach the rotor arm module 400a to the hub module 100, an operator inserts the rotor arm extension 410b into the first rotor arm module receiving socket 214 of the hub module 100 and slides the rotor arm module 400a toward the hub module 100 with enough force to mate the pins of the male blind mate connector 431 with the pin receptacles of the female blind mate connector 231a of the hub module 100.

In an alternative embodiment, rather than the hub module slidably receiving a portion of the rotor arm module to attach the rotor arm module to the hub module, the rotor arm module slidably receives a component (such as an arm) of the hub module to attach the rotor arm module to the hub module.

As best shown in FIGS. 5C, 5D, 5E, and 5F, the locking assembly 420 includes a drawcatch 420a and a drawcatch lock 420b that: (1) facilitate attaching the first rotor arm module 400a to the hub module 100; (2) lock the first rotor arm module 400a to the hub module 100; and (3) facilitate detachment of the first rotor arm module 400a from the hub module 100.

Figure 5A:
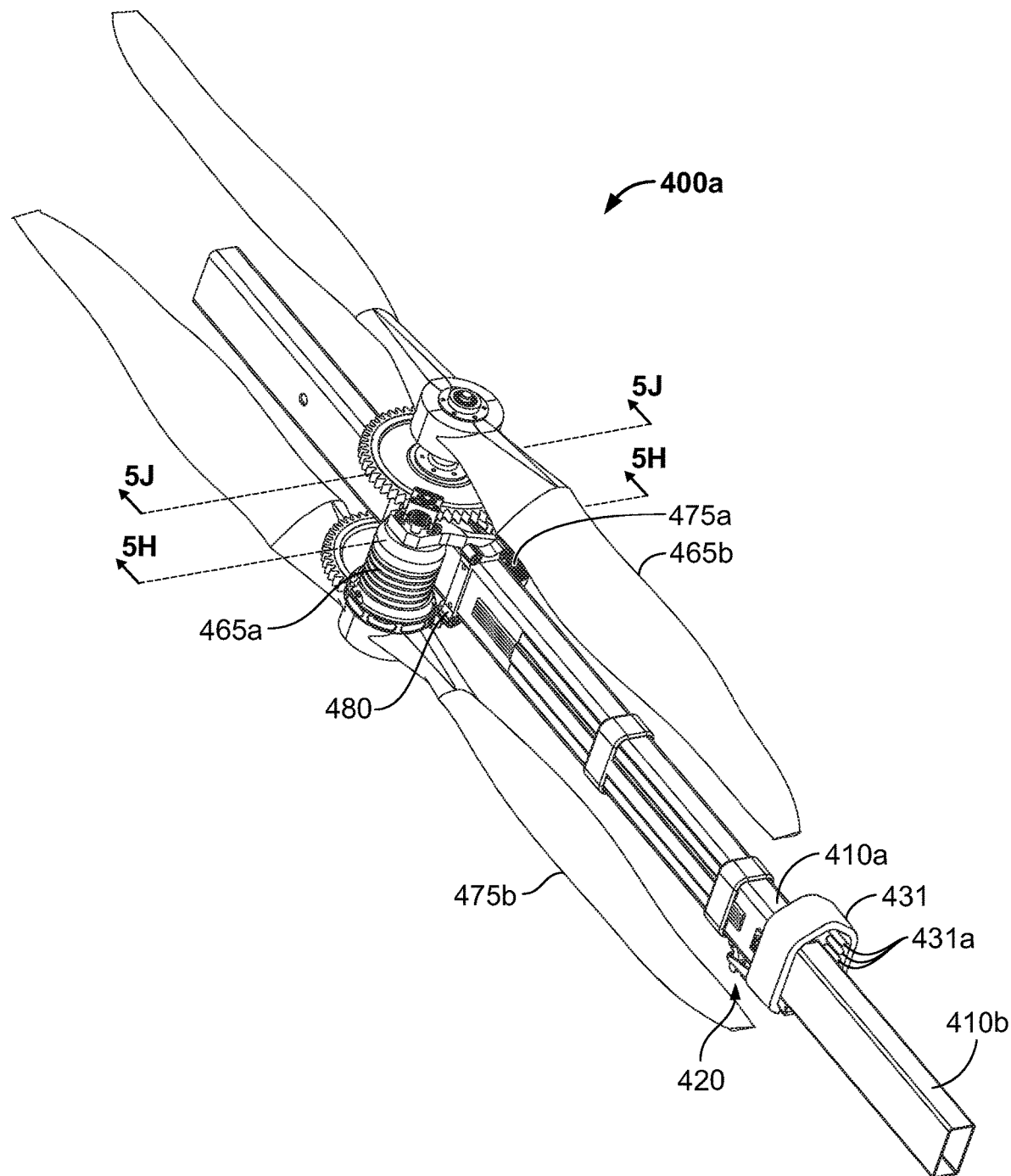
FIG. 5A is a top perspective view of one of the rotor arm modules of the multicopter of FIG. 1A.
Figure 5B:
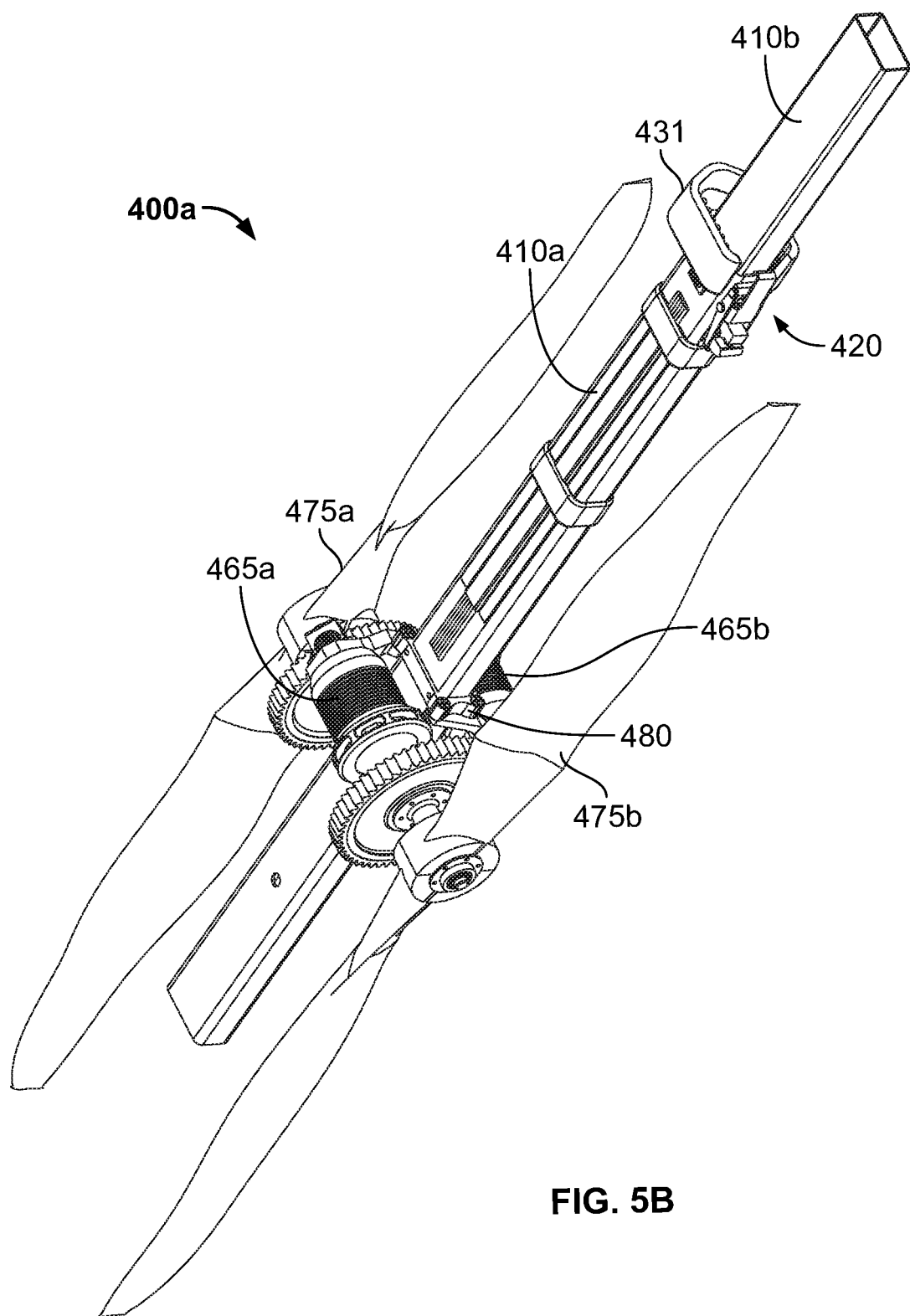
FIG. 5B is a bottom perspective view of the rotor arm module of FIG. 5A.
Figure 5C:
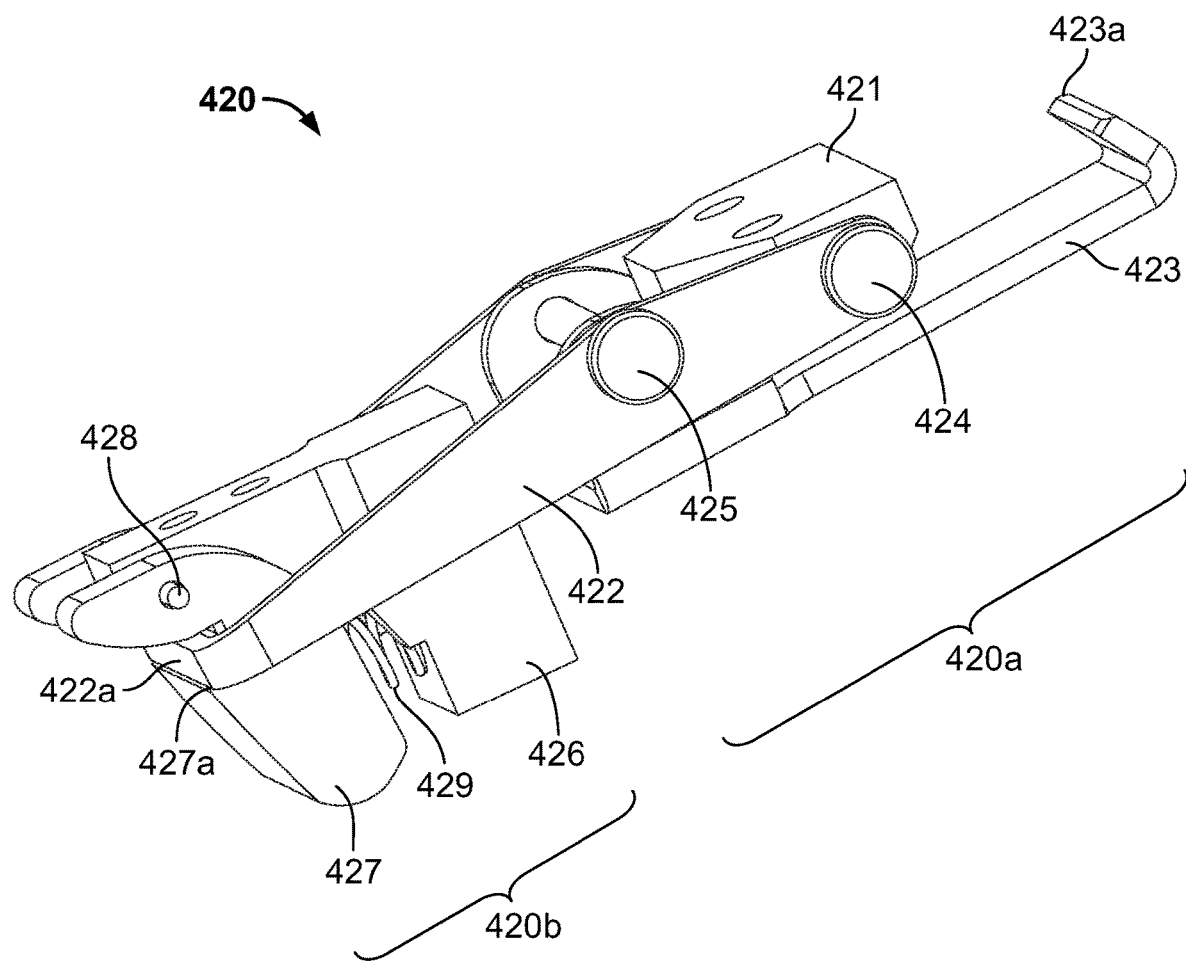
FIG. 5C is a top perspective view of the locking assembly of the rotor arm module of FIG. 5A.

As best shown in FIG. 5C, the drawcatch 420a includes: (1) a base 421; (2) a lever 422; (3) a claw 423; (4) a first fastener 424 (such as a clevis pin or other suitable fastener); and (5) a second fastener 425 (such as a clevis pin or other suitable fastener).

The drawcatch lock 420b includes: (1) a base 426; (2) a lock/release device 427 having a locking shelf 427a; (3) a pin 428 (or other suitable connector); and (4) a compression spring 429 (or other suitable biasing element).

The base 421 is attached to the underside of the rotor arm 410a. The lever 422 is pivotably connected at one end to the base 421 via the first fastener 424. The other end of the lever 422 includes a handle 422a. The claw 423 is pivotably connected at one end to the lever 422 via the second fastener 425. The other end of the claw includes a latch plate engager 423a.

The base 426 is attached to the underside of the rotor arm 410a. The lock/release device 427 is pivotably connected to the base 426 via the pin 428. The compression spring 429 is disposed between the base 426 and the lock/release device 427 and retained in place via cavities and/or projections defined in or extending from these components (not shown).

The lock/release device 427 is rotatable about the pin 428 from a lock rotational position to a release rotational position. The compression spring 429 biases the lock/release device 427 to the lock rotational position. To rotate the lock/release device 427 from the lock rotational position to the release rotational position, the operator pushes the lock/release device 427 inward with enough force to overcome the spring-biasing force and compress the compression spring 429.

The operator uses the locking assembly 420 to lock the male blind mate connector 431 with the female blind mate connector 231a as follows. The operator rotates the handle 422a of the lever 422 around the first fastener 424 toward the latch plate 237 on the hollow support 210a of the hub module 100 and engages the claw engager 238 of the latch plate 237 with the latch plate engager 423a of the claw 423. The operator then rotates the handle 422a around the first fastener 424 and toward the lock/release device 427 until the handle 422a contacts the lock/release device 427. Continued rotation of the lever 422 forces the lock/release device 427 inward, which overcomes the spring-biasing force and begins compressing the compression spring 429. This causes the lock/release device 427 to being rotating to the release rotational position. Once the handle 422 rotates past the locking shelf 427a, the spring-biasing force of the compression spring 429 causes the lock/release device 427 to rotate back to the lock rotational position. At this point, the locking shelf 427a prevents the handle 422 from rotating back toward the latch plate 237, and the first rotor arm module 400a and the hub module 100 are locked together.

In addition to using the locking assembly 420 to lock the first rotor arm module 400a to the hub module 100, the operator can use the locking assembly 420 to facilitate mating the male blind mate connector 431 with the female blind mate connector 231a. If the male blind mate connector 431 and the female blind mate connector 231a are only partially mated (or not mated at all) and the latch plate engager 423a of the claw 423 is engaged to the claw engager 238 of the latch plate 237, rotating the handle 422a of the lever 422 around the first fastener 424 toward the lock/release device 427 to lock the handle 422a will pull the first rotor arm module 400a and the hub module 100 toward one another and cause the male blind mate connector 431 to mate with the female blind mate connector 231a.

Figure 5D:
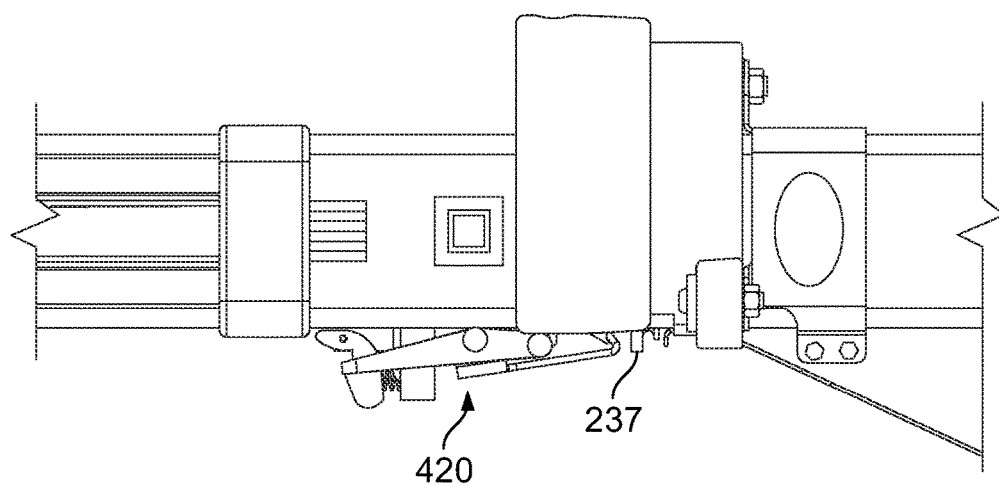
FIGS. 5D, 5E, and 5F are side elevational views of the rotor arm module of FIG. 5A detaching from the hub module of FIG. 2A via the locking assembly of FIG. 5C.
Figure 5E:
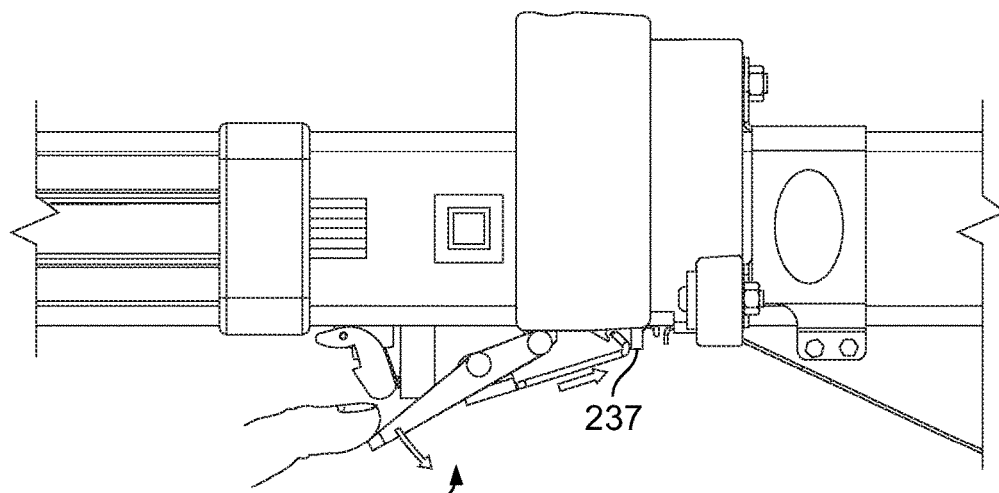
Figure 5F:
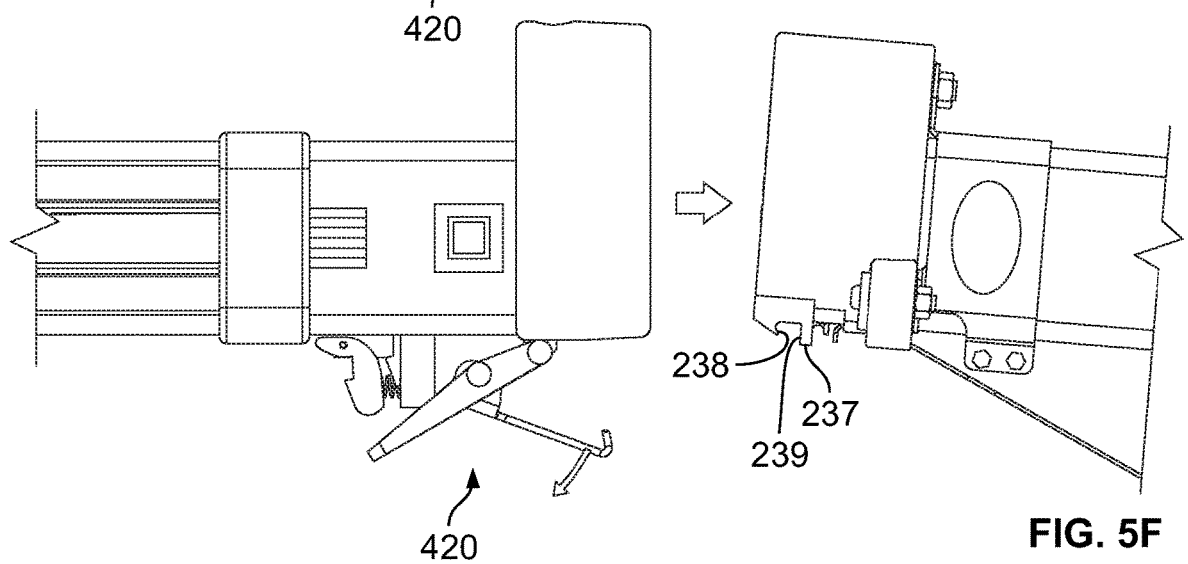

As shown in FIGS. 5D to 5F, the operator reverses this process to unlock the first rotor arm module 400a from the hub module 100. The operator pushes the lock/release device 427 inward with enough force to overcome the spring-biasing force and to compress the compression spring 429, which causes the lock/release device 427 to rotate to the release rotational position. This frees the handle 422a to rotate. Once the handle 422a rotates past the locking shelf 427a, the operator rotates the handle 422a of the lever 422 around the first fastener 424 toward the latch plate 237 and disengages the latch plate engager 423a of the claw 423 from the claw engager 238 of the latch plate 237.

At this point, the operator can either physically pull the first rotor arm module 400a and the hub module 100 apart to separate the male and female blind mate connectors 431 and 231a or use the locking assembly 420 to aid in detachment. When using the locking assembly 420 to aid in detachment, as shown in FIG. 5E, after disengaging the latch plate engager 423a from the claw engager 238, the operator continues rotating the handle 422a toward the latch plate 237 until the latch plate engager 423a contacts the backstop 239 of the latch plate 237. Afterward, continued rotation of the handle 422a toward the latch plate 237 causes the latch plate engager 423a to impose a pushing force against the backstop 239, which forces the first rotor arm module 400a and the hub module 100 apart, as shown in FIG. 5F.

Turning to the upper and lower rotor motor assemblies 460a and 460b and the rotor assembly 470a, the upper and lower rotor motors 465a and 465b of the upper and lower motor assemblies independently drive respective upper and lower rotors 475a and 475b via separate gear reduction trains.

Figure 5G:
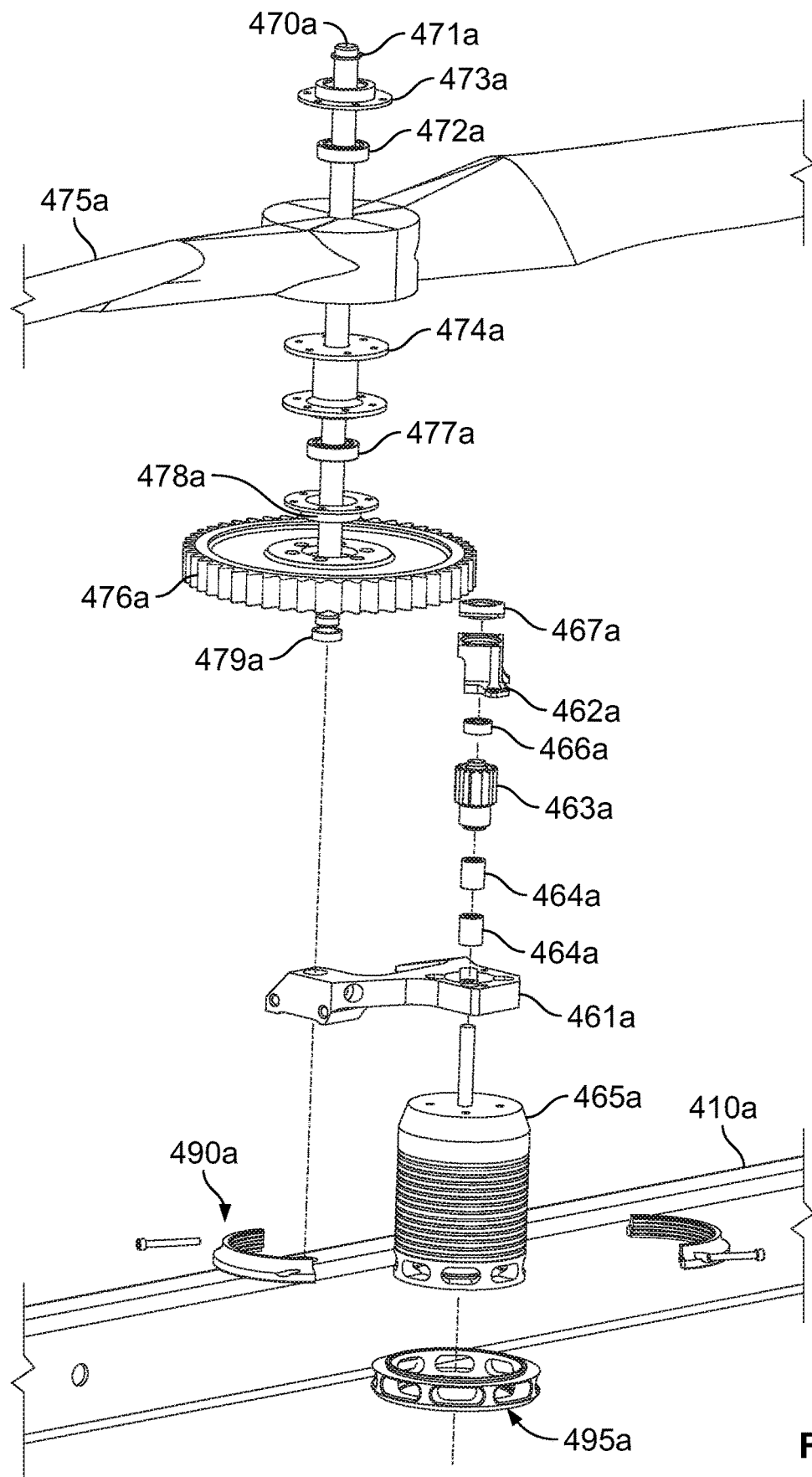
FIG. 5G is an exploded top perspective view of one of the rotor arm assemblies and part of the rotor assembly of the rotor arm module of FIG. 5A.
Figure 5H:
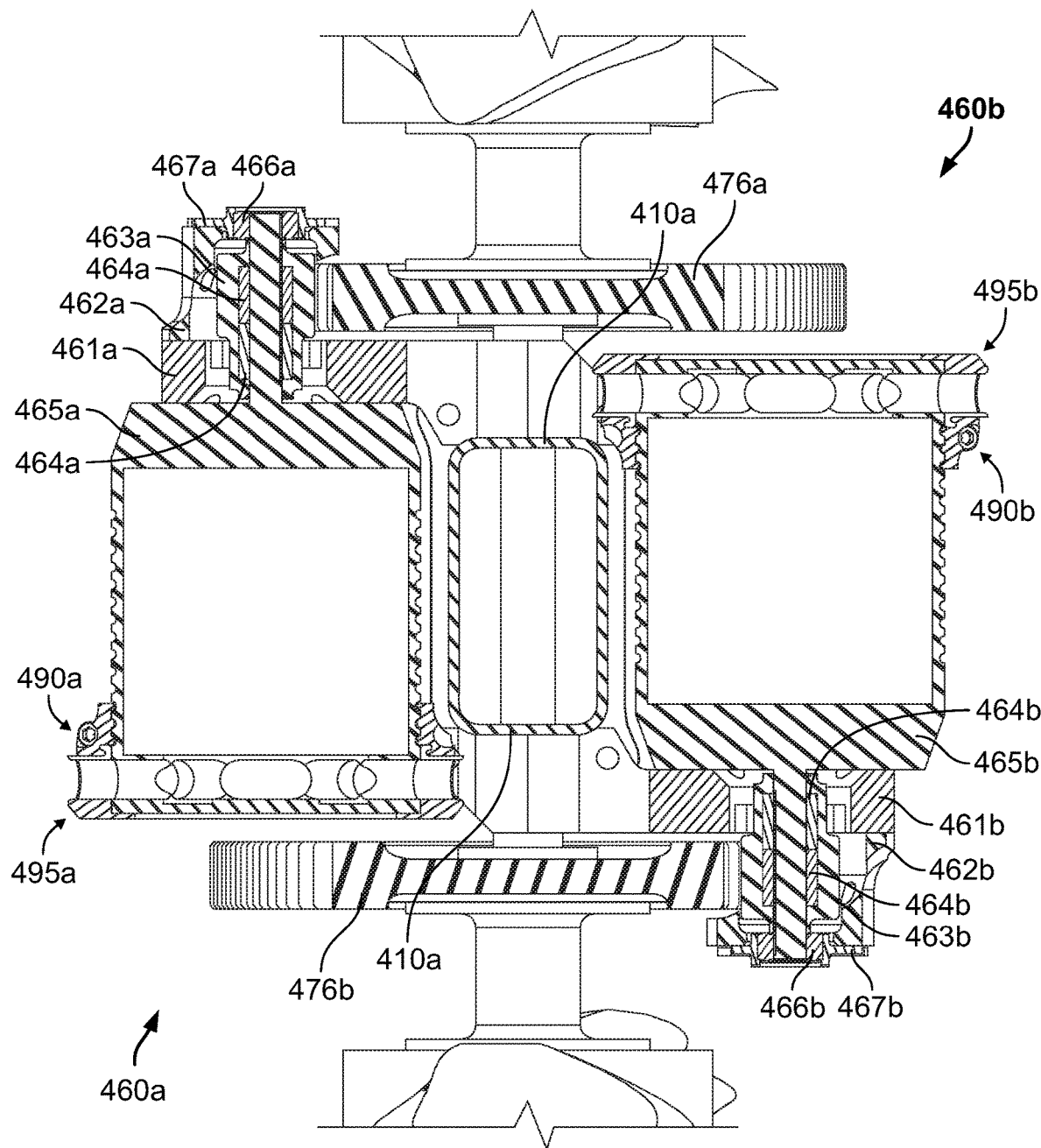
FIG. 5H is a cross-sectional view of the rotor motor assemblies of the rotor arm module of FIG. 5A taken substantially along line 5H-5H of FIG. 5A.

As best shown in FIGS. 5G and 5H, the upper rotor motor assembly 460a includes: (1) an upper rotor motor mount 461a, (2) an upper bearing spider 462a, (3) an upper pinion 463a, (4) upper bearings 464a, (5) the upper rotor motor 465a, (6) an upper bearing 466a, (7) an upper bearing cup 467a, (8) an upper two-piece cooling fan collar 490a, and (9) an upper rotor motor cooling fan 495a.

The upper rotor motor 465a is attached to the upper rotor motor mount 461a. The bearing spider 462a is attached to the upper rotor motor mount 461a. The upper bearings 464a are disposed on the motor shaft (not labeled) of the upper rotor motor 465a. The upper drive pinion 463a is disposed on the upper bearings 464a and on the motor shaft of the upper rotor motor 465a such that the upper drive gear 463a rotates with the motor shaft. The upper bearing 466a within the upper bearing cup 467a is disposed on the motor shaft of the upper rotor motor 465a. The upper bearing cup 467a is attached to the upper bearing spider 462a. The upper rotor motor cooling fan 495a is press-fit around the bottom of the upper rotor motor 465a and held in place via the upper two-piece cooling fan collar 490a.

The lower rotor motor assembly 460b includes: (1) a lower rotor motor mount 461b, (2) a lower bearing spider 462b, (3) a lower pinion 463b, (4) lower bearings 464b, (5) the lower rotor motor 465b, (6) a lower bearing 466b, (7) a lower bearing cup 467b, (8) a lower two-piece cooling fan collar 490b, and (9) a lower rotor motor cooling fan 495b.

The lower rotor motor 465b is attached to the lower rotor motor mount 461b. The lower bearing spider 462b is attached to the lower rotor mount 461b. The lower bearings 464b are disposed on the motor shaft (not labeled) of the lower rotor motor 465b. The lower pinion 463b is disposed on the lower bearings 464b and on the motor shaft of the lower rotor motor 465b such that the lower pinion 463b rotates with the motor shaft. The lower bearing 466b within the lower bearing cup 467b is disposed on the motor shaft of the lower rotor motor 465b. The lower bearing cup 467b is attached to the lower bearing spider 462b. The lower rotor motor cooling fan 495b is press-fit around the bottom of the lower rotor motor 465a and held in place via the lower two-piece cooling fan collar 490b.

Figure 5I:
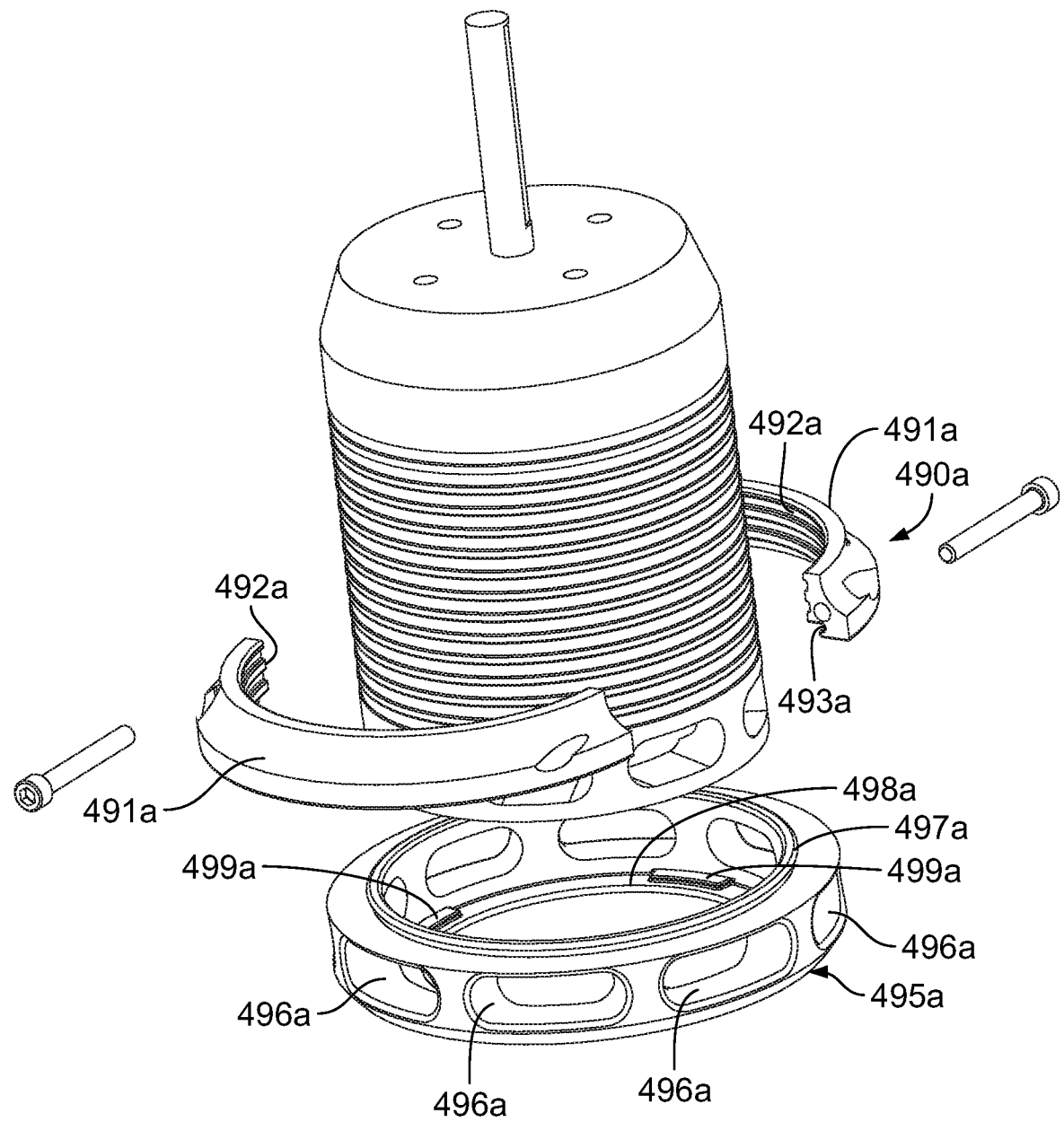
FIG. 5I is an exploded top perspective view of one of the rotor motor collars and one of the rotor motor fans of the rotor arm module of FIG. 5A.

The upper cooling fan collar 490a and the upper rotor motor cooling fan 495a are shown in detail in FIG. 5I. The lower cooling fan collar 490b and the lower rotor motor cooling fan 495b are similar to the upper cooling fan collar 490a and the upper rotor motor cooling fan 495b and are not separately shown or described for brevity.

The upper rotor motor cooling fan 495a includes a generally annular body that defines a plurality of cooling fan openings 496a through its side walls (not labeled). A collar connection lip 497a extends upward from body and radially outward. A generally annular motor mounting shelf 498a extends radially inward from the bottom of the body. A plurality of motor seats 499a extend upward from the motor mounting shelf 498a.

The upper cooling fan collar 490a includes two identical collar halves 491a having generally half-annular bodies. An upper rotor motor mating surface 492a that extends around the (half) circumference of the collar half 491a is grooved to correspond with and mate with grooves on the exterior of the upper rotor motor 465a. A lip retaining chamber 493a that extends around the (half) circumference of the collar half 491a is shaped to receive and retain the lip 497a of the upper rotor motor cooling fan 495a.

The bottom of the upper rotor motor 465a is disposed within the space defined by the inner cylindrical surface of the cooling fan 495a such that the bottom of the upper rotor motor 465a contacts the motor seats 499a. The cooling fan openings 496a of the cooling fan 495a are generally aligned with corresponding cooling fan openings of the upper rotor motor 465. The collar halves 491 are fit onto the upper rotor motor 465a and the cooling fan 495a such that: (1) the lip retaining chambers 493a of the collar halves 491 receive the lip 497a of the upper rotor motor cooling fan 495a; and (2) the upper rotor motor mating surfaces 492a of the collar halves 491 mate with the grooves on the exterior of the upper rotor motor 465a. Two fasteners (not labeled) attach the collar halves 491a to each other to prevent separation.

The cooling fans solve two problems: (1) limited motor power output due to overheating; and (2) motors falling apart. First, the power output of the rotor motors depends to a certain extent on cooling—power output generally decreases the hotter the rotor motors get. The cooling fans enlarge the radius of the cooling fan openings of the rotor motors. The increased radius drives cooling air at a greater flow rate, which improves cooling and allows motors to be used safely at increased loads without fear of failure.

Second, the flux rings of the rotor motors are typically glued onto the end caps of the rotor motors. This attachment is not secure due to the temperatures the rotor motors reach and the vibrations that occur during flight. The cooling fan collars double as redundant load paths for the motor flux rings since they mechanically engage the grooves on the exterior of the upper rotor motor, which eliminates the chance of the flux ring working its way off of the end cap.

Figure 5J:
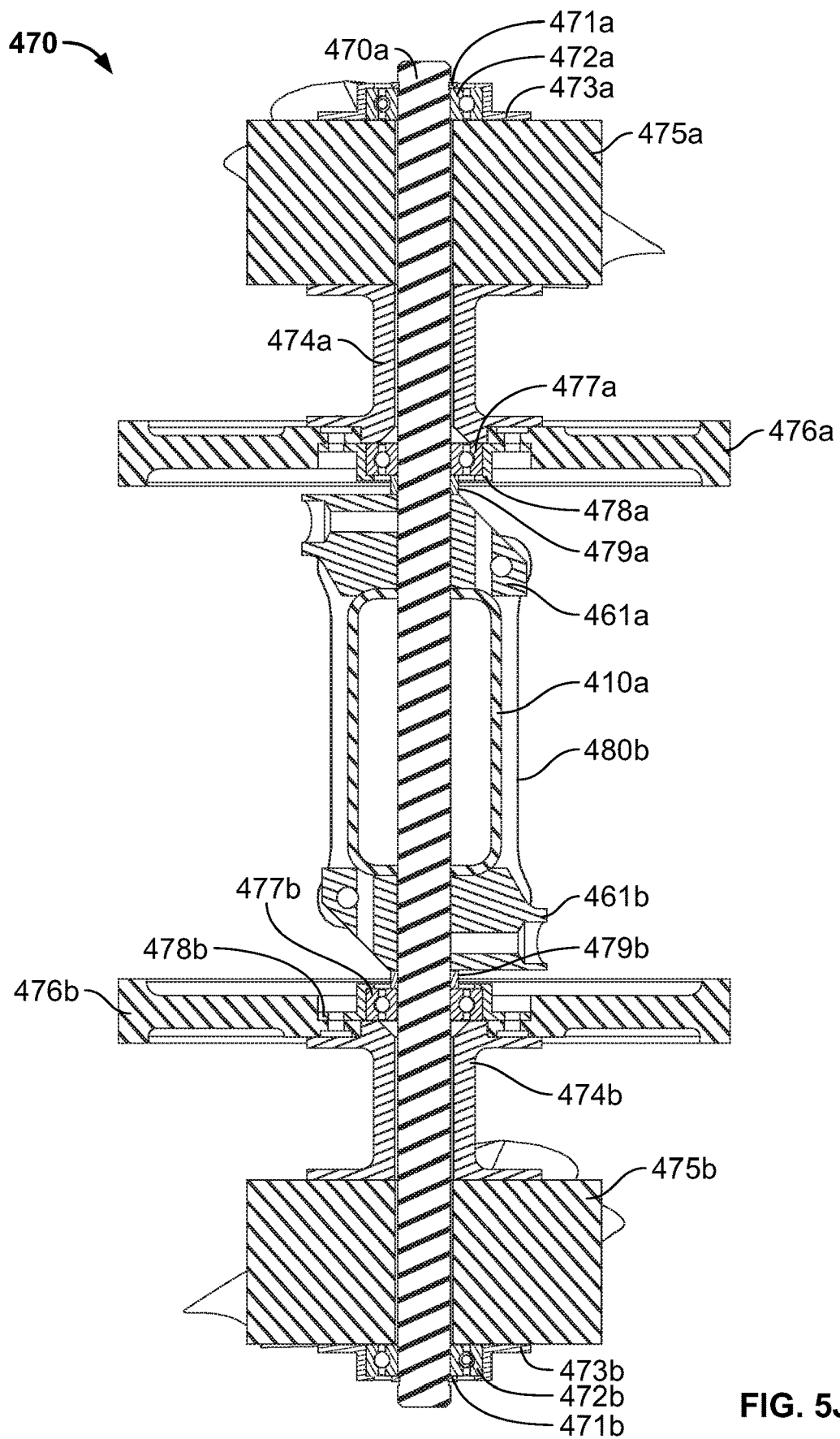
FIG. 5J is a cross-sectional view of the rotor assembly of the rotor arm module of FIG. 5A taken substantially along line 5J-5J of FIG. 5A.

As best shown in FIG. 5J, the rotor assembly 470 includes a spindle 470a and the following components rotatably mounted to the spindle 470a: (1) an upper retaining ring 471a, (2) a lower retaining ring 471b, (3) upper bearings 472a and 477a, (4) lower bearings 472b and 477b, (5) upper bearing cups 473a and 478a, (6) lower bearing cups 473b and 478b, (7) an upper torque tube 474a, (8) a lower torque tube 474b, (9) an upper rotor 475a, (10) a lower rotor 475b, (11) an upper driven gear 476a, (12) a lower driven gear 476b, (13) an upper spacer 479a, and (14) a lower spacer 479b.

Turning to the upper portion of the rotor assembly 470, the bearing 472a is disposed within the bearing cup 473a, which is fixedly attached to the top of the rotor 475a. The torque tube 474a is fixedly attached at one end to the underside of the rotor 475a and at the other end to top of the driven gear 476a. The bearing 477a is disposed within the bearing cup 478a, which is fixedly attached to the underside of the driven gear 476a. The spacer 479a is disposed between the bearing 477a and the upper rotor motor mount 461a. The upper retaining ring 471a is seated in a groove defined around the spindle 470a and prevents these components from sliding off of the spindle 470a.

Turning to the lower portion of the rotor assembly 470, the bearing 472b is disposed within the bearing cup 473b, which is fixedly attached to the bottom of the rotor 475b. The torque tube 474b is fixedly attached at one end to the top of the rotor 475b and at the other end to underside of the driven gear 476b. The bearing 477b is disposed within the bearing cup 478b, which is fixedly attached to the top of the driven gear 476b. The spacer 479b is disposed between the bearing 477b and the lower rotor motor mount 461b. The lower retaining ring 471b is seated in a groove defined around the spindle 470a and prevents these components from sliding off of the spindle 470a.

The spindle 470a extends through two vertically aligned spindle receiving openings (not labeled) defined through the rotor arm 410a. This prevents the spindle 470a from substantially translating relative to the rotor arm 410a. And since all of the components of the upper and lower motor assemblies 460a and 460b and the rotor assembly 470 are attached to the spindle 470a (directly or indirectly), the fact that the spindle 470a extends through the spindle receiving openings defined through the rotor arm 410a prevents any of the components of the upper and lower motor assemblies 460a and 460b and the rotor assembly 470 from substantially translating relative to the rotor arm 410a.

To prevent the upper and lower rotor motors 465a and 465b (and certain components attached thereto) from rotating relative to the rotor arm 410a, the upper and lower rotor motor mounts 461a and 461b are attached to both an inner bracket 480a and an outer bracket 480b. The brackets 480a and 480b are disposed around the rotor arm 410a, as best shown in FIGS. 5A, 5B, and 5J.

In operation, the autopilot 272 and the ESC 265a control the rate and direction of rotation of the motor shaft of the upper rotor motor 465a, which drives the upper pinion 463a, which in turn drives the upper driven gear 476a. Since the upper driven gear 476a is fixedly attached to the upper rotor 475a without any further gear reduction, the upper rotor 475a rotates at the same rate as and in the same rotational direction as the upper driven gear 476a. Similarly, the autopilot 272 and the ESC 265b control the rate and direction of rotation of the motor shaft of the lower rotor motor 465b, which drives the lower pinion 463b, which in turn drives the lower driven gear 476b. Since the lower driven gear 476b is fixedly attached to the lower rotor 475b without any further gear reduction, the lower rotor 475b rotates at the same rate as and in the same rotational direction as the lower driven gear 476b.

In this embodiment, the upper and lower rotors are generally the same size and shape. In another embodiment, the lower rotors are larger than (such as about 7% larger than) the upper rotors to compensate for the fact that the lower rotors operate in the upper rotors' downwash. Running larger lower rotors is one way to improve load sharing of upper and lower motors of a multicopter with counter-rotating blades. Another way to improve load sharing is to select a lower gear reduction for the lower rotors. Yet another way is to select motors with higher KV (rpm/volt) values. Yet another way is to select lower rotors with coarser pitch than the upper rotors.

1.3 Front Landing Gear Extension Modules and Landing Gear Modules

Figure 6A:
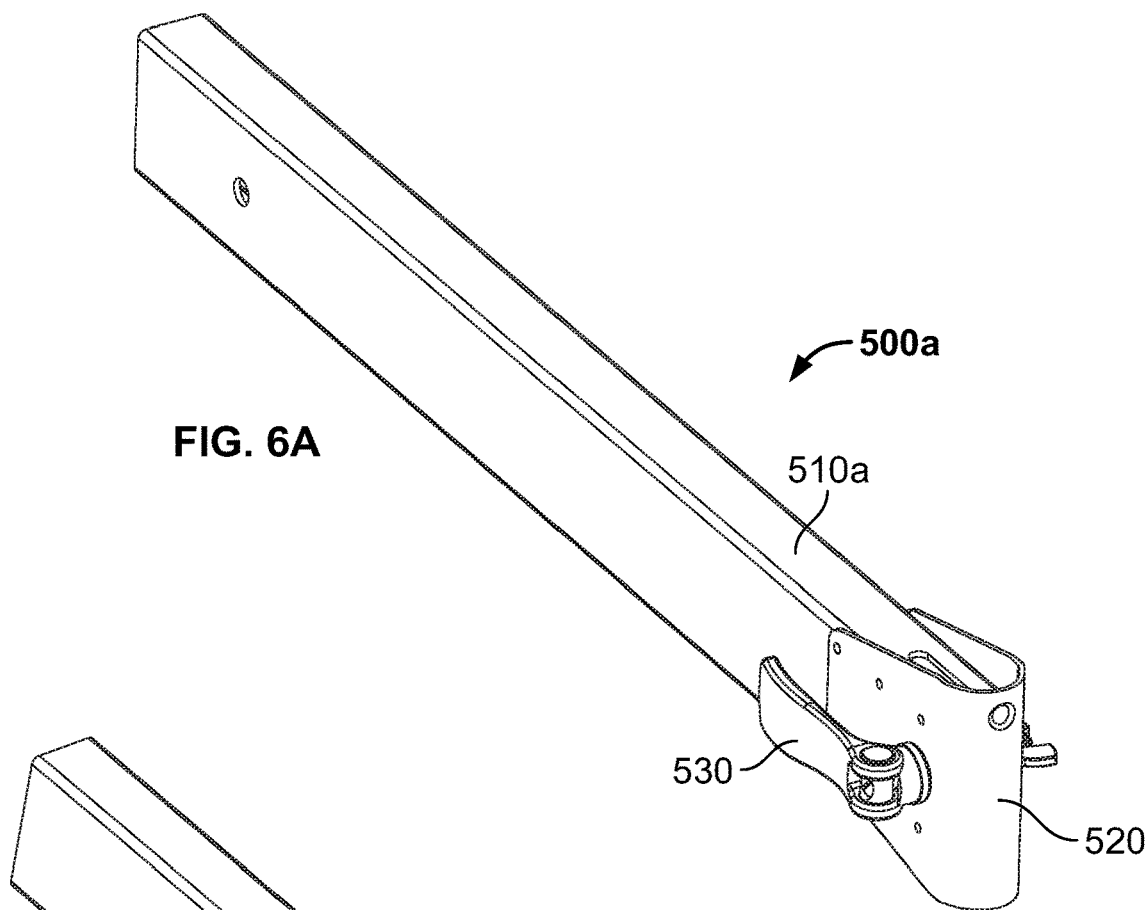
FIG. 6A is a top perspective view of one of the front landing gear extension modules of the multicopter of FIG. 1A.

FIGS. 6A and 7A show the first front landing gear extension module 500a and the first front landing gear module 600a, respectively. The front landing gear modules (along with the rear landing gear modules, described below) support the multicopter 10 when assembled but not flying, and facilitate launch and landing of the multicopter 10 without damaging the multicopter 10. The front landing gear extensions are used to attach the front landing gear to the respective rotor arm modules, and also enable the front landing gear to move relative to the rotor arm modules to prevent rotor rotation in certain instances.

The second front landing gear extension module 500b and the second front landing gear module 600b are similar to the first front landing gear extension module 500a and the first front landing gear module 600a and are not separately shown or described for brevity.

The first front landing gear extension module 500a includes a generally rectangular hollow support 510a, a landing gear module securing device 520 attached at one end of the support 510a, and a front landing gear locking device 530 (which is a cam lever lock in this embodiment but can be any suitable locking device) attached to the landing gear module securing device 520.

The first front landing gear module 600a includes a generally cylindrical leg 610, a generally semicircular foot 620 attached to a bottom end of the leg 610, and a collar 630 attached near the top end of the leg 610 via a fastener 632 (such as a set screw).

The front landing gear locking device 530 enables an operator to attach the first front landing gear module 600a to the first front landing gear extension module 500a. To do so, the operator unlocks the front landing gear locking device 530, inserts the first front landing gear module 600a into the landing gear module securing device 520 until the collar 630 is disposed within the landing gear module securing device 520, and re-locks the front landing gear locking device 530. The operator reverses this process to detach the first front landing gear module 600a from the first front landing gear extension module 500a.

The operator attaches the first front landing gear extension module 500a to the first rotor arm module 400a by inserting the end of the support 510a opposite the end to which the landing gear module securing device 520 is attached into the front landing gear extension module receiving socket of the first rotor arm module 400a. The operator then locks the first front landing gear extension module 500a into place, such as using suitable fasteners.

Although not shown, the operator can move the front landing gear module further radially inward or further radially outward by sliding the support of the front landing gear extension module further into or further out of the rotor arm of the corresponding rotor arm module. This enables the operator to move the front landing gear module from a first position in which the front landing gear module is clear of the rotors radially inward to a second position in which the rotors contact the front landing gear module. When in the second position, the front landing gear module prevents the rotors from rotating.

1.4 Rear Landing Gear Extension Modules and Landing Gear Module

Figure 6B:
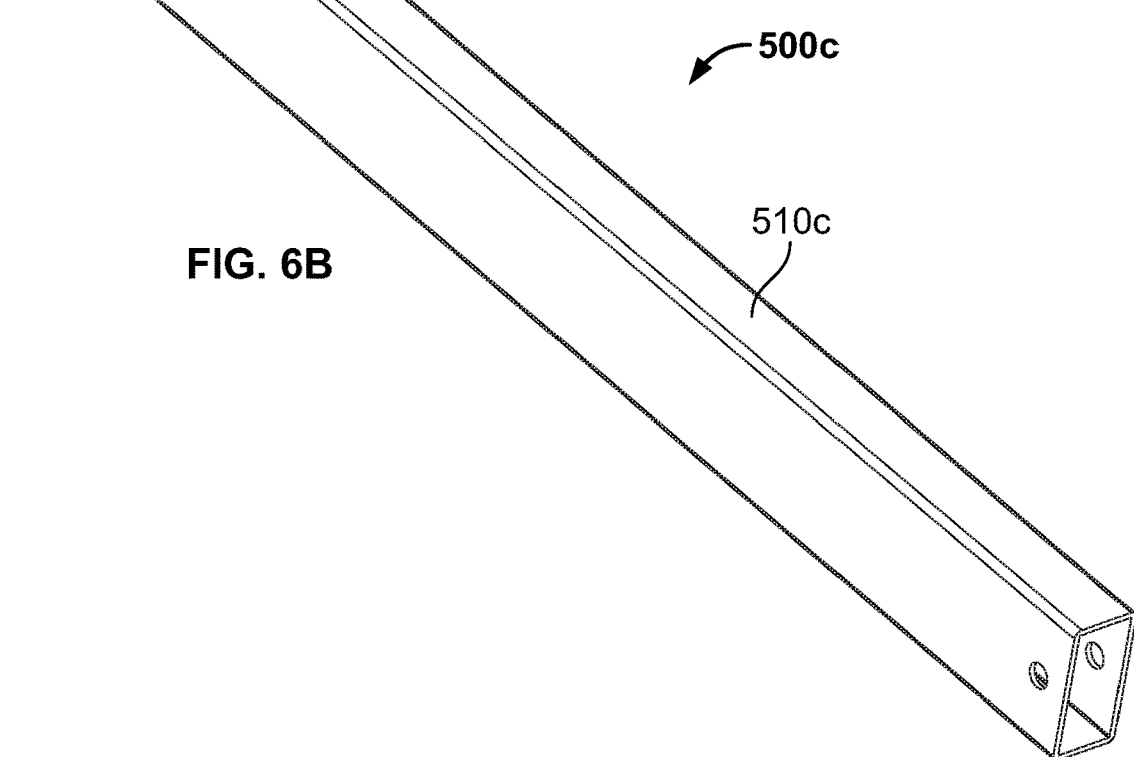
FIG. 6B is a top perspective view of one of the rear landing gear extension modules of the multicopter of FIG. 1A.

FIGS. 6B and 7B show the first rear landing gear extension module 500c and the first rear landing gear module 600c, respectively. The rear landing gear modules (along with the front landing gear modules, described above) support the multicopter 10 when assembled but not flying, and facilitate launch and landing of the multicopter 10 without damaging the multicopter 10. The rear landing gear modules are shaped such that they act as vertical stabilizers (or fins) during flight, ensuring that the front of the multicopter 10 (and the nose of the fixed-wing aircraft 20, if attached thereto) points generally into the airflow. The rear landing gear extensions are used to attach the rear landing gear to the respective rotor arm modules, and also enable the rear landing gear to move relative to the rotor arm modules to prevent rotor rotation in certain instances.

The second rear landing gear extension module 500d and the second rear landing gear module 600d are similar to the first rear landing gear extension module 500c and the first rear landing gear module 600c and are not separately shown or described for brevity.

The first rear landing gear extension module 500c is an elongated rectangular hollow support 510c.

The first rear landing gear module 600c includes a body having a generally triangular cross-section that tapers from front to back. The body includes two side surfaces 650a and 650b and a front surface 650c joining the side surfaces 650a and 650b. The side surfaces 650a and 650b are substantially longer than the front surface 650c is wide. The body tapers at its bottom into a generally circular foot 670. A rear landing gear extension module receiving socket is defined by a hollow rectangular support 680 extending through the body.

The operator attaches the first rear landing gear extension module 500c to the third landing gear module 600c by inserting one end of the support 510c of the first rear landing gear extension module 500c into the rear landing gear extension module receiving socket of the support 680. The operator then locks the first rear landing gear extension module 500c into place, such as using suitable fasteners.

The operator attaches the first rear landing gear extension module 500c to the third rotor arm module 400c by inserting the end of the support 510c of the first rear landing gear extension module 500c opposite the end to which the first rear landing gear module 600c is attached into the rear landing gear extension module receiving socket of the third rotor arm module 400c. The operator then locks the first rear landing gear extension module 500c into place, such as using suitable fasteners.

Once attached, the rear landing gear modules are oriented such that the side surfaces of the rear landing gear modules are substantially aligned with the saddle side brackets 320a and 320b of the saddle 300, as best shown in FIG. 1B. When the fixed-wing aircraft 20 is attached to the multicopter 10, these side surfaces of the rear landing gear modules are substantially parallel to a generally vertical plane containing the roll axis of the fuselage of the fixed-wing aircraft 20. The relatively long length of these side surfaces of the rear landing gear modules and their placement well aft of the center-of-lift of the multicopter 10 cause the rear landing gear modules to act as fins. This weathervane effect ensures that the nose of the fixed-wing aircraft 20 is oriented into the airflow when airborne. Good flow alignment is critically important for spin avoidance at the moment the multicopter 10 releases the fixed-wing aircraft 20, when the fixed-wing aircraft 20 may be operating well below stall speed.

In certain embodiments, one or more of the landing gear modules includes a shock absorber.

1.5 Separately Powered Upper and Lower Rotor Motors

As noted above, four batteries 260a to 260d power the multicopter 10, though in other embodiments a different quantity of batteries and/or different type(s) of batteries power the multicopter. In other embodiments, any suitable power source(s), such as a fuel-based power source or a solar-based power source, may be used instead of or along with batteries.

In this embodiment, a first pair of batteries 260a and 260b are connected in series and a second pair of batteries 260c and 260d are connected in series. Here, the first pair of batteries 260a and 260b power the upper rotor motors and do not power the lower rotor motors, while the second pair of batteries 260c and 260d power the lower rotor motors and do not power the upper rotor motors. This configuration ensures that, if one pair of batteries fails, the multicopter 10 is operable in a quadcopter mode with either all four upper rotor motors (if the second pair of batteries 260c and 260d fails) or all four lower rotor motors (if the first pair of batteries 260a and 260b fails).

The multicopter 10 also includes a gang circuit that connects the two pairs of batteries in parallel to enable a single charger connected to one of the pairs of batteries to also charge the other pair of batteries. The gang circuit is overload protected and includes an automatically resetting circuit breaker. The gang circuit is beneficial because it reduces charging time, allowing an operator to recharge both batteries in parallel when only one charger is available.

1.6 Multicopter Operating Modes

The multicopter 10 is operable in one of two throttle modes: NORMAL throttle mode and TENSION throttle mode. The multicopter 10 is operable in three different flight modes: ALTHOLD flight mode, LOITER flight mode, and RTL flight mode. The multicopter 10 is operable in a half-power mode to, in certain situations, improve response and save power. The basic functionality of each operating mode is described below. The operator can toggle between these operating modes using suitable switches, a touch screen, or any other suitable device on the R/C controller.

On a typical R/C controller including left and right joysticks, the left joystick is typically used for throttle, while the right joystick is typically used for left/right and for/aft station-keeping of the multicopter.

1.6.1 SIMPLE Control Mode

SIMPLE control mode simplifies horizontal control by tying the R/C controller's right stick commands to geo-referenced coordinates. In various embodiments, the multicopter 10 always operates in SIMPLE control mode, regardless of which of the three flight modes the multicopter 10 employs. Under SIMPLE control mode, forward right stick deflection drives the multicopter 10 in the direction in which the multicopter 10 was pointed at the instant it was armed, regardless of its yaw orientation during flight. Put differently, if the multicopter 10 was pointed North when armed but, while hovering for instance, the multicopter 10 rotated about its yaw axis such that its nose is pointed East, forward right stick deflection still drives the multicopter 10 North. While the operator may use the left stick to rotate the multicopter 10 about the yaw axis, this (rudder) input is rarely needed for launch or retrieval of the fixed-wing aircraft 20. The rear landing gear modules ensure the multicopter 10 is pointed into the relative wind (like a weathervane), so the operator need not worry about aligning the fuselage with airflow.

1.6.2 TENSION Throttle Mode

When the multicopter 10 operates in TENSION throttle mode, the human operator has direct control over the throttle. In various embodiments, the multicopter 10 can only be operated in TENSION throttle mode when it is operated in either ALTHOLD or LOITER flight modes. That is, the multicopter 10 cannot be operated in TENSION throttle mode when operated in RTL flight mode. TENSION throttle mode converts throttle stick inputs to direct throttle commands, which is primarily useful for tensioning the flexible capture tether 5000 during retrieval. An astute operator will climb at a controlled rate by feathering the throttle in TENSION throttle mode, he will slow high ascent as the tether pulls tight (described below), and then he maintains light tether tension, keeping the line straight as the fixed-wing aircraft approaches. The straight line allows human observers to confirm that the line will be swept by the fixed-wing leading edge and the capture is on target. At impact, the operator increases throttle to arrest the fixed-wing aircraft's horizontal motion and minimize altitude loss. Then he feathers the throttle back to lower the aircraft to the ground.

1.6.3 NORMAL Throttle Mode

In NORMAL throttle mode, the autopilot interprets joystick commands as desired rate commands and applies whatever throttle is needed to achieve that climb or descent rate. When tethered to the ground the altitude controller very abruptly increases throttle to maximum (when its desired altitude is above current altitude) or it plummets to minimum throttle (when desired altitude is below current altitude) without regard for joystick position. This behavior makes it difficult or impossible for the human operator to regulate tether tension directly. Direct throttle control, offered by TENSION throttle mode, disables the altitude controller. In this mode, altitude is controlled strictly by tether length. In Tension Mode, the human operator controls tether tension directly, with throttle inputs, and the autopilot responds with lift-producing motor commands that are roughly proportional to commanded throttle position. By this technique, the retrieval process enjoys improved finesse and precise control without overworking the multicopter motors and batteries.

1.6.4 ALTHOLD Flight Mode

ALTHOLD flight mode converts throttle commands (left stick, vertical axis) to vertical rate commands. When operating in the ALTHOLD flight mode, the multicopter 10 will attempt to maintain current altitude when the left stick is in the middle position. The multicopter 10 will attempt to climb at up to 5 meters per second (or any other suitable rate) when the left stick is pushed up to max. The multicopter 10 will descend at up to 5 meters per second (or any other suitable rate) when the left stick is pulled to min. ALTHOLD flight mode converts right stick commands to lean angle, with maximum right stick deflection corresponding to 30 degrees (or any other suitable angle). When operating in ALTHOLD flight mode, the multicopter 10 will maintain zero lean when the right stick is in the middle position and will be blown downwind. If the fixed-wing aircraft 20 is mated to the multicopter 10 and producing thrust, this thrust will drive the multicopter 10 forward unopposed by lean angle. ALTHOLD flight mode does not depend on GPS for control, and works equally well indoors and in all locations where GPS reception is spotty or denied. ALTHOLD flight mode uses a compass for navigation, which means "SIMPLE MODE" works equally well without the use of GPS. Consequently, the operator simply pushes the right joystick gently into the wind for station keeping, fully into the wind to execute a "dash" maneuver (for launch/release), and he will relax the right stick to allow the aircraft to drift downwind to return home after a dash. Finally, the operator will deflect the right stick opposite the aircraft's ground track to minimize ground speed just before touch-down.

1.6.5 LOITER Flight Mode

LOITER flight mode behaves like ALTHOLD flight mode in the vertical direction (i.e., converts throttle commands to vertical rate commands). Similarly, LOITER flight mode converts right stick inputs to horizontal rate commands. When operating in LOITER flight mode, the multicopter 10 attempts to maintain its current horizontal position over the Earth when the right stick is in the middle position. Maximum right stick deflection drives the multicopter 10 in the corresponding direction at up to 20 meters per second ground speed (or any suitable rate) or the maximum achievable speed against true wind, whichever is less. LOITER flight mode depends on GPS to close feedback loops around latitude and longitude positions. The autopilot 272 will automatically switch itself from LOITER flight mode to ALTHOLD flight mode when GPS reception is unacceptable, and will not allow a human operator to arm in LOITER flight mode when GPS reception is unacceptable.

1.6.6 RTL Flight Mode

Return to Launch (RTL) flight mode autonomously returns the multicopter 10 to its home position—i.e., the place on Earth where it was last armed. When operating in RTL mode, left stick inputs are ignored except when executing a SHUT DOWN command, and right stick inputs are used only during the final (vertical) descent phase. The operator uses the right stick to "nudge" the multicopter 10 a designated distance away from the storage and launch system 2000 to avoid interference at touchdown. Multicopter response to these nudge maneuvers will be similar to right stick inputs in LOITER flight mode, and the operator should execute them before the aircraft descends below 5 meters (or any other suitable distance) above ground level. To avoid human operator-induced oscillations and to minimize ground speed, the human operator's fingers should be kept off the control sticks during final descent and touchdown in RTL mode.

1.6.7 Half-Power Mode

When operating in half-power mode, the multicopter 10 shuts down half of its rotors—either the lower rotors or the upper rotors—and operates using only the remaining half of the rotors. Half-power mode is typically used after the fixed-wing aircraft 20 detaches from the multicopter 10 and the multicopter 10 is returning to its home position. Using all eight rotors to fly just the multicopter 10, which is relatively light when not carrying the fixed-wing aircraft 20, provides too much power and induces sluggish response to operator commands. This is not ideal, especially when launching the multicopter 10 from an area full of obstructions that the multicopter 10 must deftly avoid on its way back to its home position. Operating in half-power mode in these instances provides a more appropriate amount of power and enables more precise responses to operator commands.

2. Storage and Launch System

The storage and launch system 2000 is shown in FIGS. 8A, 8B, 8C, 8D, 8E, 8F, 8G, 8H, and 8I. The storage and launch system 2000 is usable to compactly store the modular multicopter 10 in a single container after disassembly into the 13 modules and to facilitate launch of the fixed-wing aircraft 20 into wing-borne flight by acting as a launch mount for the fixed-wing aircraft 20.

To facilitate storage of the multicopter 10 in a single container (including a container top 2000a and a container bottom 2000b), the storage and launch system 2000 includes: (1) a launch-assist assembly 2100 to which the front landing gear modules 600a and 600b are attachable; (2) a rotor arm module and rear landing gear module storage device 2200 to which the rotor arm modules 400a to 400d and the rear landing gear modules 600c and 600d are attachable; and (3) a hub module storage tray 2300 to which the hub module 100 is attachable.

To facilitate launch of the fixed-wing aircraft 20, the launch-assist assembly 2100 is movable from a storage position into a launch position and includes certain elements on which the fixed-wing aircraft can be mounted and other elements that retain the fixed-wing aircraft 20 in a launch orientation before launch. Example embodiments of each of these elements are described below, followed by a description of an example method of storing the multicopter 10 using these example embodiments of the elements.

2.1 Launch-Assist Assembly

The launch-assist assembly 2100 is attached to the container bottom 2000b and is one element of the storage and launch system 2000 that facilitates launch of the fixed-wing aircraft 20. The launch-assist assembly 2100 is movable from a position in which is lies substantially flat along the floor of the container bottom 2000a to enable storage of the multicopter 10 to a launch position in which it is generally spaced-apart from and upwardly angled relative to the floor of the container bottom 2000a to facilitate launch of the fixed-wing aircraft 20.

Figure 8A:
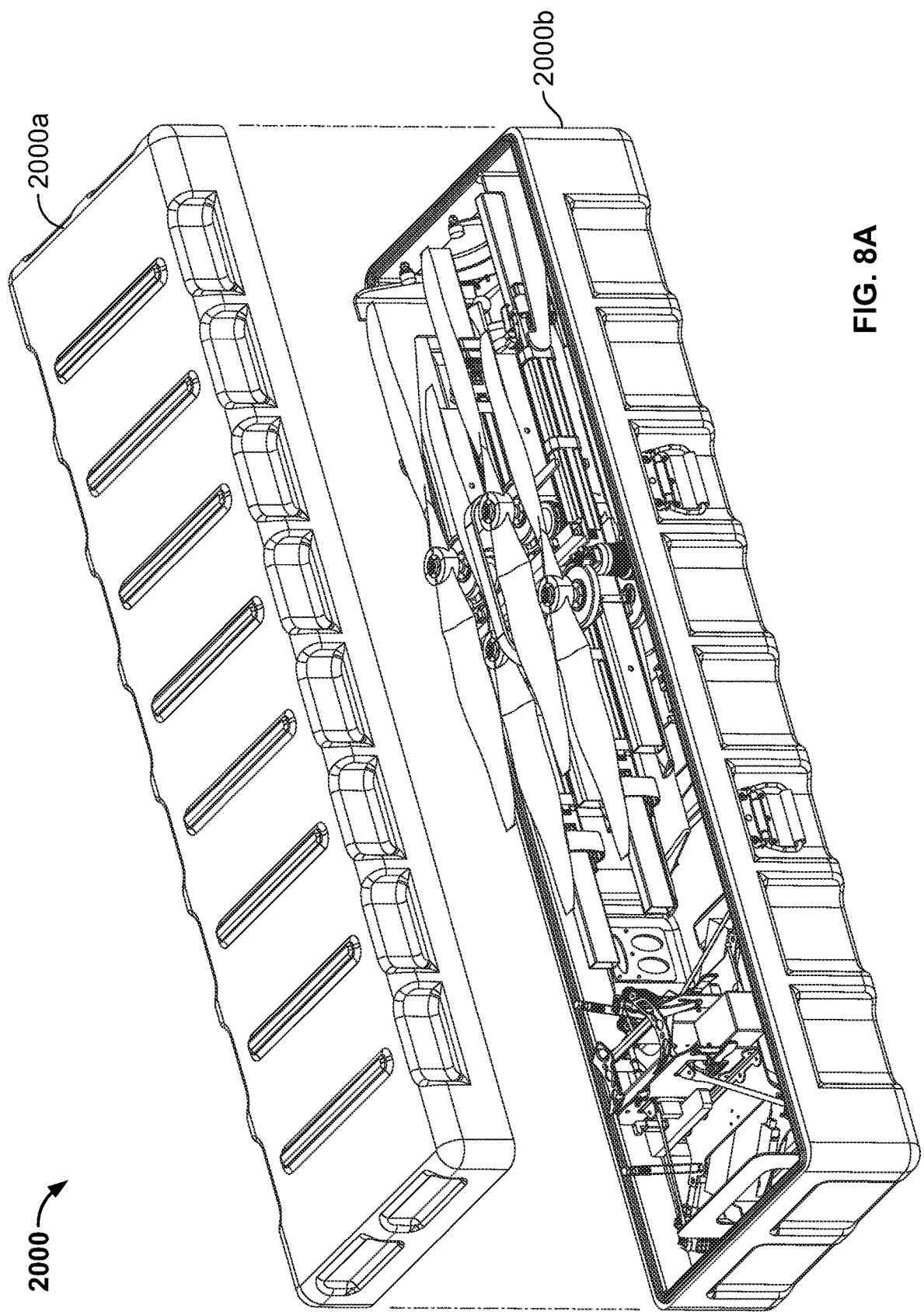
FIG. 8A is a partially exploded top perspective view of the multicopter of FIG. 1A stored in one example embodiment of the storage and launch system of the present disclosure.
Figure 8B:
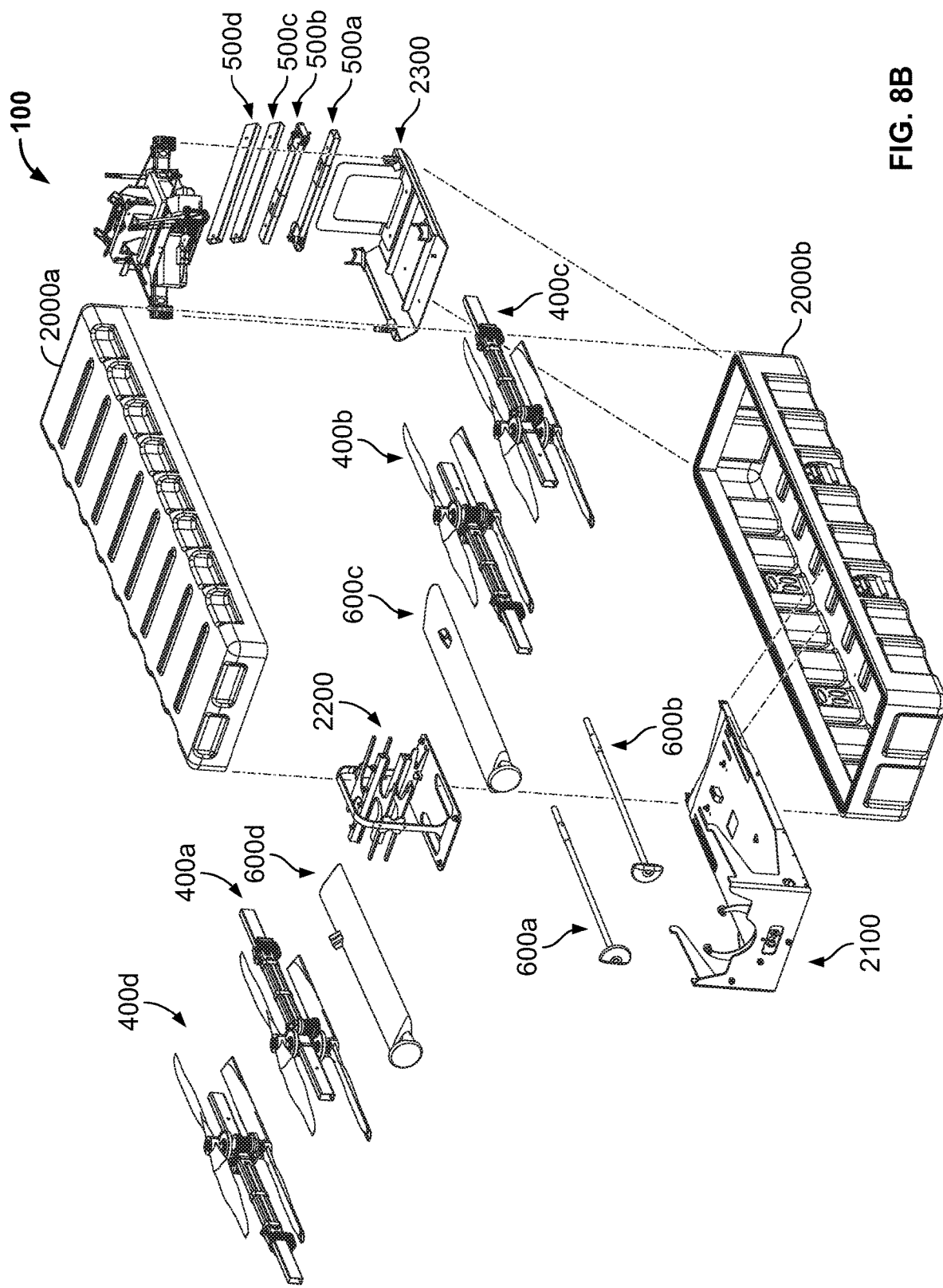
FIG. 8B is an exploded top perspective view of the storage and launch system of FIG. 8A, the 13 modules of the multicopter of FIG. 1A, and elements used to store the multicopter.
Figure 8C:
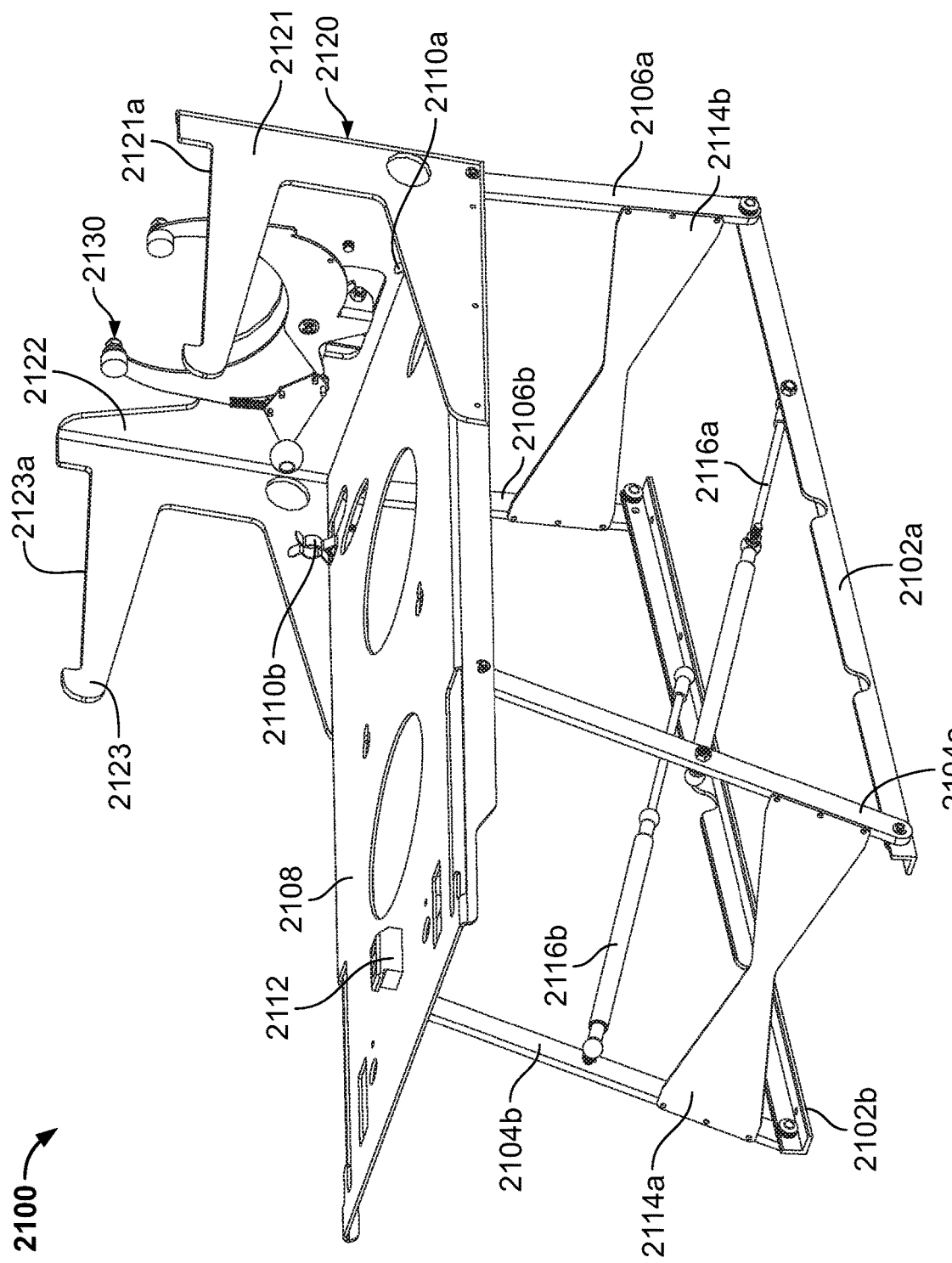
FIG. 8C is a top perspective view of the launch-assist assembly of the storage and launch system of FIG. 8A in the launch position.

As best shown in FIG. 8C, the launch-assist assembly 2100 includes: (1) first and second base brackets 2102a and 2102b; (2) first and second front legs 2104a and 2104b; (3) first and second rear legs 2106a and 2106b; (4) a tray 2108; (5) first and second front landing gear module retainers 2110a and 2110b; (6) a storage device lock engager 2112; (7) front and rear stabilizing brackets 2114a and 2114b; (8) first and second lockable gas springs 2116a and 2116b; and (9) an aircraft-engaging bracket 2120.

The first and second base brackets 2102a and 2102b are attached to the floor of the container bottom 2000a near one end. The first front leg 2104a is pivotably attached at one end to the front end of the first base bracket 2102a and pivotably attached at the other end to the tray 2108. Similarly, the second front leg 2104*b* is pivotably attached at one end to the front end of the second base bracket 2102*b* and pivotably attached at the other end to the tray 2108. The first rear leg 2106*a* is pivotably attached at one end to the rear end of the first base bracket 2102*a* and pivotably attached at the other end to the tray 2108. Similarly, the second rear leg 2106*b* is pivotably attached at one end to the rear end of the second base bracket 2102*b* and pivotably attached at the other end to the tray 2108. The front stabilizing bracket 2114*a* is attached to and extends between the first and second front legs 2104*a* and 2104*b*, and the rear stabilizing bracket 2114*b* is attached to and extends between the first and second rear legs 2106*a* and 2106*b*. The first lockable gas spring 2116*a* is pivotably attached at one end to the first base bracket 2102*a* between the first front leg 2104*a* and the first rear leg 2106*a* and pivotably attached at the other end to the first front leg 2104*a* between the first base bracket 2102*a* and the tray 2108. Similarly, the second lockable gas spring 2116*b* is pivotably attached at one end to the second base bracket 2102*b* between the second front leg 2104*b* and the second rear leg 2106*b* and pivotably attached at the other end to the second front leg 2104*b* between the second base bracket 2102*b* and the tray 2108. The storage device lock engager 2112, the first and second front landing gear module retainers 2110*a* and 2110*b*, and the aircraft engaging bracket 2120 are attached to the tray 2108.

The aircraft engaging bracket 2120 includes two spaced-apart generally parallel sides 2121 and 2123 having wing engaging surfaces 2121*a* and 2123*a*, respectively, and a back 2122 transverse (such as generally perpendicular) to, extending between, and connecting the sides 2121 and 2123. A fuselage-retaining assembly 2130 is rotatably mounted to the back plate 2122.

Figure 8D:
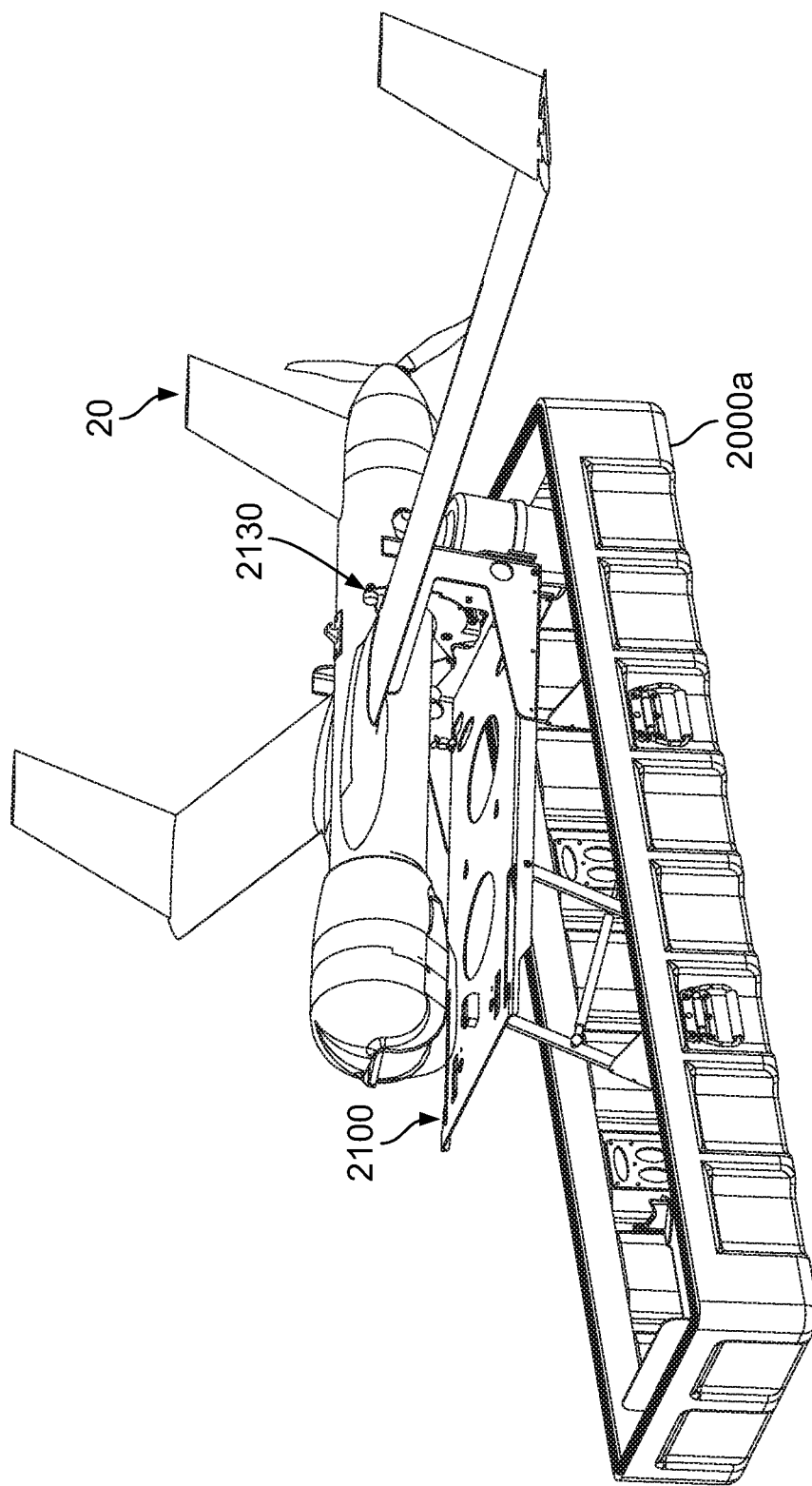
FIG. 8D is a top perspective view of the storage and launch system of FIG. 8A with the fixed-wing aircraft mounted thereto.

The above-described pivotable attachments enable the launch assist assembly 2100 to move from: (1) a storage position in which the first and second front legs 2104*a* and 2104*b*, the first and second back legs 2106*a* and 2106*b*, and the tray 2108 lay substantially flat along the floor of the container bottom 2000*a* (as best shown in FIGS. 8A and 8B); to (2) a launch position in which the first and second front legs 2104*a* and 2104*b* and the first and second back legs 2106*a* and 2106*b* extend upward from the floor of the container bottom 2000*a* such that the tray 2108 is spaced-apart from and upwardly angled relative to the floor of the container bottom 2000*a* (as best shown in FIGS. 8C and 8D) (and vice-versa). The operator can lock the launch assist assembly 2100 in the launch position by locking the first and second lockable gas springs 2116*a* and 2116*b*.

When in the launch position, the launch assist assembly 2100 facilitates launch of the fixed-wing aircraft 20 by orienting the fixed-wing aircraft 20 in a desired launch orientation and retaining the fixed-wing aircraft 20 in that orientation until the operator desires to launch the fixed-wing aircraft 20. As best shown in FIG. 8D, in preparation for launch, the operator inserts the fuselage of the fixed-wing aircraft 20 into the fuselage-retaining assembly 2130 of the aircraft engaging bracket 2120 and lays the wings of the fixed-wing aircraft 20 atop the first and second wing engaging surfaces 2123*a* and 2123*b* of the aircraft engaging bracket 2120.

The fuselage-retaining assembly 2130 is sized to receive the fuselage of the fixed-wing aircraft 20. The fuselage-retaining assembly 2130 is configured such that, after it receives the fuselage, the fuselage-retaining assembly 2130 does not release the fuselage until: (1) the operator disengages a safety mechanism; and (2) a force biasing the fuselage-retaining assembly 2130 against releasing the fuselage is overcome. This prevents undesired launch of the fixed-wing aircraft 20.

Figure 8E:
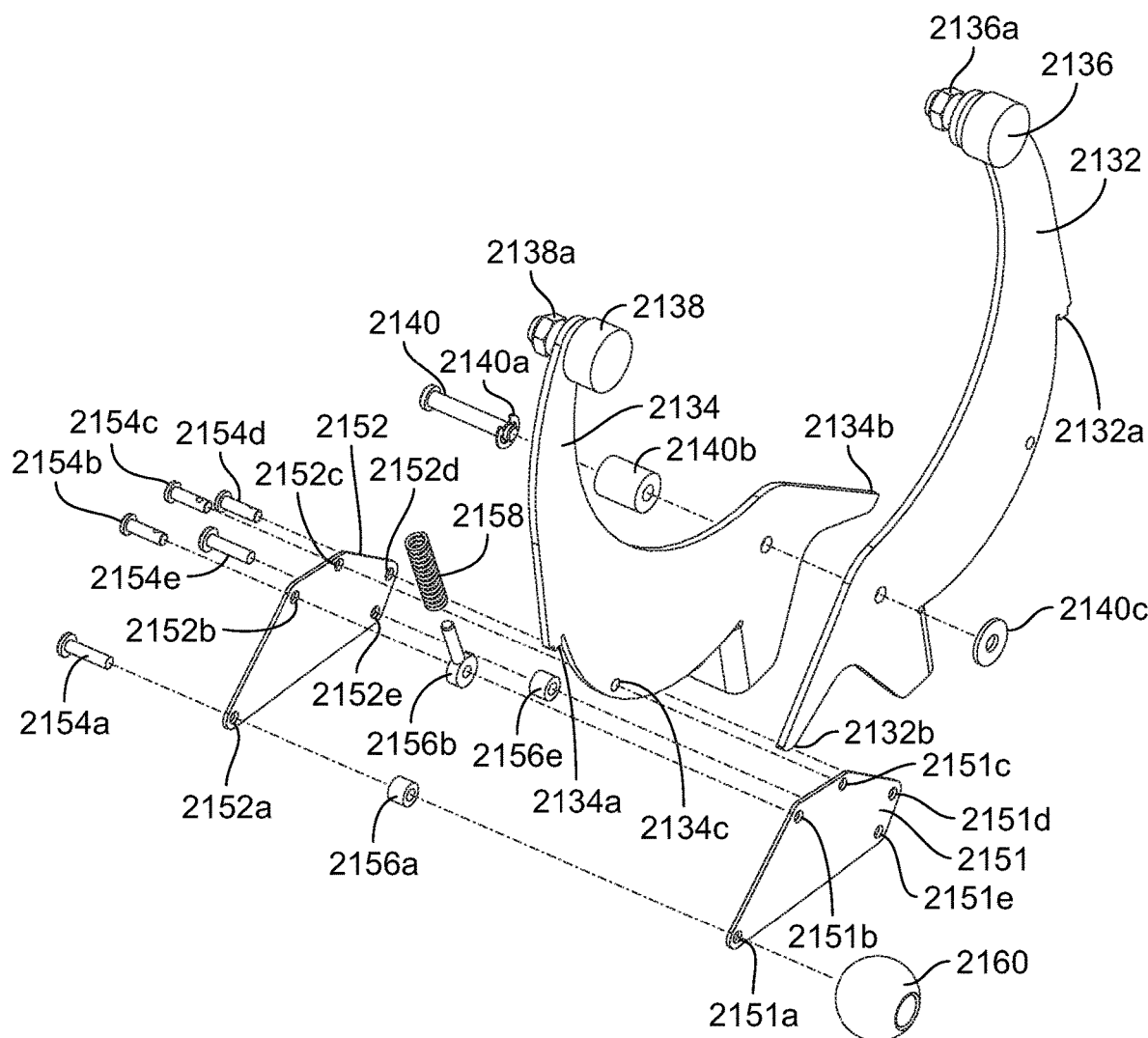
FIG. 8E is an exploded top perspective view of the fuselage-retaining assembly of the launch-assist assembly of FIG. 8C.
Figure 8F:
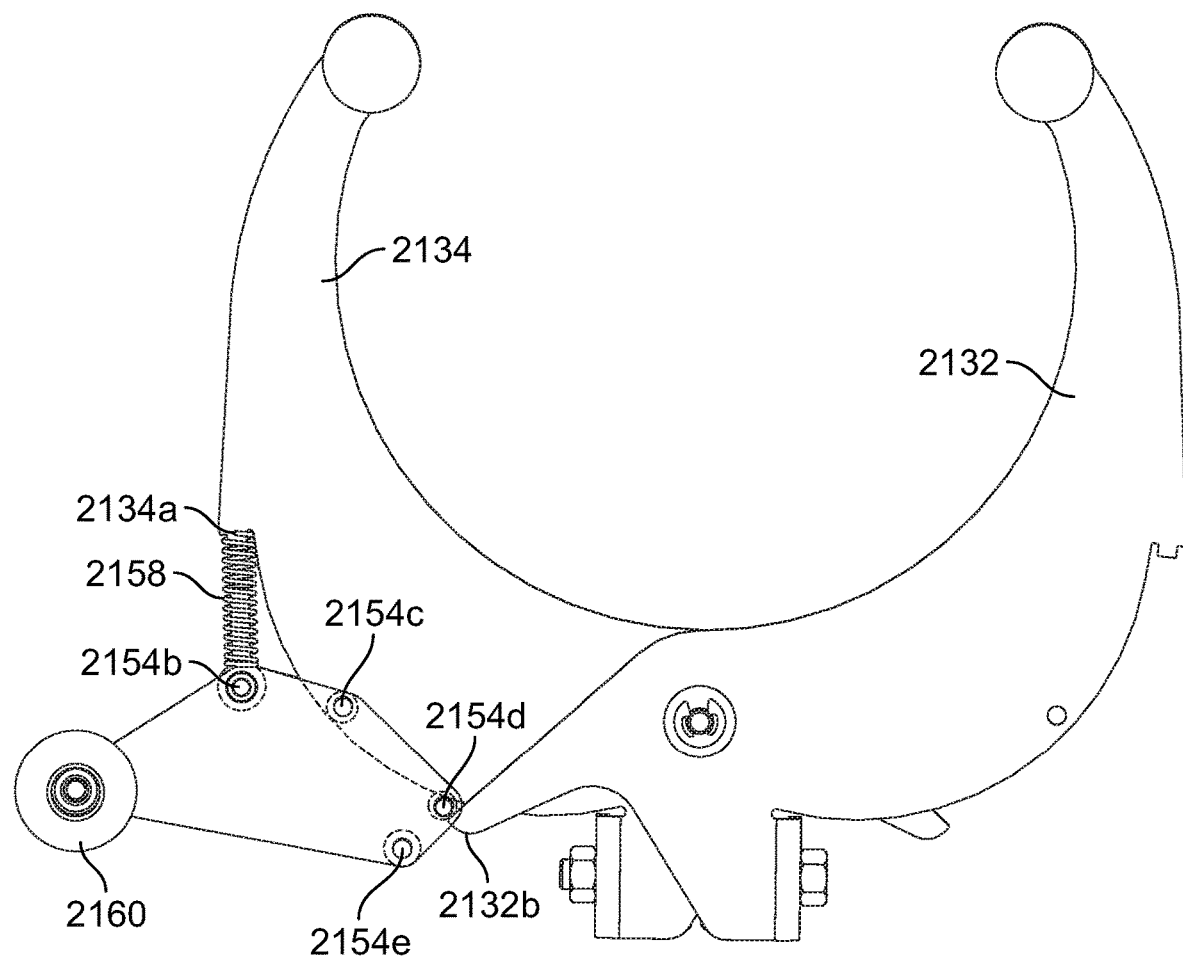
FIG. 8F is a front elevational view of the fuselage-retaining assembly of FIG. 8E.
Figure 8G:
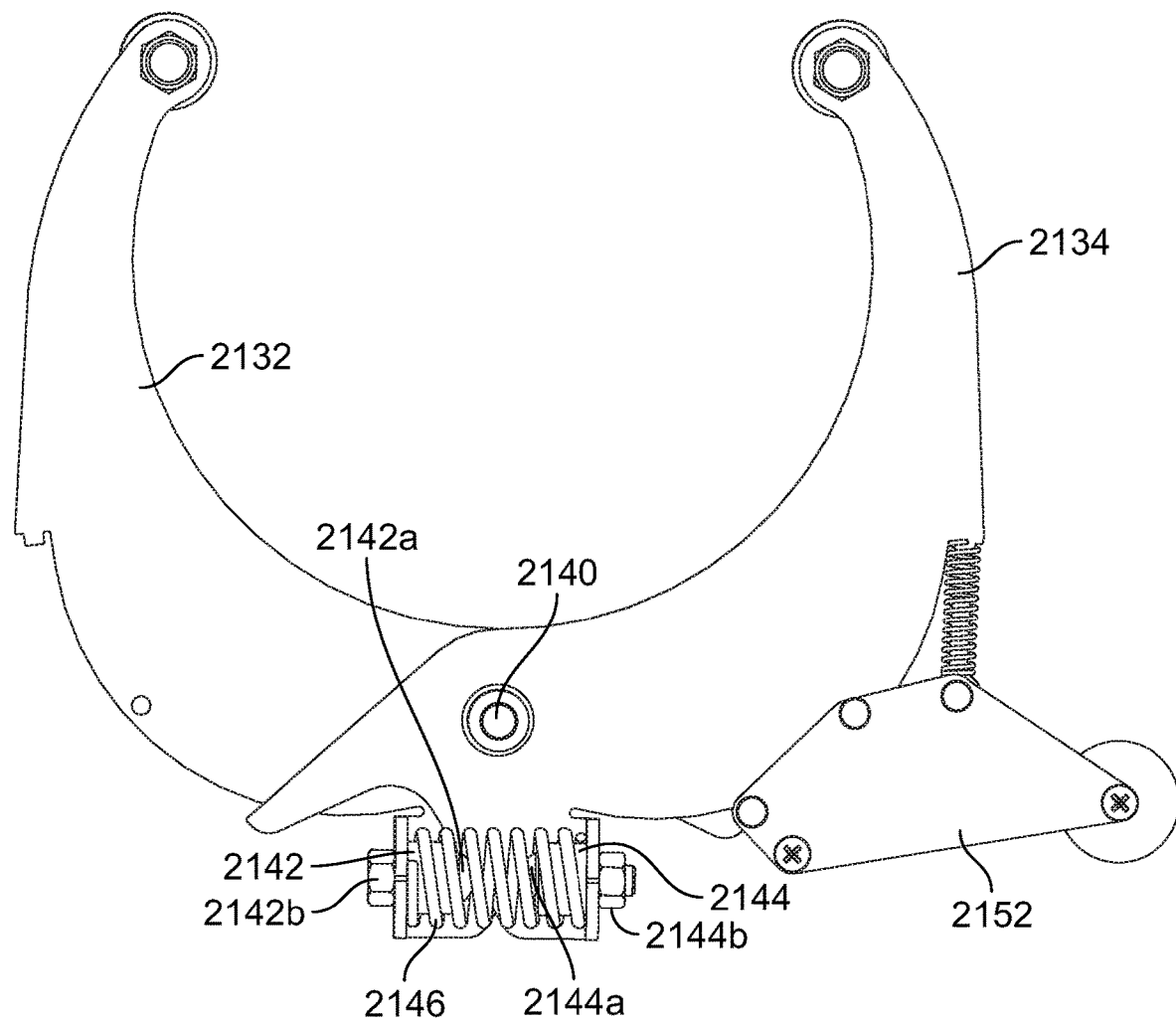
FIG. 8G is a back elevational view of the fuselage-retaining assembly of FIG. 8E.

As best shown in FIGS. 8E, 8F, and 8G, the fuselage-retaining assembly 2130 includes: (1) first and second pincers 2132 and 2134; (2) first and second rollers 2136 and 2138 and corresponding nuts 2136*a* and 2138*a*; (3) a grooved clevis pin 2140 and corresponding retaining ring 2140*a*, spacer 2140*b*, and washer 2140*c*; (4) first and second spring mounting spacers 2142 and 2144 and their corresponding fasteners 2142*a* and 2144*a* and nuts 2142*b* and 2144*b*; (5) a compression spring 2146; and (6) a safety mechanism 2150.

The safety mechanism 2150 includes: (1) front and rear plates 2151 and 2152; (2) fasteners 2154*a* and 2154*e*; (3) clevis pins 2154*b*, 2154*c*, and 2154*d*; (4) spacers 2156*a* and 2156*e*; (5) a rod end 2156*b*; (6) a compression spring 2158; and (7) a handle 2160.

The first and second pincers 2132 and 2134 are interchangeable, and have generally curved bodies that define rod end engagers 2132*a* and 2134*a*, respectively, along their outer edges and terminate at their lower ends in safety mechanism engagers 2132*b* and 2134*b*. The roller 2136 is attached via the nut 2136*a* to the upper end of the first pincer 2132, and the roller 2138 is attached via the nut 2138*a* to the upper end of the second pincer 2134. The rollers are rotatable with respect to their respective pincers. The first and second pincers 2132 and 2134 are pivotably connected to one another via the grooved clevis pin 2140, the spacer 2140*b*, the washer 2140*c*, and the retaining ring 2140*a*. Although not shown, the fuselage-retaining assembly 2130 is attached to the aircraft engaging bracket 2120 via this grooved clevis pin 2140.

In this embodiment, the first pincer is mounted on the grooved clevis pin in front of the second pincer (with respect to the view shown in FIG. 8E), though in other embodiments the second pincer may be mounted in front of the first pincer without changing how the fuselage-retaining assembly operates.

As best shown in FIG. 8G, the spring mounting spacer 2142 is mounted to a backwardly extending portion of the first pincer 2132 via the fastener 2142*a* and the nut 2142*b*. Similarly, the spring mounting spacer 2144 is mounted to a backwardly extending portion of the second pincer 2134 via the fastener 2144*a* and the nut 2144*b*. The compression spring 2146 is mounted on and extends between the spring mounting spacers 2142 and 2144.

The first and second pincers 2132 and 2134 are movable relative to one another from: (1) a fuselage-retaining orientation in which their upper ends are separated a first distance that is smaller than the diameter of the fuselage of the fixed-wing aircraft 20 (shown in FIGS. 8E and 8F); to (2) a fuselage-release orientation in which their upper ends are separated a second distance that is larger than the diameter of the fuselage of the fixed-wing aircraft 20 (not shown) (and vice-versa). Thus, when the first and second pincers 2132 and 2134 are in the fuselage-retaining orientation, the fuselage of the fixed-wing aircraft cannot escape the first and second pincers 2132 and 2134 (absent further separation of the pincers), while the fuselage can escape when the first and second pincers 2132 and 2134 are in the fuselage-release orientation.

The compression spring 2146 opposes separation of the first and second pincers 2132 and 2134 and therefore biases the first and second pincers 2132 and 2134 toward the fuselage-retaining orientation. Separating the first and second pincers 2132 and 2134 causes the backwardly extending portions of the first and second pincers 2132 and 2134 to compress the compression spring 2146, which causes the compression spring 2146 to exert forces on the backwardly extending portions of the first and second pincers 2132 and 2134 opposing that separation. Thus, to release the fuselage, this biasing force must be overcome.

Turning to the safety mechanism 2150, as best shown in FIG. 8E, the front plate 2151, the rear plate 2152, and the handle 2160 are attached to one another via: (1) the fastener 2154a extending through an opening 2152a in the rear plate 2152, through the spacer 2156a, through an opening 2151a in the front plate 2151, and into the handle 2160; (2) the clevis pin 2154b extending through an opening 2152a in the rear plate 2152, through an opening in the rod end 2156b, and through an opening 2151b in the front plate 2151; (3) the clevis pin 2154d extending through an opening 2152d in the second plate and an opening 2151d in the front plate 2151; and (4) the fastener 2154e extending through an opening 2152e in the rear plate 2152, through the spacer 2156e, and through an opening 2151e in the front plate 2151.

As best shown in FIGS. 8E and 8F, the safety mechanism 2150 is pivotably connected to the second pincer 2134 via the clevis pin 2154c extending through an opening 2152c in the rear plate 2152, an opening 2134c in the second pincer 2134, and an opening 2151c in the front plate 2151. One end of the safety compression spring 2158 is disposed around the rod end 2156b and the other end of the safety compression spring 2158 is disposed around the rod end engager 2134a of the second pincer 2134.

The safety mechanism 2150 is rotatable about the clevis pin 2134c from an engaged rotational position in which the safety mechanism 2150 prevents separation of the first and second pincers 2132 and 2134 from the fuselage-retaining orientation to the fuselage-release orientation (shown in FIGS. 8F and 8G) to a disengaged rotational position (not shown) in which the first and second pincers 2132 and 2134 are free to separate from the fuselage-retaining orientation to the fuselage-release orientation. The safety compression spring 2158 biases the safety mechanism 2150 into the engaged rotational position.

When in the engaged rotational position, the safety mechanism 2150 prevents separation of the first and second pincers 2132 and 2134 from the fuselage-retaining orientation to the fuselage-release orientation. Separating the first and second pincers 2132 and 2134 when the safety mechanism 2150 is in the engaged rotational position results in: (1) the safety mechanism engager 2132b of the first pincer 2132 engaging the clevis pin 2154d (since the clevis pin 2154d is in the path of rotation of the safety mechanism engager 2132b of the first pincer 2132); and (2) the rod end engager 2134a of the second pincer 2134 engaging the rod end 2136b. This prevents the first and second pincers 2132 and 2134 from rotation relative to one another and therefore prevents further separation of the first and second pincers 2132 and 2134 to the fuselage-release orientation.

To enable the first and second pincers 2132 and 2134 to separate from the fuselage-retaining orientation to the fuselage-release orientation, the operator disengages the safety mechanism by rotating the safety mechanism 2150 from the engaged rotational position to the disengaged rotational position. To do so, the operator pulls the handle 2160 upward with enough force to overcome the spring-biasing force of the compression spring 2158 and compress the compression spring 2158 until the clevis pin 2154d is no longer in the path of rotation of the safety mechanism engager 2132b of the first pincer 2132. At this point, the safety mechanism 2150 is in the disengaged rotational position, and the first and second pincers 2132 and 2134 can separate to the fuselage-release orientation.

In certain embodiments, a safety rope, tether, wire, cable, or other flexible member is attached to the handle (or any other suitable component) of the safety mechanism to facilitate disengaging the safety mechanism. When the flexible safety member is tensioned (such as via an operator pulling on the flexible safety member), the safety mechanism rotates from the engaged rotational position to the disengaged rotational position, thereby disengaging the safety mechanism. The flexible safety member may be relatively long, which enables the operator to stand a safe distance away from the fixed-wing aircraft during the launch process and still be able to disengage the safety mechanism.

By intentionally commanding full multicopter thrust without releasing the safety mechanism, an operator may execute a "refuse takeoff" test, which is particularly useful for confirming full-power performance of the complete electromechanical system without fear of flight-related mishap in the event that one or more components of the system should fail during the test.

2.2 Rotor Arm Module and Rear Landing Gear Module Storage Device

Figure 8H:
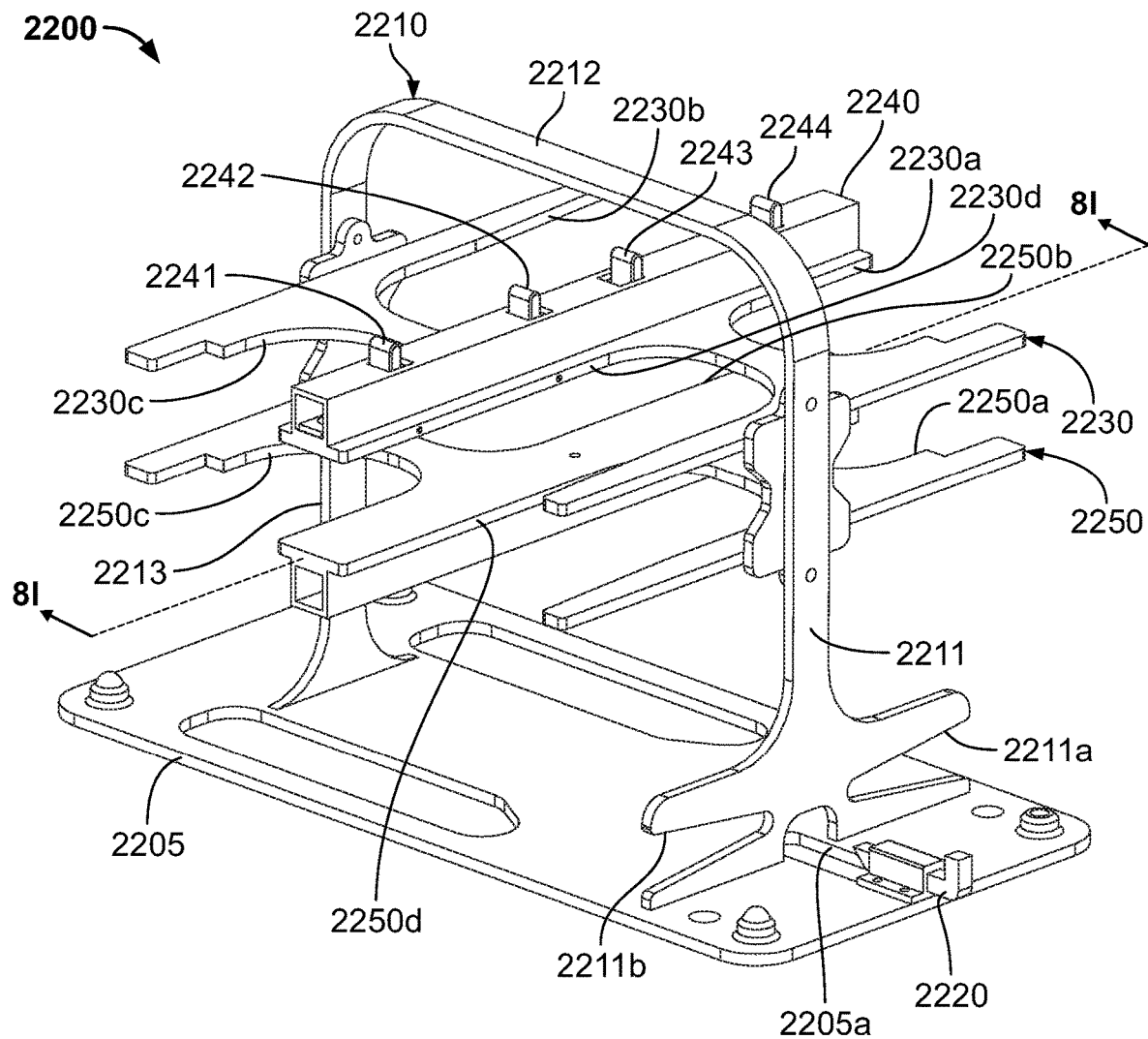
FIG. 8H is a top perspective view of the rotor arm module and rear landing gear module storage device of the present disclosure.
Figure 8I:
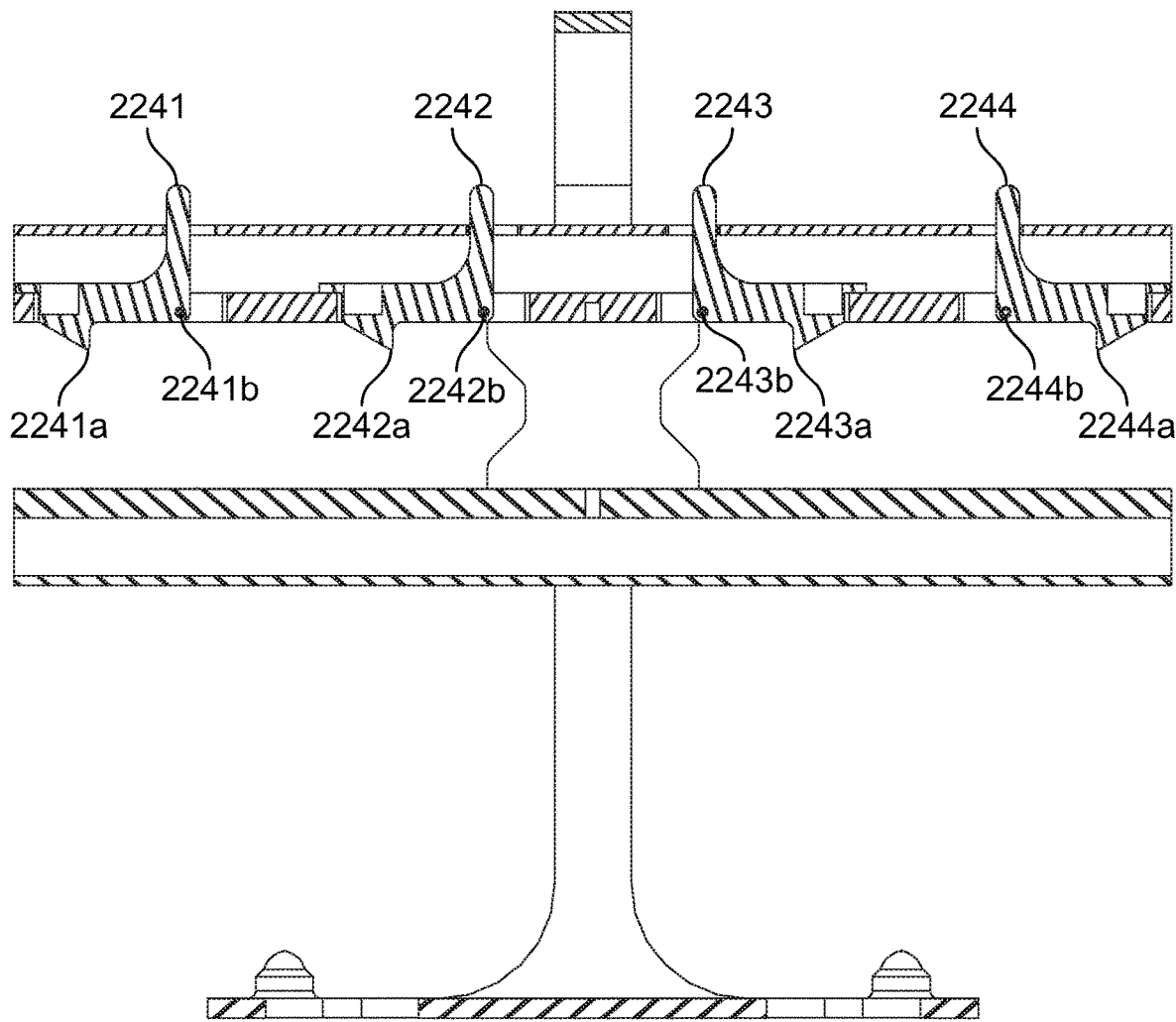
FIG. 8I is a cross-sectional view of the rotor arm module and rear landing gear module storage device of FIG. 8H taken substantially along line 8I-8I of FIG. 8H.

The rotor arm module and rear landing gear module storage device 2200 is shown in FIGS. 8H and 8I. The rotor arm module and rear landing gear module storage device 2200 is the element of the storage and launch system 2000 to which the rotor arm modules 400a to 400d and the rear landing gear modules 600c and 600d can be mounted and compactly stored. The rotor arm module and rear landing gear module storage device 2200 includes: (1) a base 2205; (2) a handle 2210; (3) an upper rotor arm module constraining plate 2230; (4) a lower rotor arm module constraining plate 2250; and (5) a lock 2220 (which is a slide bolt in this embodiment but can be any suitable device).

The base 2205 defines a storage device lock engager receiving cavity 2205a therethrough sized to receive the storage device lock engager 2112 of the launch-assist assembly 2100. The lock 2220 is fixedly attached to the base 2205 near the storage device lock engager receiving cavity such that the lock 2220 can engage the storage device lock engager 2112 when the storage device lock engager 2112 is received in the storage device lock engager receiving cavity 2205a to lock the rotor arm module and rear landing gear module storage device 2200 to the launch assist assembly 2100.

The handle 2210 includes two opposing, spaced-apart sides 2211 and 2213 and a top 2212 extending between the sides 2211 and 2213. The sides 2211 and 2213 are attached to the base 2205. The side 2211 includes two surfaces 2211a and 2211b each defining a rear landing gear module receiving cavity sized and shaped to receive a portion of one of the rear landing gear modules 600c and 600d.

The upper rotor arm module constraining plate 2230 is attached to the handle 2210. The upper rotor arm module constraining plate 2230 includes a plurality of surfaces 2230a, 2230b, 2230c, and 2230d each defining a rotor motor receiving cavity sized and shaped to receive a rotor motor of one of the rotor arm modules.

The upper rotor arm module constraining plate 2230 also includes a plurality of rotor arm module retainers 2241, 2242, 2243, and 2244 disposed within an enclosing bracket 2240. The rotor arm module retainer 2241 includes a locking tab 2241a extending below the upper rotor arm module constraining plate 2230 and is pivotably connected to the upper rotor arm module constraining plate 2230 via a pin 2241b. The rotor arm module retainer 2242 includes a locking tab 2242*a* extending below the upper rotor arm module constraining plate 2230 and is pivotably connected to the upper rotor arm module constraining plate 2230 via a pin 2242*b*. The rotor arm module retainer 2243 includes a locking tab 2243*a* extending below the upper rotor arm module constraining plate 2230 and is pivotably connected to the upper rotor arm module constraining plate 2230 via a pin 2243*b*. The rotor arm module retainer 2244 includes a locking tab 2244*a* extending below the upper rotor arm module constraining plate 2230 and is pivotably connected to the upper rotor arm module constraining plate 2230 via a pin 2244*b*.

The rotor arm module retainers are pivotable from a lock rotational position (shown in FIG. 8I) to a release rotational position (not shown). Suitable biasing elements (such as compression spring, not shown) bias the rotor arm module retainers to the lock rotational position.

The lower rotor arm module constraining plate 2250 is attached to the handle 2210 below the upper rotor arm module constraining plate 2230. The lower rotor arm module constraining plate 2250 includes a plurality of surfaces 2250*a*, 2250*b*, 2250*c*, and 2250*d* each defining a rotor motor receiving cavity sized and shaped to receive a rotor motor of one of the rotor arm modules.

2.3 Hub Module Storage Tray

Figure 8J:
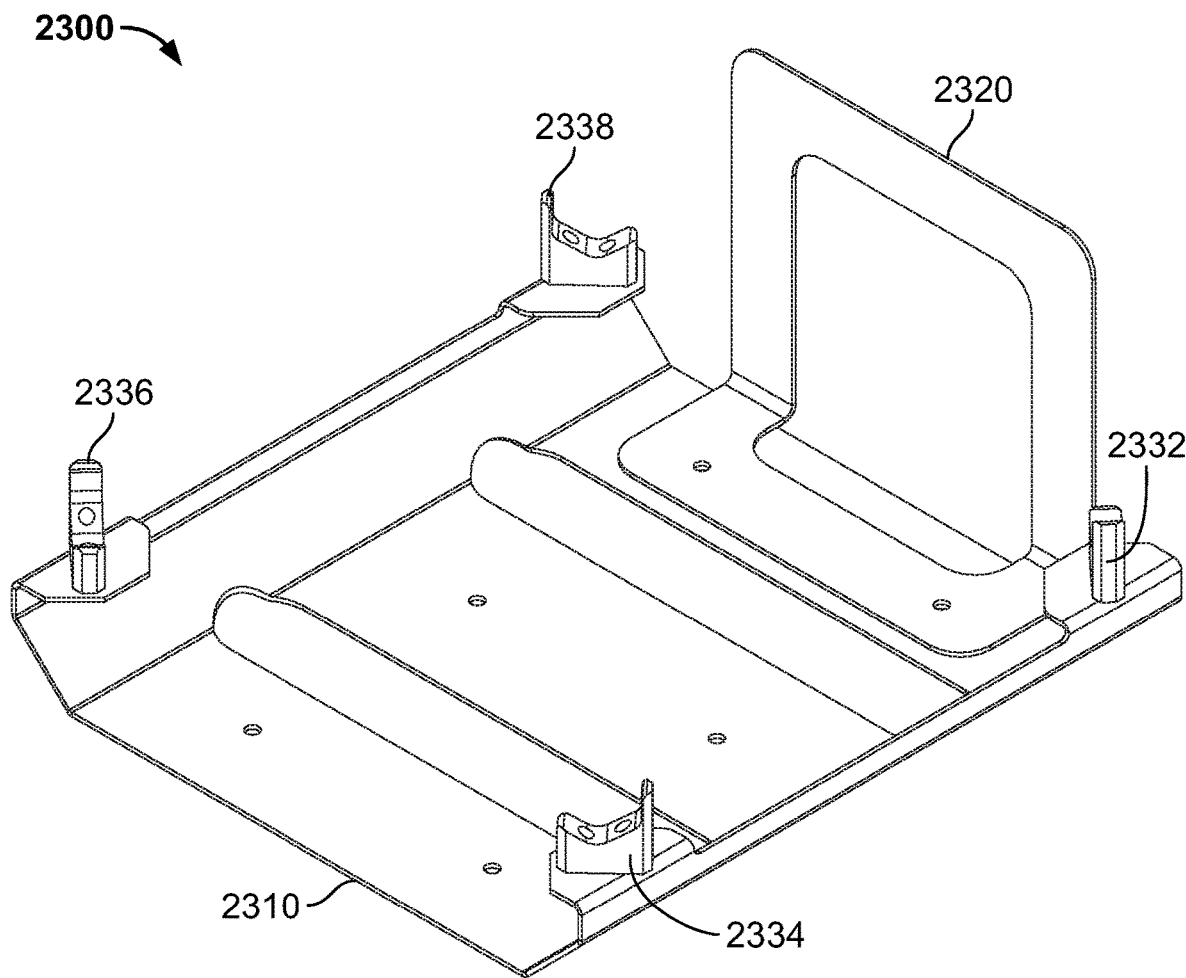
FIG. 8J is a top perspective view of the hub module storage tray of the present disclosure.

The hub module storage tray 2300 is shown in FIG. 8J. The hub module storage tray 2300 is the element of the storage and launch system 2000 to which the hub module 200 is mounted for storage. The hub module storage tray 2300 includes a generally rectangular base 2310, a handle 2320 fixedly attached to the base 2310, and four female blind mate connector engagers 2332, 2334, 2336, and 2338 fixedly attached to the base 2310. The female blind mate connector engagers are sized and shaped to engage the top surfaces of the female blind mate connectors 231 of the hub module 100.

2.4 Storing the Multicopter in the Multicopter Storage Container

To store the multicopter 10 in the container of the storage and launch system 2000, the operator first disassembles the multicopter 10 into the 13 modules or subassemblies, as described above. The operator moves the launch-assist assembly 2100 into its launch position.

The operator positions the rotor arm module and rear landing gear module storage device 2200 atop the launch-assist assembly 2100 such that the storage device lock engager 2112 of the launch-assist assembly 2100 is received in the storage device lock engager receiving cavity 2205*a*. The operator engages the storage device lock engager 2112 with the lock 2220 to lock the rotor arm module and rear landing gear module storage device 2200 to the launch assist assembly 2100.

The operator slides the rotor arm module 400*a* into the space between the upper and lower rotor arm module constraining plates 2230 and 2250 of the rotor arm module and rear landing gear module storage device 2200 until: (1) the lower rotor motor is disposed within the rotor motor receiving cavities defined by the surfaces 2230*b* and 2250*b*; and (2) the rotor arm module retainer 2243 locks the rotor arm module 400*a* into place.

The operator slides the rotor arm module 400*b* into the space between the upper and lower rotor arm module constraining plates 2230 and 2250 of the rotor arm module and rear landing gear module storage device 2200 until: (1) the lower rotor motor is disposed within the rotor motor receiving cavities defined by the surfaces 2230*d* and 2250*d*; and (2) the rotor arm module retainer 2242 locks the rotor arm module 400*b* into place.

The operator slides the rotor arm module 400*c* into the space between the upper and lower rotor arm module constraining plates 2230 and 2250 of the rotor arm module and rear landing gear module storage device 2200 until: (1) the upper rotor motor is disposed within the rotor motor receiving cavities defined by the surfaces 2230*c* and 2250*c*; and (2) the rotor arm module retainer 2241 locks the rotor arm module 400*c* into place.

The operator slides the rotor arm module 400*d* into the space between the upper and lower rotor arm module constraining plates 2230 and 2250 of the rotor arm module and rear landing gear module storage device 2200 until: (1) the upper rotor motor is disposed within the rotor motor receiving cavities defined by the surfaces 2230*a* and 2250*a*; and (2) the rotor arm module retainer 2244 locks the rotor arm module 400*d* into place.

The operator inserts the front landing gear modules 600*a* and 600*b* into the first and second front landing gear module retainers 2110*a* and 2110*b* on the tray 2108 of the launch-assist assembly 2100.

The operator inserts the rear landing gear module 600*c* into the rear landing gear module receiving cavity defined by the surface 2211*b* and the rear landing gear module 600*d* into the rear landing gear module receiving cavity defined by the surface 2211*a*.

The operator places the landing gear extensions 500*a* to 500*d* in the container bottom 2000*a* behind the handle 2320 of the hub module storage tray 2300. The operator attaches the container top 2000*b* to the container bottom 2000*a* to complete storage.

The operator inverts the hub module 100 and engages the female blind mate connector engagers 2332, 2334, 2336, and 2338 of the hub module storage tray 2300 with the female blind mate connectors 231 of the hub module 100.

The operator moves the launch-assist assembly 2100 to the storage position.

In certain embodiments, the container top or the container bottom includes one or more handles (such as an extendable handle) or one or more wheels to facilitate moving the container. In certain embodiments, the container top or the container bottom includes one or more locks configured to lock the container top to the container bottom.

3. Anchor System

The anchor system 3000 is shown in FIGS. 9A to 9D. The anchor system 3000 is usable along with the multicopter 10 and the flexible capture member 5000 to retrieve the fixed-wing aircraft 20 from wing-borne flight. In this example embodiment, the anchor system 3000 is stored separately from the storage and launch system 2000. That is, the storage and launch system 2000 is stored in one container (along with the multicopter 10) and the anchor system 3000 is stored in another container. These containers may be identical to or different from one another.

Figure 9A:
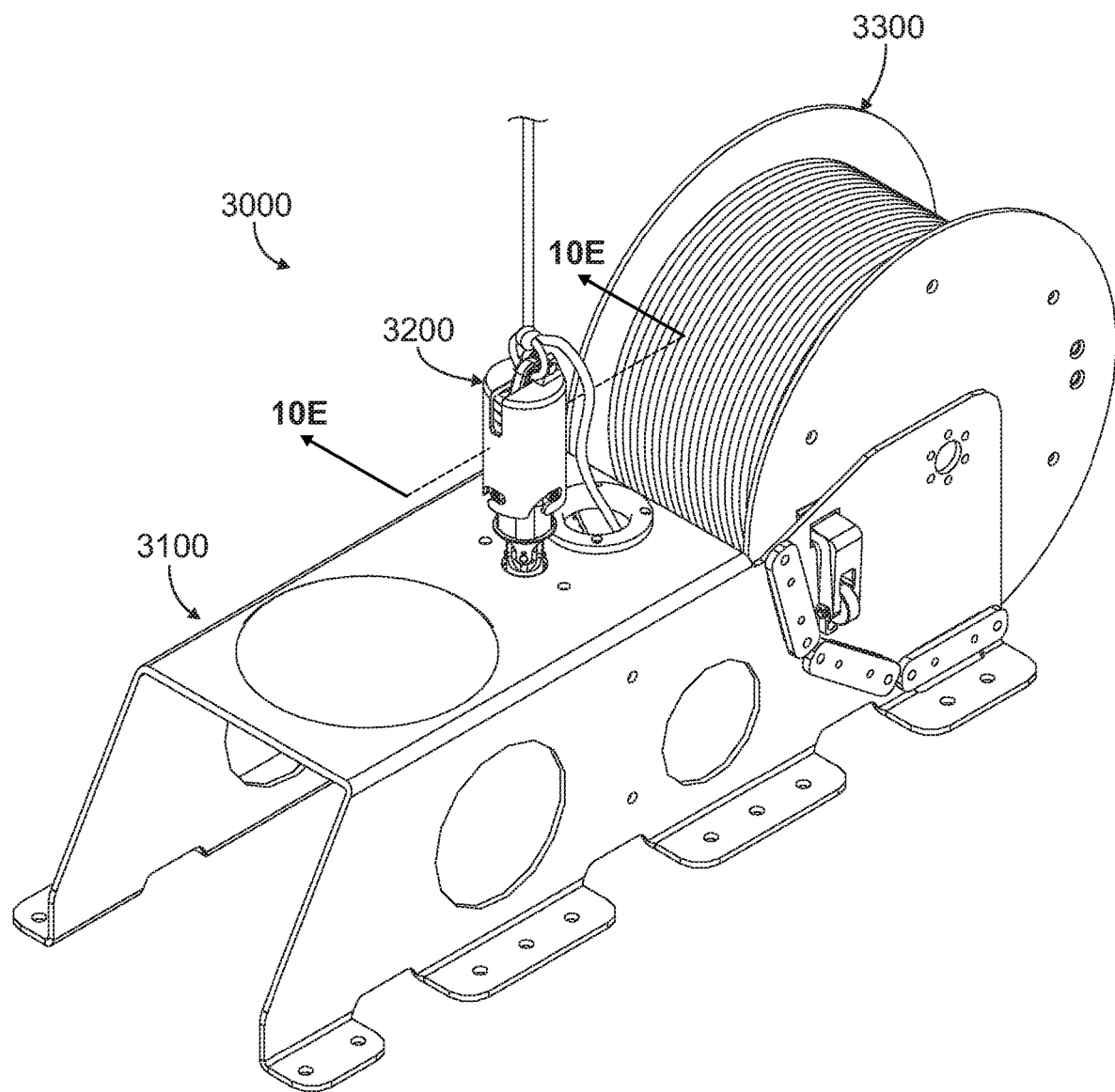
FIG. 9A is a top perspective view of one example embodiment of the anchor system of the present disclosure.
Figure 9B:
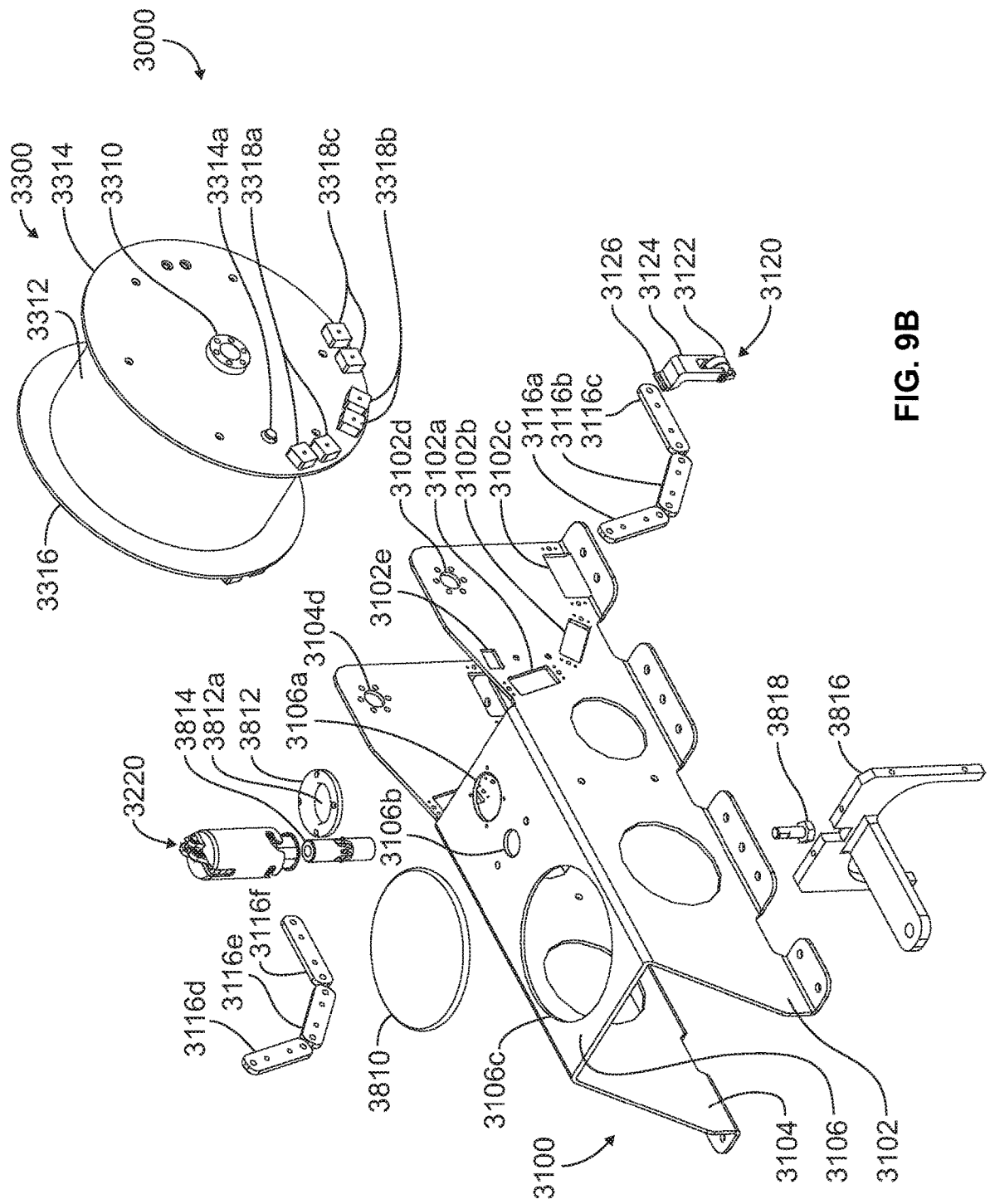
FIG. 9B is a partially exploded top perspective view of the anchor system of FIG. 9A.

As best shown in FIGS. 9A and 9B, the anchor system includes: (1) an anchor system base 3100; (2) a breakaway device 3200 attached to the anchor system base 3100; and (3) a flexible capture member payout and retract device 3300 attached to the anchor system base 3100. Example embodiments of each of these elements are described below.

3.1 Anchor System Base

As best shown in FIGS. 9A and 9B, the anchor system base 3100 is the element of the anchor assembly 3000 that serves as a mount for the remaining elements of the anchor system 3000. The anchor system base 3100 includes two spaced-apart generally parallel sides 3102 and 3104 and a top 3106 transverse (such as generally perpendicular) to, extending between, and connecting the sides 3102 and 3104.

The side 3102 defines: (1) first, second, and third braking openings 3102*a*, 3102*b*, and 3102*c* therethrough; (2) a stator mounting opening 3102*d* therethrough; and (3) a locking element engager receiving opening 3102*e* therethrough. The side 3104 defines similar openings therethrough, some of which are not shown or labeled.

The top 3106 defines: (1) a fairlead mounting opening 3106*a* therethrough; (2) a U-joint mounting opening 3106*b* therethrough; and (3) a GPS antenna mounting opening 3106*c* therethrough.

A GPS antenna and U-joint mount 3816 is attached to the underside of the top 3106 of the anchor system base 3100 such that it is positioned within the cavity formed by the sides 3102 and 3104 and the top 3106. A GPS antenna 3810 is attached to the GPS antenna and U-joint mount 3816 such that the GPS antenna 3810 extends through the GPS antenna mounting opening 3106*c* of the top 3106. A U-joint 3814 is attached to the GPS antenna and U-joint mount 3816 such that the U-joint 3814 extends through the U-joint mounting opening 3106*b* of the top 3106.

A fairlead 3812 is attached to the upper surface of the top 3106 such that a flexible capture member receiving opening 3812*a* defined through the fairlead 3812 is generally aligned with the fairlead mounting opening 3106*a* of the top 3106.

Backing plates 3116*a*, 3116*b*, and 3116*c* are attached to the exterior surface of the side 3102 such that they generally cover the braking openings 3102*a*, 3102*b*, and 3102*c*, respectively. Backing plates 3116*d*, 3116*e*, and 3116*f* are attached to the exterior surface of the side 3104 such that they generally cover respective braking openings (not shown). The backing plates 3116*a* to 3116*f* are made of iron in this embodiment. Magnets 3318*a* are attached to the backing plate 3116*a* such that the magnets 3318*a* extend through the braking opening 3102*a*, magnets 3318*b* are attached to the backing plate 3116*b* such that the magnets 3318*b* extend through the braking opening 3102*b*, and magnets 3318*c* are attached to the backing plate 3116*c* such that the magnets 3318*c* extend through the braking opening 3102*c*. Similar magnets are attached to the backing plates 3316*d*, 3316*e*, and 3316*f*. FIG. 9B shows the magnets' position relative to the first flange of the flexible capture member and payout device (described below).

A rotation prevention device 3120 is also attached to the exterior surface of the side 3102 near the locking element engager receiving opening 2102*e* of the side 3012. The rotation prevention device 3120 includes a mount 3122 (such as a pillow block bearing), a retract spring (not shown), and a pawl 3124 pivotably attached to the mount 3122. A locking element engager 3126 extends from the free end of the pawl 3124. The rotation prevention device 3120 is attached to the side 3102 such that the locking element engager 3126 extends through the locking element engager receiving opening 3102*e*. The pawl 3124 is rotatable about its pivotable attachment to the mount 3122 from a locked position in which the locking element engager 3126 contacts the end cap 3314 and can engage the locking element 3314*a* and an unlocked position in which the locking element engager does not contact the end cap 3314 and cannot engage the locking element 3314*a*. The rotation-prevention device 3120 automatically retracts in the payout direction, and it remains clear as the flexible capture member payout and retract device (described below) retracts the flexible capture member post-capture. This automatically retracting rotation prevention device 3120 enables an operator to preload the flexible capture member payout and retract device device during preflight and, upon impact during capture, the flexible capture member payout and retract device can retract more flexible capture member length than it paid out. This feature is particularly useful for minimizing pendula swing of the fixed wing aircraft 20 as it is lowered to the ground post-capture.

3.2 Breakaway Device

Figure 9C:
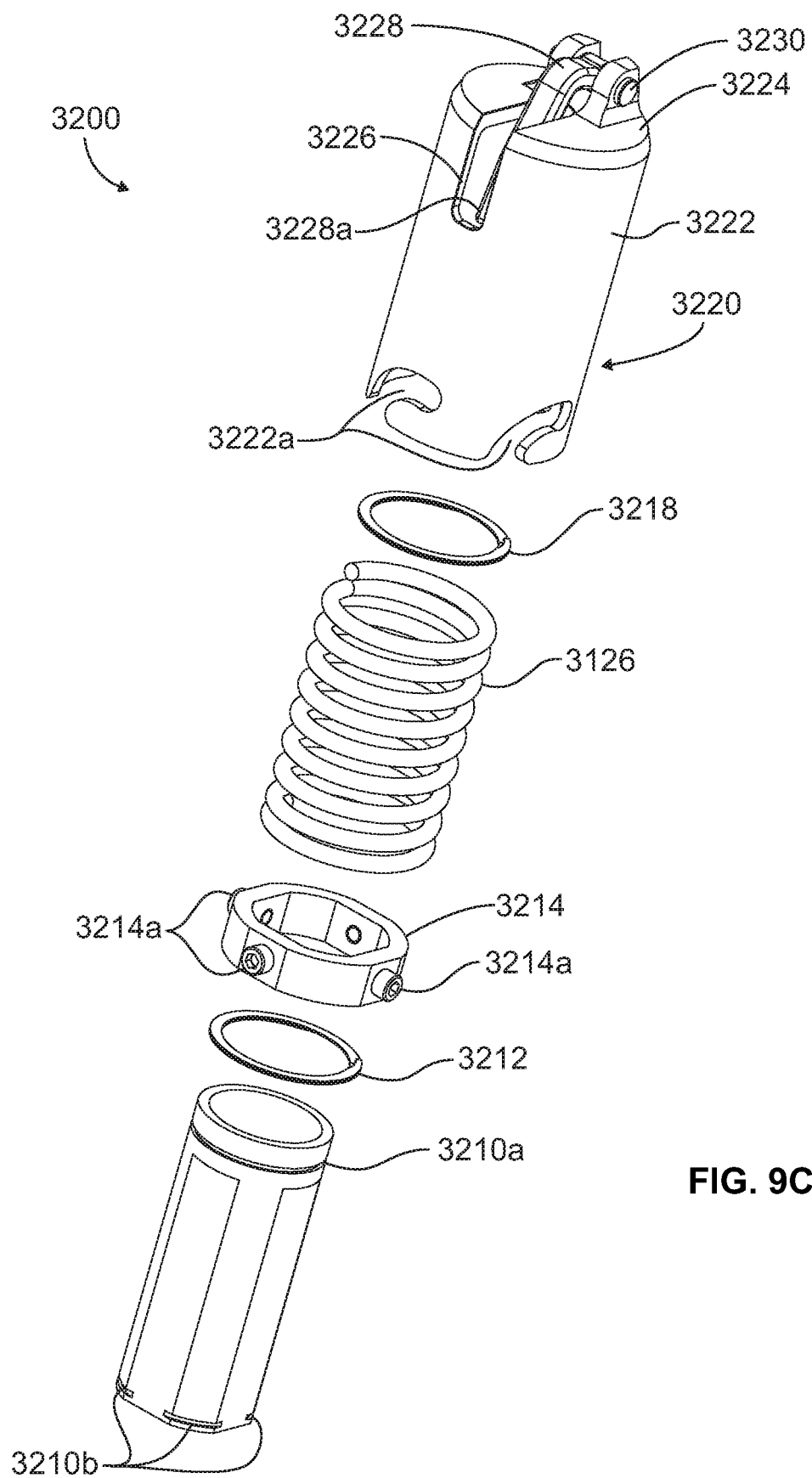
FIG. 9C is an exploded top perspective view of the breakaway device of the anchor system of FIG. 9A.

As best shown in FIG. 9C, the breakaway device 3200 enables the multicopter 10 to maintain a desired tension in the flexible capture member 5000 before the fixed-wing aircraft 20 captures the flexible capture member 5000 during retrieval. The breakaway device 3200 prevents the flexible capture member payout and retract device 3300 from paying out or retracting the flexible capture member 5000 until a tension in the flexible capture member 5000 reaches a certain threshold during retrieval. The breakaway device 3200 includes: (1) a generally cylindrical hollow shaft 3210; (2) a lower retaining ring 3212; (3) a generally annular collar 3214; (4) a compression spring 3216; (5) an upper retaining ring 3218; and (6) a breakaway sleeve 3220.

The shaft 3210 defines an upper retaining ring seat 3210*a* near its upper end in which the upper retaining ring 3218 is seated such that the upper retaining ring 3218 cannot slide along the shaft 3210 and a plurality of grooves forming a lower retaining ring seat 3210*b* in which the lower retaining ring 3212 is seated such that the lower retaining ring 3212 cannot slide along the shaft 3210.

The collar 3214 is slidably mounted around the shaft 3210 between the upper retaining ring 3218 and the lower retaining ring 3212. The collar includes a plurality of breakaway sleeve retainers 3214*a* that extend radially outward from the outer surface of the collar 3214.

The compression spring 3216 is slidably mounted around the shaft 3210 between the upper retaining ring 3218 and the collar 3214.

The breakaway sleeve 3220 includes a generally cylindrical hollow body 3222 and a cap 3224 at its upper end. The lower end of the body 3222 defines a plurality of breakaway sleeve retainer receiving slots 3222*a* therethrough. The breakaway sleeve retainer receiving slots 3222*a* are open at one end, extend generally upward and circumferentially around the body 3222, and dip slightly downward before terminating. A finger 3228 is pivotably attached to the cap 3224 via a suitable fastener 3230 (such as a grooved clevis pin and retaining ring). The body 3222 and the cap 3224 define a finger escape slot 3226 therethrough. The finger 3228 is rotatable from a rotational position in which the free end 3228*a* of the finger 3228 is located within the interior of the breakaway sleeve 3220 to a rotational position in which the free end 3228*a* is outside of the interior of the breakaway sleeve 3220 (after passing through the finger escape slot 3226).

The breakaway sleeve 3220 is removably attachable to the collar 3214 via the breakaway sleeve retainers 3214*a* and the breakaway sleeve retainer receiving slots 3222*a*. To attach the breakaway sleeve 3220 to the collar 3214, the operator: (1) aligns the openings of the breakaway sleeve retainer receiving slots 3222*a* of the breakaway sleeve 3220 with the breakaway sleeve retainers 3214*a* of the collar 3214; (2) pushes downward on the breakaway sleeve 3220 to slightly compress the compression spring 3216 until the openings of the breakaway sleeve retainer receiving slots 3222*a* receive the breakaway sleeve retainers 3214*a*; (3) rotates the breakaway sleeve 3220 with respect to the collar 3214 such that the breakaway sleeve retainers travel through and to the end of their respective breakaway sleeve retainer receiving slots 3222a (clockwise with respect to the view shown in FIG. 9C); and (4) releases the breakaway sleeve 3220, which enables the compression spring 3216 to extend and lock the breakaway sleeve retainers 3214a within their respective breakaway sleeve retainer receiving slots 3222a. To detach the breakaway sleeve 3220 form the collar 3214, the operator reverses the process.

The breakaway device 3220 is fixedly attached to the U-joint 3814 of the anchor system base 3100.

3.3 Flexible Capture Member Payout and Retract Device

As best shown in FIG. 9B, the flexible capture member payout and retract device 3300 absorbs a portion of the kinetic energy of the fixed-wing aircraft 20 after the fixed-wing aircraft 20 captures the flexible capture member 5000 by paying out part of the flexible capture member 5000 after capture from a spool while simultaneously applying various braking forces to the spool to slow the aircraft. As the aircraft slows and comes to a stop, flexible capture member payout and retract device 3300 retracts at least part of the paid-out flexible capture member 5000 to generally prevent the now-dangling fixed-wing aircraft 20 from swinging around below the multicopter 10.

The flexible capture member payout and retract device 3300 includes: (1) a stator 3310; (2) a drum 3312 rotatably mounted to the stator 3310; (3) a first electrically conductive flange 3314 having a locking element 3314a extending therefrom and fixedly attached to one end of the drum 3312; and (4) a second electrically conductive flange 3316 fixedly attached to the opposite end of the drum 3312.

The flexible capture member payout and retract device 3300 is attached to the anchor system base 3100 via the stator 3310. Specifically, the flexible capture member payout and retract device 3300 is attached to the anchor system base 3100 such that the stator 3310 extends between the first and second stator mounting openings 3102d and 3104d of the first and second sides 3102 and 3104 of the anchor system base 3100.

Although not shown, the flexible capture member payout and retract device 3300 also includes a suitable biasing element—such as a power spring—disposed within the interior of the drum 3312. Inside the drum 3312, the arbor end of the power spring is anchored to the stator 3310. Upon impact, during retrieval, the power spring is forced to wrap around the stator 3310, transferring wraps from the drum 3312 to the stator 3310 inside the flexible capture member payout and retract device 3300. After the kinetic energy of the fixed-wing aircraft 20 has been absorbed, the power spring works to retract (i.e., reverse payout) of the flexible capture member. This payout reversal helps in two ways: (1) it attenuates the backswing tendency of the captured fixed-wing aircraft 20, and (2) it allows the operator to begin a controlled descent of the fixed-wing aircraft 20 to the ground.

3.4 Flexible Capture Member

Figure 10D:
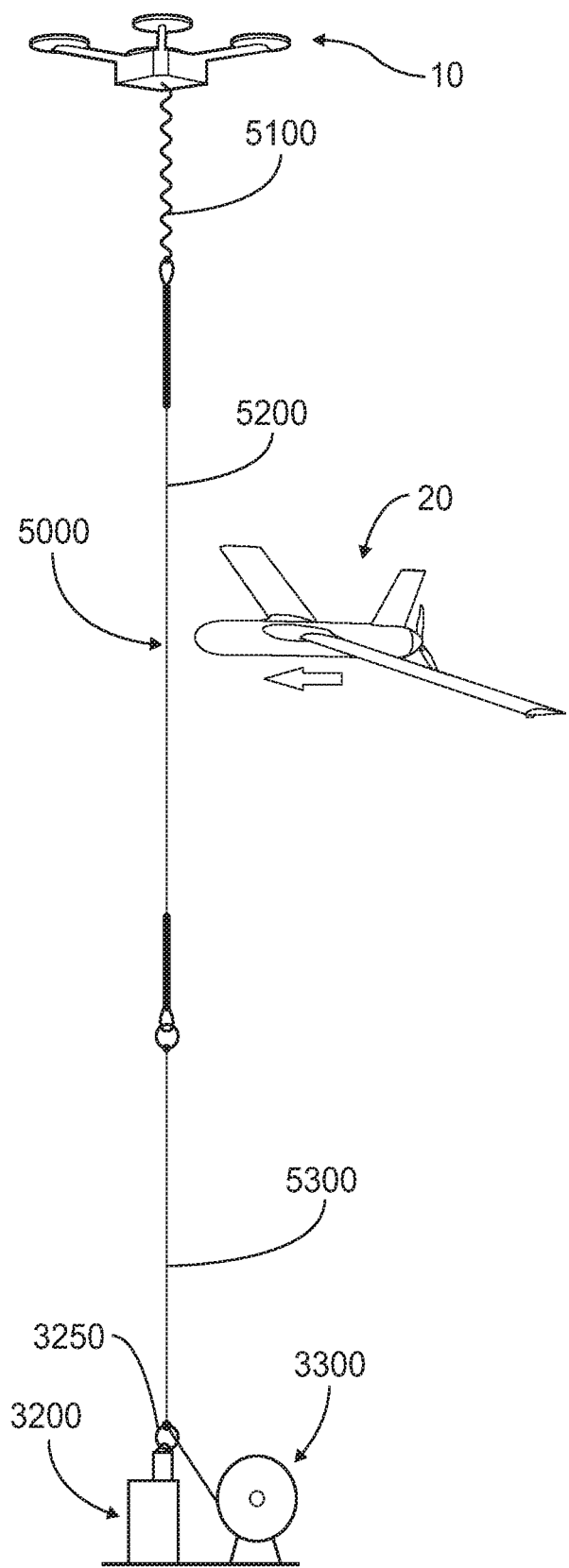
FIG. 10D is a diagrammatic view of the multicopter of FIG. 1A, the fixed-wing aircraft, the flexible capture member of the present disclosure, the breakaway device of FIG. 9C, and the flexible capture member payout and retract device of the anchor system of FIG. 9A just before capture.

As best shown in FIG. 10D, a flexible capture member 5000 is attachable to the multicopter 10 and the anchor system 3000 to facilitate retrieval of the fixed-wing aircraft 20 from wing-borne flight. The flexible capture member 5000 includes: (1) an elastic portion 5100; (2) a capture portion 5200; and (3) a retractable portion 5300.

The elastic portion 5100 is a bungee or similar element, and is attachable at one end to the cam 350 of the hub module 100 and at the other end to the capture portion 5200. The elastic portion may be rigged such that a portion of the strain energy is directed into a damping element such as a metal ring or a one-way pulley. By rigging the elastic portion as a compliant damper (as opposed to a spring), more energy is absorbed during capture, and undesirable ricochet is minimized.

The capture portion 5200 is a rope or similar element (such as Spectra rope) attachable at one end to the elastic portion 5100 and at the other end to the retractable portion 5300. The capture portion 5200 is the portion of the flexible capture member 5000 that the fixed-wing aircraft 20 captures during retrieval. Here, the capture portion 5200 is thicker near its ends (such as within 12 feet of each end) that it is in its center. In one embodiment, both ends of the capture portion terminate in a Brummel eye splice in which the buried tails constitute the thicker portion of the capture portion 5200.

The retractable portion 5300 is a rope or similar element attachable at one end to the capture portion 5200, partially wound around the drum 3312 of the flexible capture member payout and retract device 3300, and attached to the flexible capture member payout and retract device 3300. The retractable portion may be further improved by inserting an elastic member inside the core of the rope. The elastic member shortens the rope as it slackens and is wound onto the drum. During payout, the elastic member allows the rope to lengthen as it leaves the drum, and a lossy payout device is formed. This detail is especially helpful during a dynamic braking event, in which spool inertia and limited power spring stroke can impart undesirable acceleration spikes on the aircraft.

3.5 Accessories Container and Other Components

Figure 9D:
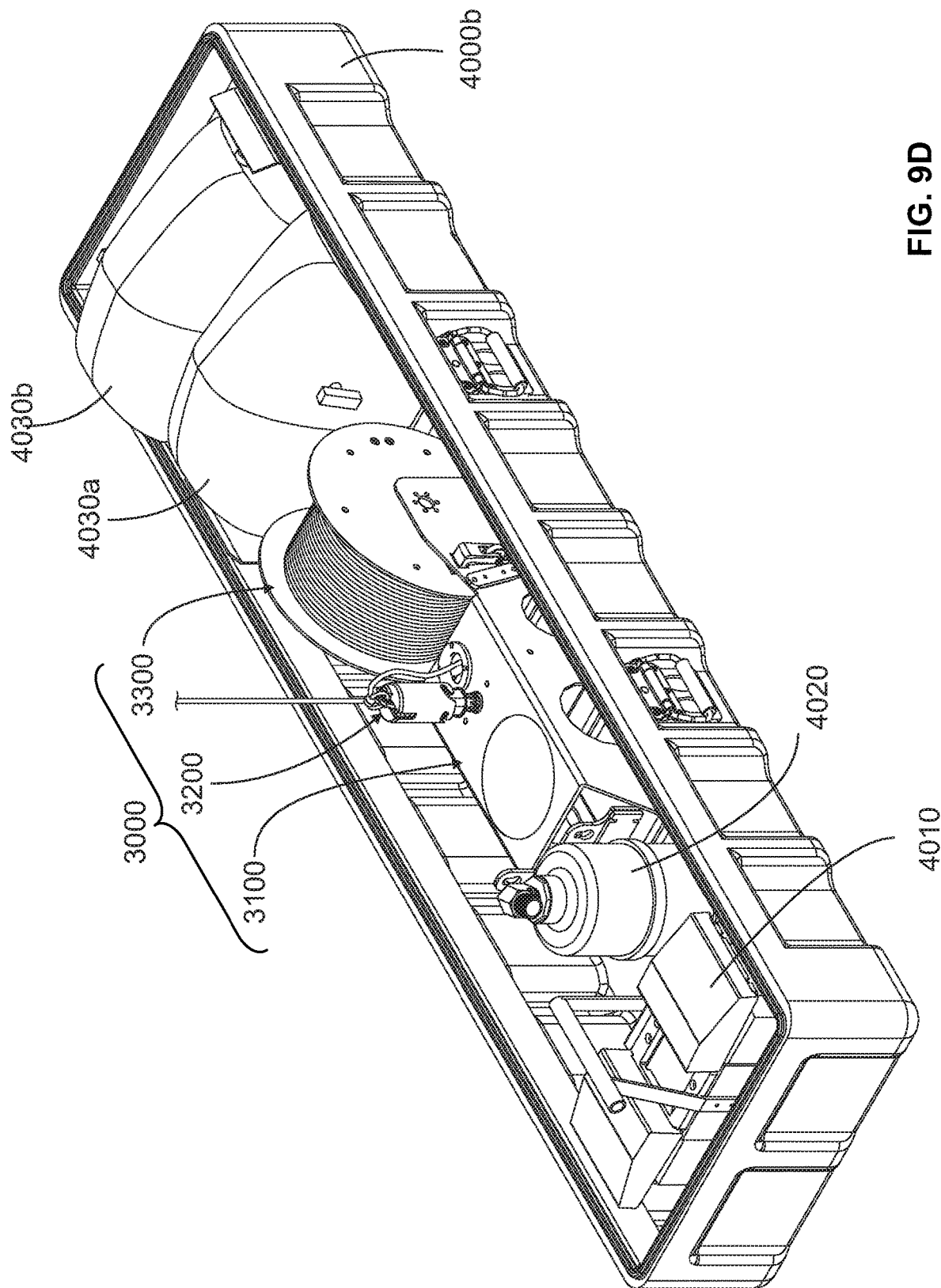
FIG. 9D is a top perspective view of the anchor system of FIG. 9A stored within a storage container along with other accessories.

As best shown in FIG. 9D, the anchor system 3000 is attached to the container bottom 4000b of an anchor system and accessory storage container to enable easy and compact storage of the anchor system 3000 and various accessories, such as (but not limited to): (1) a battery charger 4010 usable to recharge the batteries 260a to 260d of the multicopter 10; (2) an engine cooling system 4020 usable during pre-launch of the fixed-wing aircraft 20 to cool the engine of the fixed-wing aircraft 20; (3) two generators 4030a and 4030b; (4) the flexible capture member 5000; (5) an R/C transmitter stand that helps enforce geo-referenced joystick commands of the R/C controller; (6) extra nozzles for the engine cooling system; (7) a fire extinguisher; (8) shovels; (9) hard hats; (10) a parallel cable usable to enable the generators 4030a and 4030b to load-share; (11) an extra fuel tank; (12) spare hooks for the fixed-wing aircraft 20; (13) a laptop computer; and (14) weights for ballast.

4. Methods of Operation

As described in detail below: (1) the multicopter 10 and the storage and launch system 2000 are usable to facilitate launch of the fixed-wing aircraft 20 into wing-borne flight; and (2) the multicopter 10, the anchor system 3000, and the flexible capture member 5000 are usable to facilitate retrieval of the fixed-wing aircraft 20 from wing-borne flight.

4.1 Multicopter-Assisted Fixed-Wing Aircraft Launch Method

The multicopter-assisted fixed-wing aircraft launch method begins with the multicopter 10 disassembled and stored in the storage and launch system 2000, as best shown in FIGS. 8A and 8B. The operator unpacks the 13 modules and moves the launch-assist assembly 2100 of the storage and launch system 2000 to its launch position, as best shown in FIG. 8C.

The operator mounts the fixed-wing aircraft 20 to the launch-assist assembly 2100 by: (1) disengaging the safety mechanism 2150 of the fuselage-retaining assembly 2130, which enables the pincers 2132 and 2134 to separate from the fuselage-retaining orientation to the fuselage-release orientation; (2) lowering the fuselage of the fixed-wing aircraft 20 between the pincers 2132 and 2134 (the fact that the safety mechanism 2150 is disengaged enables weight of the fixed-wing aircraft to force the pincers 2132 and 2134 to separate to receive the fuselage); (3) positioning the wings of the fixed-wing aircraft 20 on the wing engaging surfaces 2121a and 2123a of the aircraft engaging bracket 2120 of the launch-assist assembly 2100; and (4) engaging the safety mechanism 2150, which prevents the pincers 2132 and 2134 from separating to the fuselage-release position and retains the fuselage of the fixed-wing aircraft 20 between the pincers 2132 and 2134. FIG. 8D shows the fixed-wing aircraft 20 mounted to the launch-assist assembly 2100 in this manner.

The operator selects the appropriate cooling nozzle for the engine cooling system 4020 based on the type of fixed-wing aircraft 20 used. The operator attaches that cooling nozzle to the engine cooling system 4020 and hangs the engine cooling system 4020 on the back of the aircraft engaging bracket 2120 of the launch-assist assembly 2100 such that the engine of the fixed-wing aircraft 20 is in the cooling nozzle's path.

The operator switches an idle power circuit of the multicopter 10 to a closed state (from an open state) to power certain components of the multicopter 10—such as the GPS receiver, the controller, and the IMU—to enable various preflight checks (e.g., operating mode status checks, throttle response checks, attitude indicator response checks, heading accuracy checks, and R/C range checks) to be performed. Switching the idle power circuit to the closed state does not power the rotor motors. The idle power circuit thus (when closed) enables the operator to conduct most preflight checks without having to worry about accidentally switching on one or more of the rotor motors.

As shown in FIG. 10A, the operator then attaches the hub module 100 to the fixed-wing aircraft 20 by: (1) operating the cam servo motor 381 (either manually or remotely via the R/C controller) to rotate the cam 350 to the attached rotational position (clockwise from this viewpoint); (2) operating the lock servo motor 391 (either manually or remotely via the R/C controller) to rotate the lock servo motor arm 392 into the cam rotation-preventing rotational position (clockwise from this viewpoint) such that the lock servo motor locking extension 392a on the end of the lock servo arm 392 engages the cam servo motor arm lock device 382a of the cam servo motor arm 382; and (3) seating a rearwardly curved hook 21 attached to the fuselage of the fixed-wing aircraft 20 on the cam 350 such that hook generally rests on the ridge 351 of the cam 350 and the tip of the hook is disposed in the valley 353 of the cam 350.

At this point the fixed-wing aircraft 20 is attached to the cam 350 (and the hub base 100), the fuselage of the fixed-wing aircraft 20 contacts the front and rear aircraft engaging brackets 340a and 340b (to prevent rotation about the pitch and yaw axes of the fixed-wing aircraft 20), and the stabilizers 290a and 290b contact the wings of the fixed-wing aircraft 20 (to prevent rotation about the roll axis of the fixed-wing aircraft 20).

Since the lock servo motor locking extension 392a is engaged to the cam servo motor arm lock device 382a of the cam servo motor arm 382, the cam servo motor 381 cannot rotate the cam 350 from the attached rotational position to the detached rotational position (counter-clockwise from this viewpoint). This prevents undesired detachment of the fixed-wing aircraft 20 from the cam 350 (and the multicopter 10).

After the hub module 100 is attached to the fixed-wing aircraft 20, the operator: (1) attaches the front and rear landing gear modules 600a to 600d to their respective front and rear landing gear extension modules 500a to 500d; (2) attaches the front and rear landing gear extension modules 500a to 500d to their respective rotor arm modules 400a to 400d; and (3) attaches and locks the rotor arm modules 400a to 400d to the hub module 100 to complete assembly of the multicopter 10.

The operator ensures the front and rear landing gear modules 600a to 600d are not in the path of rotation of the rotors of their corresponding rotor arm modules 400a to 400b, and connects the main power line of the multicopter 10 to switch a main power circuit to a closed state (from an open state). Unlike the idle power circuit, the main power circuit (when closed) is capable of delivering current sufficient to drive the rotor motors and cause the multicopter 10 to fly.

The operator begins the engine start-up procedure for the fixed-wing aircraft 20. The operator selects the ALTHOLD flight mode for the multicopter 10. The operator (or an assistant) disengages the safety mechanism 2150 of the fuselage-retaining assembly 2130, which enables the pincers 2132 and 2134 to separate from the fuselage-retaining orientation to the fuselage-release orientation.

The operator advances the throttle to begin vertically climbing and lift the fixed-wing aircraft 20 from between the pincers 2132 and 2134 (which are free to separate and release the fuselage of the fixed-wing aircraft 20 since the safety mechanism 2150 is disengaged). Once the multicopter 10 and attached fixed-wing aircraft 20 have reached a designated altitude, the operator controls the multicopter 10 to begin dashing forward. At this point, if the airspeed, GPS reception, and pitch angle of the fixed-wing aircraft 20 is within a suitable range (e.g., 10 to 20 degrees), the multicopter 10 can detach the fixed-wing aircraft 20.

Detaching the fixed-wing aircraft 20 from the cam 350 (and the multicopter 10) is a two-step process, as shown in FIGS. 10A to 10C. To detach the fixed-wing aircraft 20 from the cam 350 (and the multicopter 10), the operator first remotely controls the lock servo motor 391 (via the R/C controller) to rotate the lock servo motor arm 392 into the cam rotation-enabling rotational position (counter-clockwise from this viewpoint). Second, the operator remotely controls the cam servo motor 381 (via the R/C controller) to rotate the cam 350 from the attached rotational position to the detached rotational position (counter-clockwise from this viewpoint). As shown in the progression from FIGS. 10A to 10C, as the cam servo motor 381 rotates the cam 350 from the attached rotational position to the detached rotational position, the valley 352 and the ascending edge of the ridge 353 forces the hook 21 off of the cam 350, thereby detaching the fixed-wing aircraft 20 from the cam 350 (and the multicopter 10).

After detachment, the operator may switch the multicopter 10 to half-power mode and recover the multicopter 10 either manually via ALTHOLD and/or LOITER flight modes or semi-autonomously via RTL flight mode.

At the instant the multicopter 10 contacts the landing surface, a shutdown command may be issued, causing all of the rotor motors to shut down. In this embodiment, to avoid potential damage to the multicopter 10 upon recovery, two conditions must be met before the operator can shut down the rotor motors: (1) the measured altitude of the multicopter 10 is below a designated altitude; and (2) the throttle of the multicopter 10 is below a designated threshold.

In certain embodiments, the operator may desire to launch the fixed-wing aircraft 20 from a location in which GPS is unavailable (e.g., from the ground in a heavily wooded or mountainous region). In one such embodiment, the operator may use a GPS repeater to acquire a GPS fix for the fixed-wing aircraft and/or the multicopter during preflight. In this case, the GPS repeater might have a GPS receiving antennae on the roof of a building, on a hilltop, or flying in an aircraft, while pre-flight is happening in the GPS-denied location. The GPS-denied location may be a lower floor in the same building as the one that has the GPS antennae on the roof. In this case, the operator may decide to seal-off the preflight area (i.e., close the garage door) to avoid multipath GPS jamming After preflight is completed, the repeater may be switched off and the seal breached to allow the aircraft to exit the preflight area and begin attempts to acquire GPS directly. Once launched, the fixed-wing aircraft 20 will acquire that GPS satellite constellation once able to do so (such as when the multicopter 10 and attached fixed-wing aircraft 20 climb high enough to acquire GPS). This process is shortened, as the GPS receiver enjoys familiarity with the prevailing satellite constellation.

In other embodiments in which the operator desires to launch the fixed-wing aircraft 20 from a location in which GPS is unavailable, rather than using a GPS repeater to acquire and pre-load a desired GPS satellite constellation to the fixed-wing aircraft 20, the operator simply climbs the multicopter 10 and attached fixed-wing aircraft 20 high enough to acquire GPS. At that point, the fixed-wing aircraft 20 acquires the desired GPS satellite constellation, and launch proceeds as described above. The operator can abort launch should the fixed-wing aircraft 20 not be able to acquire GPS. This offers a unique advantage over traditional (ground-based) launch systems that cannot operate from GPS-denied locations, as the fixed-wing aircraft owner would not accept the risk that GPS would be acquired (on faith) during the first few moments of flight.

4.2 Multicopter-Assisted Fixed-Wing Aircraft Retrieval Method

To retrieve the fixed-wing aircraft 20 from wing-borne flight, the operator positions the anchor system 3000 at a desired retrieval location. The operator attaches the free end of the flexible capture member 5000 (which is the free end of the elastic portion 5100 in this embodiment) to the cam 350 of the multicopter 10. The other end of the flexible capture member 5000 is attached to the flexible capture member payout and retract device 3300. A length of the flexible capture member 5000 (particularly, the retractable portion 5300) is fed through the fairlead 3812 and wound around the drum 3312.

As best shown in FIGS. 10D, 10E, 10F, and 10G, the operator fixedly attaches (e.g., by knotting) a breakaway ring 3250 to the flexible capture member 5000 at a particular point (such as 200 feet or any other suitable distance from upper end of the flexible capture member 5000). The operator attaches the breakaway ring 3250 to the breakaway device 3200 as follows: (1) the operator removes the breakaway sleeve 3220 from the collar 3214; (2) the operator rotates the finger 3228 outside of the interior of the breakaway sleeve 3220; (3) the operator slides the breakaway ring 3250 onto the finger 3228; (4) the operator rotates the finger 3228 back inside the interior of the breakaway sleeve 3220; and (5) the operator attaches the breakaway sleeve 3220 to the collar 3214 to trap the finger 3228 within, thereby retaining the breakaway ring 3250 on the finger 3228.

The operator switches on an idle power circuit of the multicopter 10 to perform various preflight checks, as described above. The operator selects the LOITER or ALTHOLD flight mode and TENSION throttle mode for the multicopter 10. The operator ensures the GPS antenna 3810 of the anchor system 3300 has acquired sufficient GPS satellites to enable the fixed-wing aircraft 20 to locate the anchor system 3300 with an acceptable level of uncertainty.

As the fixed-wing aircraft approaches the anchor system 3300, the operator remotely controls the multicopter 10 to climb to a designated altitude above the anchor system 300 and maintain a particular tension (such as 20 pounds) in the portion of the flexible capture member 5000 extending between the multicopter 10 and the breakaway ring 3250. This tension is less than the force required to compress the compression spring 3216 of the breakaway device 3200 (about 100 to 150 pounds in this example embodiment). The multicopter 10 station keeps relative to the anchor system 3300 while above the anchor system 3300. Above in this context, unless described otherwise, means vertically spaced apart from.

Figures 10E, 10F, 10G:
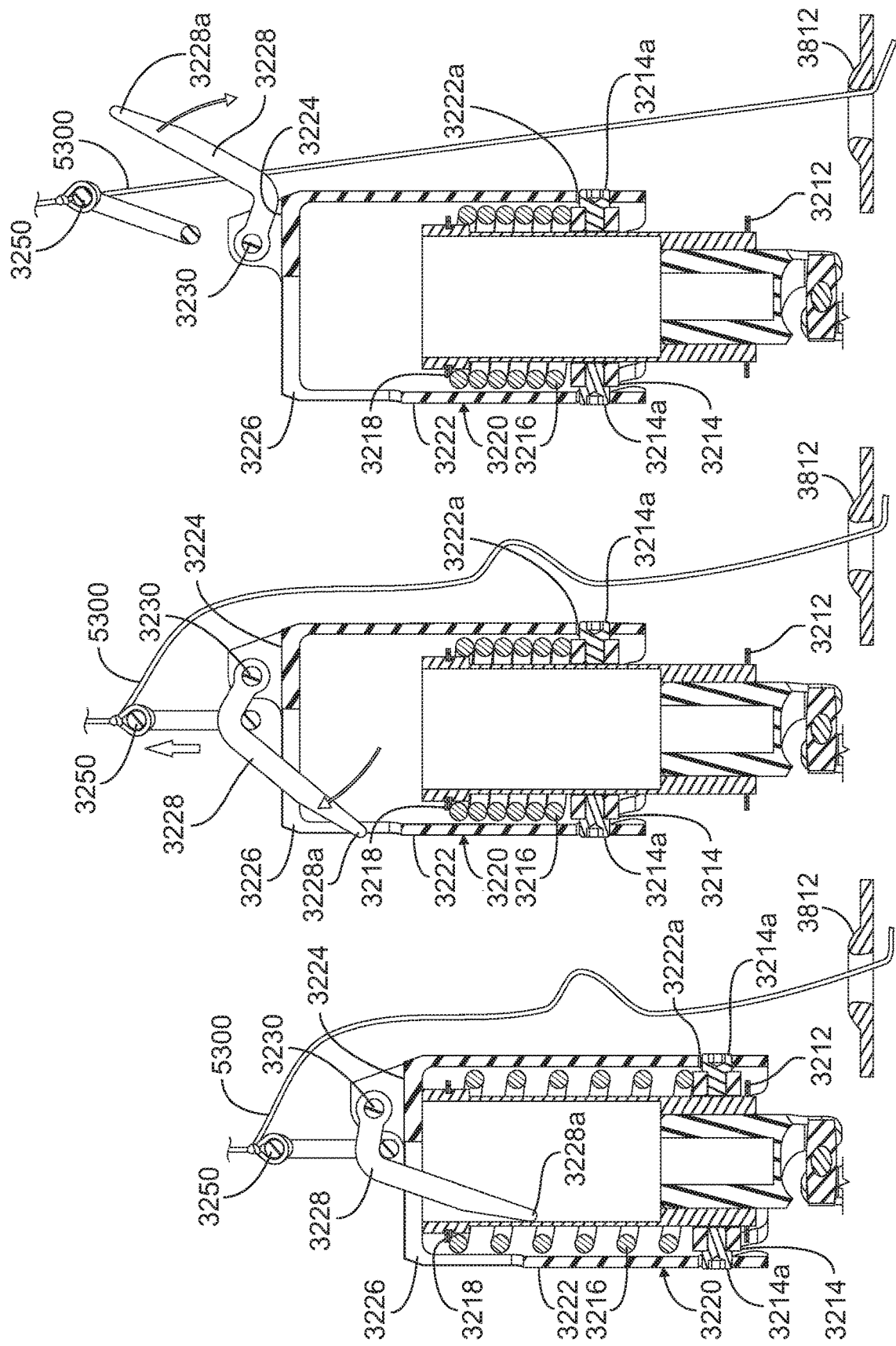
FIG. 10E is a cross-sectional view of the breakaway device of FIG. 9C when the compression spring is fully extended taken substantially along a plane through the longitudinal axis of the breakaway device.
FIG. 10F is a cross-sectional view of the breakaway device of FIG. 9C when the compression spring is fully compressed and the finger beginning to rotate out of the breakaway sleeve taken substantially along a plane through the longitudinal axis of the breakaway device.
FIG. 10G is a cross-sectional view of the breakaway device of FIG. 9C when the compression spring is fully compressed and the finger has rotated out of the breakaway sleeve taken substantially along a plane through the longitudinal axis of the breakaway device.
Figure 10I:
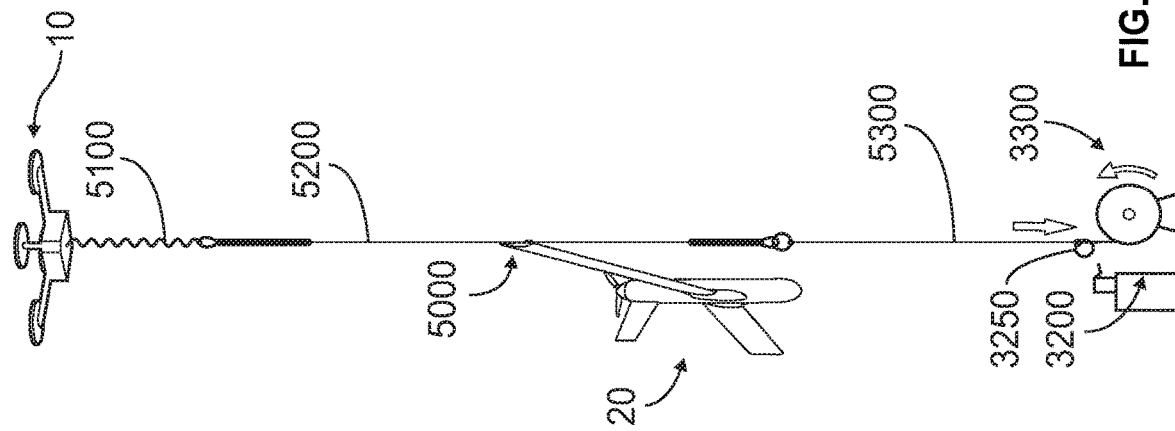
FIG. 10I is a diagrammatic view of the multicopter of FIG. 1A, the fixed-wing aircraft, the flexible capture member of the present disclosure, the breakaway device of FIG. 9C, and the flexible capture member payout and retract device of the anchor system of FIG. 9A after the fixed-wing aircraft has stopped moving and the anchor system has retracted the paid-out portion of the flexible capture member.
Figure 10H:
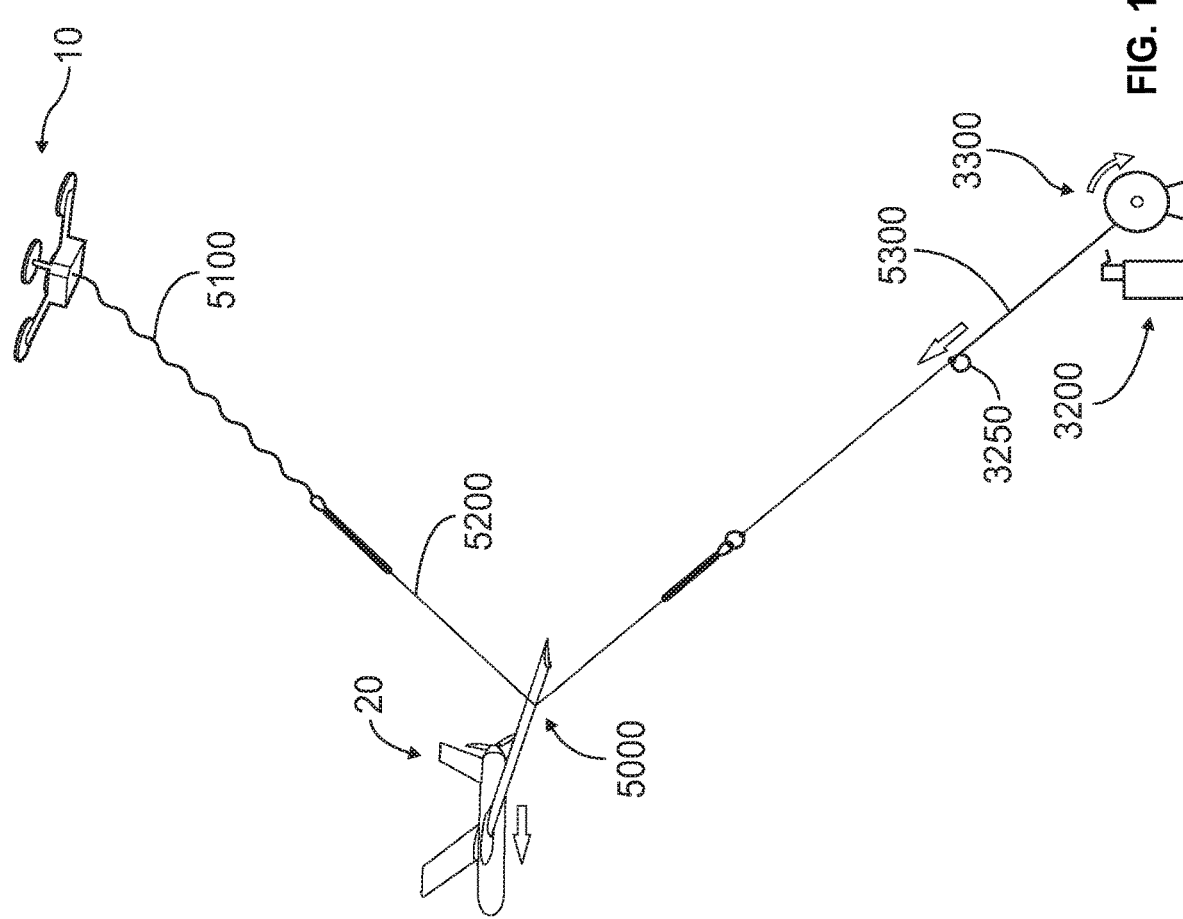
FIG. 10H is a diagrammatic view of the multicopter of FIG. 1A, the fixed-wing aircraft, the flexible capture member of the present disclosure, the breakaway device of FIG. 9C, and the flexible capture member payout and retract device of the anchor system of FIG. 9A just after capture when the anchor system is paying out flexible capture member.

As shown in FIG. 10H, the fixed-wing aircraft 20 is flown toward, contacts, and captures part of the capture portion 5000*b* of the flexible capture member 5000 in a manner similar to that described in U.S. Pat. No. 6,264,140, the entire contents of which are incorporated herein by reference. Specifically, the fixed-wing aircraft 20 is flown toward the capture portion 5200 of the flexible capture member 5000 such that the leading edge of one of the wings of the fixed-wing aircraft 20 contacts the capture portion 5200. After the leading edge of the wing contacts the capture portion 5200, continued movement of the fixed-wing aircraft 20 relative to the capture portion 5200 causes the capture portion 5200 to slide away from the fuselage of the fixed-wing aircraft 20 along the leading edge of the wing toward the end of the wing until a tether capture device (not shown) near the end of the wing captures part of the capture portion 5200.

When the fixed-wing aircraft 20 contacts the flexible capture member 5000, the operator advances the throttle of the multicopter 10 to maximum for a predetermined period of time (such as 3 seconds), then slowly reduces the throttle to arrest motion and allow the fixed-wing aircraft to controllably descend.

FIGS. 10E, 10F, and 10G show the breakaway device 3300 releasing the breakaway ring 3250 during capture, thereby enabling the anchor system 3000 to begin paying out the retractable portion 5300 of the flexible capture member 5000 wound around the drum 312 of the flexible capture member payout and retract device 3300 to absorb the kinetic energy of and slow the fixed-wing aircraft 20.

FIG. 10E shows the breakaway device 3300 before capture. The fixed-wing aircraft 20 contacting the flexible capture member 5000 tensions the flexible capture member 5000. Since the flexible capture member 5000 is attached to the breakaway sleeve 3220 via the breakaway ring 3250 this tension imposes a lifting force on the breakaway sleeve 3220 and the collar 3214 to which the breakaway sleeve 3220 is attached. As best shown in FIG. 10F, if this lifting force is large enough to overcome the biasing force of the compression spring 3216, this lifting force causes the collar 3214 to slide upward relative to the shaft 3210 and compress the compression spring 3216. As best shown in FIGS. 10F and 10G, once the compression spring 3216 is compressed a designated amount, the finger 3228 is free to escape the breakaway sleeve 3220 through the finger escape slot 3226. At this point, the tension in the flexible capture member 5000 causes the finger 3228 to rotate out of the breakaway sleeve 3220, thereby releasing the breakaway ring 3250.

Once the breakaway device 3200 releases the breakaway ring 3250, continued motion of the fixed-wing aircraft 20 causes the flexible capture member payout and retract device 3300 to begin paying out the retractable portion 5300 of the flexible capture member 5000, initially wound around the drum 3312. As the flexible capture member payout and retract device 3300 pays out the retractable portion 5300 of the flexible capture member 5000, the flexible capture member payout and retract device 3300 dampens this payout—and absorbs the kinetic energy of the fixed-wing aircraft 20—in two ways: (1) the biasing element within the drum 3312 biasing the drum 3312 to its initial rotational position and against the rotation that results in payout of the flexible capture member (described above); and (2) eddy current braking (described below).

As indicated above, the electrically conductive flanges 3314 and 3316 of the flexible capture member payout and retract device 3300 enable eddy currents to flow as the flanges move in the vicinity of the magnets attracted to the backing plates attached to the anchor system base 3100 to which the flexible capture member payout and retract device 3300 is attached. As the flanges 3314 and 3316 rotate with the drum 3312 relative to the anchor system base 3100—such as while the flexible capture member payout and retract device 3300 pays out the flexible capture member 5000 during retrieval of the fixed-wing aircraft 20—the flanges 3314 and 3316 move past the stationary magnets. This induces eddy currents to flow, and the resulting drag force tends to oppose rotation of the drum 3312. The eddy current drag force increases with increasing speed and therefore the payout speed is limited.

The fixed-wing aircraft 20 eventually stops moving and dangles below the multicopter 10, as best shown in FIG. 10I. At this point, the biasing element within the drum 3312 biases the drum 3312 to reverse spin direction, which retracts the retractable portion 5300 of the flexible capture member back into the anchor system 3300. Specifically, this causes the retractable portion 5300 of the flexible capture member to wind back onto the drum 3312. In some embodiments, the flexible capture member payout and retract device is configured to retract only part of the flexible capture member—such as the retractable portion—while in other embodiments the flexible capture member payout and retract device is configured to retract all or substantially all of the flexible capture member. The flexible capture member payout and retract device in certain embodiments includes a motor-driven payout spool (such as a spool used for fishing or parasailing), a capstan winch (such as those used for anchoring a yacht), a clothes wringer, or a stuff sack, such as those used in sport climbing.

Once the tether capture device of the fixed-wing aircraft 20 captures the part of the capture portion 5200, the tether capture device holds that part of the capture portion 5200 such that the fixed-wing aircraft 20 does not slide down the flexible capture member 5000. If, however, the tether capture device does not initially prevent the fixed-wing aircraft from sliding down the flexible capture member 5000 and the fixed-wing aircraft 20 begins sliding, the increasing thickness of the capture portion 5200 will eventually arrest this sliding. In other embodiments, rather than (or in addition to) being thicker at its ends than in its middle, the capture portion 5200 is knotted along its length (such as every few feet) to prevent the fixed-wing aircraft 20 from sliding down the capture portion 5200 after capture.

After capture, the operator may engage NORMAL throttle mode to improve control of his descent rate as the flexible capture member 5000 slackens and the fixed-wing aircraft 20 is lowered to the landing surface. Thereafter, the operator may engage the half-power mode and control the multicopter 10 to descend until it reaches ground, at which point the operator shuts down the rotor motors.

In certain embodiments, the operator desires to retrieve the fixed-wing aircraft 20 from a location in which GPS is unavailable. In these embodiments, the operator attaches the GPS antenna 3810—normally attached to the anchor system 3000—to the multicopter 10. This enables the GPS antenna 3810 to acquire GPS once the multicopter 10 climbs to the desired altitude for retrieval.

Various changes and modifications to the presently preferred embodiments described herein will be apparent to those skilled in the art. These changes and modifications can be made without departing from the spirit and scope of the present subject matter and without diminishing its intended advantages. It is intended that such changes and modifications be covered by the appended claims.

The invention is claimed as follows:

1. A rotorcraft-assisted system for retrieving an aircraft from flight, the system comprising:
   a rotorcraft;
   a flexible capture member having a first end and a second end, the first end attachable to the rotorcraft; and
   an anchor system including a base, a breakaway device removably attachable to the base, and a flexible capture member payout and retract device rotatably attachable to the base,
   wherein the second end of the flexible capture member is attachable to the flexible capture member payout and retract device,
   wherein the flexible capture member is attachable to the breakaway device between the ends of the flexible capture member.

2. The rotorcraft-assisted system of claim 1, wherein the flexible capture member includes a capture portion including two ends and a middle extending between the two ends, one of the two ends being thicker than the middle.

3. The rotorcraft-assisted system of claim 2, wherein both ends of the capture portion are thicker than the middle.

4. The rotorcraft-assisted system of claim 3, wherein the two ends of the capture portion each include a Brummel eye splice.

5. The rotorcraft-assisted system of claim 1, wherein the flexible capture member includes an elastic portion near the first end.

6. The rotorcraft-assisted system of claim 5, wherein the flexible capture member includes a capture portion and a retractable portion, the capture portion located between the elastic portion and the retractable portion.

7. The rotorcraft-assisted system of claim 6, wherein the capture portion includes two ends and a middle extending between the two ends, one of the two ends being thicker than the middle.

8. The rotorcraft-assisted system of claim 7, wherein both ends of the capture portion are thicker than the middle.

9. The rotorcraft-assisted system of claim 1, wherein the flexible capture member includes an elastic portion near the first end, wherein the flexible capture member includes a capture portion and a retractable portion, the capture portion located between the elastic portion and the retractable portion, wherein the capture portion includes two ends and a middle extending between the two ends, wherein both ends of the capture portion are thicker than the middle, and wherein the two ends of the capture portion each include a Brummel eye splice.

10. The rotorcraft-assisted system of claim 1, which includes a ring, the ring attachable to the flexible capture member to enable the flexible capture member to be attached to the breakaway device.

11. A flexible capture member for retrieving an aircraft from flight, the flexible capture member comprising:
   an elastic portion including a compliant damper;
   a retractable portion; and
   a capture portion between the elastic portion and the retractable portion.

12. The flexible capture member of claim 11, wherein the capture portion includes two ends and a middle extending between the two ends, one of the two ends being thicker than the middle.

13. The flexible capture member of claim 12, wherein both of the ends of the capture portion are thicker than the middle.

14. The flexible capture member of claim 13, wherein the two ends each include a Brummel eye splice.

15. The flexible capture member of claim 11, wherein the retractable portion is non-elastic, and wherein the capture portion is non-elastic.

16. A flexible capture member for retrieving an aircraft from flight, the flexible capture member comprising:
   an elastic portion;
   a retractable portion including an elastic member; and
   a capture portion between the elastic portion and the retractable portion.

17. The flexible capture member of claim 16, wherein the retractable portion includes the elastic member and a non-elastic member, and wherein the elastic member is positioned inside the non-elastic member.

18. The flexible capture member of claim 16, wherein the retractable portion includes the elastic member and a non-elastic member, and wherein the elastic member is positioned inside the non-elastic member, and wherein the capture portion is non-elastic.

* * * * *